(12) United States Patent
Chien

(10) Patent No.: US 10,928,021 B2
(45) Date of Patent: Feb. 23, 2021

(54) LED AND/OR LASER OUTDOOR PROJECTION LIGHT DEVICE HAVING MORE THAN ONE INNER AND/OR OUTER ROTATING OPTIC-PIECE TO CREATE MOVING, CHANGEABLE LIGHTED IMAGE AND/OR PATTERN

(71) Applicant: Tseng-Lu Chien, Walnut, CA (US)

(72) Inventor: Tseng-Lu Chien, Walnut, CA (US)

( * ) Notice: Subject to any disclaimer, the term of this patent is extended or adjusted under 35 U.S.C. 154(b) by 0 days.

(21) Appl. No.: 16/134,496

(22) Filed: Sep. 18, 2018

(65) Prior Publication Data
US 2019/0120450 A1  Apr. 25, 2019

Related U.S. Application Data

(60) Continuation-in-part of application No. 15/494,477, filed on Apr. 22, 2017, and a continuation-in-part of
(Continued)

(51) Int. Cl.
*F21S 8/00* (2006.01)
*G02F 1/13* (2006.01)
(Continued)

(52) U.S. Cl.
CPC .............. *F21S 8/035* (2013.01); *F21K 9/232* (2016.08); *F21K 9/60* (2016.08); *F21K 9/65* (2016.08);
(Continued)

(58) Field of Classification Search
CPC ...... F21S 8/035; F21S 4/28; F21S 9/02; F21S 10/007; F21S 10/002; G02F 1/1313;
(Continued)

(56) References Cited

U.S. PATENT DOCUMENTS 4,180,950 A  1/1980 Foster
4,365,237 A  12/1982 Knight
(Continued)

FOREIGN PATENT DOCUMENTS

WO   WO2010142066 A1   12/2010

*Primary Examiner* — M Baye Diao
(74) *Attorney, Agent, or Firm* — Bacon & Thomas, PLLC

(57) ABSTRACT

An LED or/and Laser light device(s) connect with outlet or bulb-base or interchangeable or USB power source, which incorporates more than one geometric shapes of optics-piece including image-forming-piece and optics-lens(es) that said optics-lens(es) having at least one of reflective and/or refractive properties which has relative positions, distances, and/or orientations to LEDs and/or Laser light-source(s) and image-forming-piece to let light-beams reflect, retro-reflect, refract, or go through art, design, texture, treated area of said optics-lens and/or image-forming-piece, so the light-beam of the said LED or laser light-source at least reflected or/and refracted and/or traveling and/or passing through multiple times the said reflective and refractive optic lens(es) and/or art-areas, and/or image-forming-device to create or project lighted image(s), message(s), number(s), time, geometric art(s), nature scene(s), galaxy(ies), milky way, sky(ies), cloud(s), space nebula, stars, moon, water-wave(s), aurora light(s), animal(s), character(s), cartoon(s), sign(s), logo(s), wording(s) or commercial(s) to desired surfaces, including (1) indoor ceiling, walls, floors while the light-device have built-in prong, or (2) outdoor building, fence, walls, garden, patio area(s) and/or all other desired areas while light-device have AC-plug-wire to AC outlet to show the wider view angle lighted image and/or patterns. The said each of the said optics lens and image-forming-piece has its pre-determined geometric-shapes and/or texture, shaped opening, printing, art-design, wording, windows, cutout, variable thickness incorporate with motor/movement/spin/rotating/moving parts to make one or more inner and/or outer optics-lens
(Continued)

and/or image-forming-piece and accessories to rotating to create said above wide viewing angle lighted image or lighted-patterns become motion/moving/variable/shaking, vibration, changing color or patterns with or without at least one of sensor, switch, RF or wireless control system.

16 Claims, 17 Drawing Sheets

Related U.S. Application Data application No. 15/402,965, filed on Jan. 10, 2017, now Pat. No. 10,151,451, said application No. 15/494,477 is a continuation-in-part of application No. 15/355,515, filed on Nov. 18, 2016, application No. 16/134,496, which is a continuation-in-part of application No. 15/296,599, filed on Oct. 18, 2016, now Pat. No. 10,228,112, and a continuation-in-part of application No. 14/968,862, filed on Dec. 14, 2015, now Pat. No. 9,910,095, said application No. 15/402, 965 is a continuation-in-part of application No. 14/606,242, filed on Jan. 27, 2015, now Pat. No. 9,541,260, said application No. 14/968,862 is a continuation-in-part of application No. 14/539,267, filed on Nov. 12, 2014, said application No. 15/296,599 is a continuation of application No. 14/503,647, filed on Oct. 1, 2014, now Pat. No. 9,719,654, which is a division of application No. 14/451,822, filed on Aug. 5, 2014, now Pat. No. 10,047,922, which is a continuation-in-part of application No. 14/323,318, filed on Jul. 3, 2014, now Pat. No. 10,222,015, said application No. 15/355,515 is a continuation-in-part of application No. 14/289,968, filed on May 29, 2014, now Pat. No. 9,551,477, which is a continuation-in-part of application No. 14/280,865, filed on May 19, 2014, now Pat. No. 9,581,299, said application No. 14/539,267 is a continuation-in-part of application No. 14/275,184, filed on May 12, 2014, now Pat. No. 10,371,330, said application No. 14/323,318 is a continuation-in-part of application No. 14/023,889, filed on Sep. 11, 2013, now Pat. No. 10,323,811, said application No. 14/280,865 is a continuation-in-part of application No. 13/540,729, filed on Jul. 3, 2012, now abandoned, said application No. 14/606,242 is a continuation-in-part of application No. 13/367,758, filed on Feb. 7, 2012, now Pat. No. 8,967,831, said application No. 13/540,729 is a continuation-in-part of application No. 13/296,469, filed on Nov. 15, 2011, now Pat. No. 8,711,216, and a continuation of application No. 13/296,508, filed on Nov. 15, 2011, now Pat. No. 8,562,158, said application No. 14/275,184 is a continuation of application No. 12/914,584, filed on Oct. 28, 2010, now Pat. No. 8,721,160, which is a division of application No. 12/318,470, filed on Dec. 30, 2008, now abandoned.

(51) Int. Cl.

| | | |
|---|---|---|
| F21V 17/02 | (2006.01) | |
| G03B 23/00 | (2006.01) | |
| F21V 14/00 | (2018.01) | |
| F21S 10/00 | (2006.01) | |
| F21V 5/04 | (2006.01) | |
| F21V 23/00 | (2015.01) | |
| G03B 21/20 | (2006.01) | |
| F21K 9/232 | (2016.01) | |
| F21V 21/08 | (2006.01) | |
| F21V 14/08 | (2006.01) | |
| F21V 33/00 | (2006.01) | |
| F21V 29/00 | (2015.01) | |
| F21S 4/28 | (2016.01) | |
| F21V 21/22 | (2006.01) | |
| F21V 21/14 | (2006.01) | |
| F21S 9/02 | (2006.01) | |
| F21V 13/02 | (2006.01) | |
| F21V 14/06 | (2006.01) | |
| F21V 23/04 | (2006.01) | |
| F21K 9/65 | (2016.01) | |
| F21K 9/60 | (2016.01) | |
| F21V 21/30 | (2006.01) | |
| G03B 21/14 | (2006.01) | |
| F21W 121/00 | (2006.01) | |
| F21Y 101/00 | (2016.01) | |
| F21Y 115/10 | (2016.01) | |
| F21V 21/29 | (2006.01) | |
| F21Y 115/30 | (2016.01) | |
| F21Y 113/13 | (2016.01) | |

(52) U.S. Cl.
CPC . *F21S 4/28* (2016.01); *F21S 9/02* (2013.01); *F21S 10/002* (2013.01); *F21S 10/007* (2013.01); *F21V 5/04* (2013.01); *F21V 13/02* (2013.01); *F21V 14/003* (2013.01); *F21V 14/006* (2013.01); *F21V 14/06* (2013.01); *F21V 14/08* (2013.01); *F21V 17/02* (2013.01); *F21V 21/08* (2013.01); *F21V 21/14* (2013.01); *F21V 21/22* (2013.01); *F21V 23/00* (2013.01); *F21V 23/04* (2013.01); *F21V 29/00* (2013.01); *F21V 33/0052* (2013.01); *G02F 1/1313* (2013.01); *G03B 21/2046* (2013.01); *G03B 23/00* (2013.01); *F21V 21/29* (2013.01); *F21V 21/30* (2013.01); *F21V 23/0442* (2013.01); *F21V 23/0471* (2013.01); *F21W 2121/00* (2013.01); *F21Y 2101/00* (2013.01); *F21Y 2113/13* (2016.08); *F21Y 2115/10* (2016.08); *F21Y 2115/30* (2016.08); *G03B 21/142* (2013.01); *Y10S 362/80* (2013.01); *Y10S 362/806* (2013.01)

(58) Field of Classification Search
CPC .......... F21V 29/00; F21V 21/22; F21V 21/14; F21V 21/08; F21V 14/08; F21V 13/02; F21V 14/06; F21V 23/04; F21V 21/30; F21V 23/0442; F21V 23/0471; F21V 21/29; F21V 33/0052; F21V 17/02; F21V 14/006; F21V 5/04; F21V 23/00; F21V 14/003; F21K 9/232; F21K 9/60; F21K 9/65; G03B 21/142; G03B 23/00; G03B 21/2046; F21W 2121/00; F21Y 2101/00; F21Y 2115/10; F21Y 2115/30; F21Y 2113/13; Y10S 362/806; Y10S 362/80
USPC .......................................... 324/426; 362/257
See application file for complete search history.

(56) References Cited

U.S. PATENT DOCUMENTS

| | | | |
|---|---|---|---|
| 5,142,463 A | | 8/1992 | Panagotacos et al. |
| 5,347,292 A | * | 9/1994 | Ge .................. H01J 9/185 |
| | | | 313/309 |
| 5,506,629 A | * | 4/1996 | Kawahara ............. H04N 9/31 |
| | | | 348/776 |
| 5,896,472 A | * | 4/1999 | Takayama ............. H04N 1/506 |
| | | | 347/116 |

(56) References Cited

U.S. PATENT DOCUMENTS

| | | | | |
|---|---|---|---|---|
| 6,048,083 | A * | 4/2000 | McDermott | F21V 5/046 362/337 |
| 6,267,478 | B1 * | 7/2001 | Chen | F21S 10/007 353/84 |
| 6,333,826 | B1 * | 12/2001 | Charles | G02B 13/06 359/725 |
| 6,344,866 | B1 * | 2/2002 | Komiya | G02B 26/12 347/133 |
| 7,075,076 | B2 * | 7/2006 | Makino | H01J 37/292 250/310 |
| 7,346,196 | B2 | 3/2008 | Gin | |
| 7,387,403 | B2 | 6/2008 | Mighetto | |
| 7,543,958 | B2 | 6/2009 | Chi et al. | |
| 7,597,455 | B2 * | 10/2009 | Smith | H05B 45/20 362/249.01 |
| 7,775,691 | B2 | 8/2010 | Burgei et al. | |
| 7,817,016 | B2 | 10/2010 | Haase | |
| 7,821,717 | B2 * | 10/2010 | Woodgate | G03B 21/625 359/622 |
| 8,967,831 | B2 | 3/2015 | Chien | |
| 9,267,653 | B2 * | 2/2016 | Benner | H01R 33/92 |
| 9,909,739 | B2 * | 3/2018 | Chien | F21V 23/0442 |
| 10,117,569 | B2 * | 11/2018 | Shudo | A61B 5/168 |
| 2002/0051648 | A1 * | 5/2002 | Shimomura | H04N 1/0473 399/49 |
| 2004/0207581 | A1 * | 10/2004 | Miller | G09G 3/32 345/82 |
| 2005/0185398 | A1 | 8/2005 | Scannell, Jr. | |
| 2008/0031004 | A1 * | 2/2008 | Chu | F21S 43/50 362/545 |
| 2009/0269091 | A1 * | 10/2009 | Yuasa | G03G 15/238 399/45 |
| 2012/0300179 | A1 * | 11/2012 | Masuda | G03B 21/16 353/52 |
| 2013/0242559 | A1 * | 9/2013 | Moersheim | F21K 9/27 362/249.02 |
| 2016/0152175 | A1 * | 6/2016 | Hwang | G02B 19/0014 362/514 |

\* cited by examiner

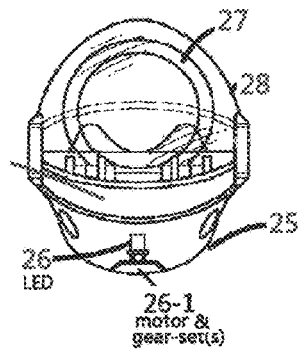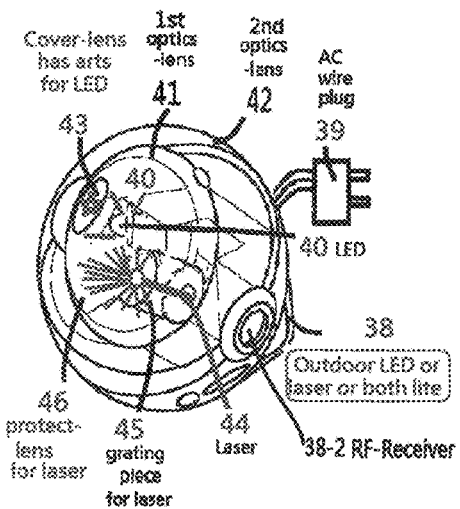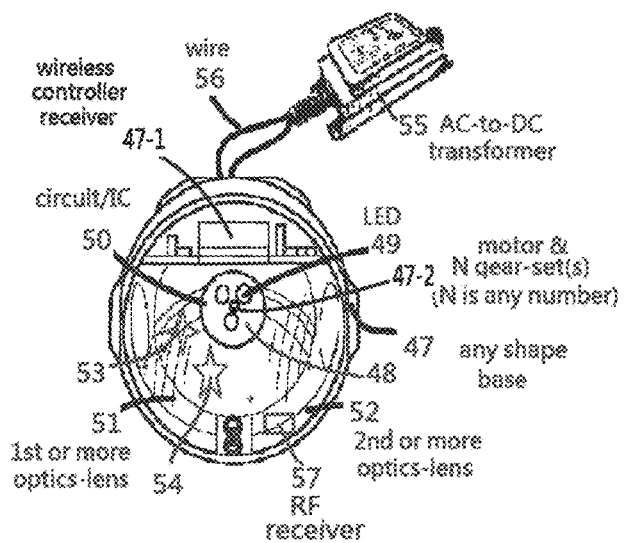

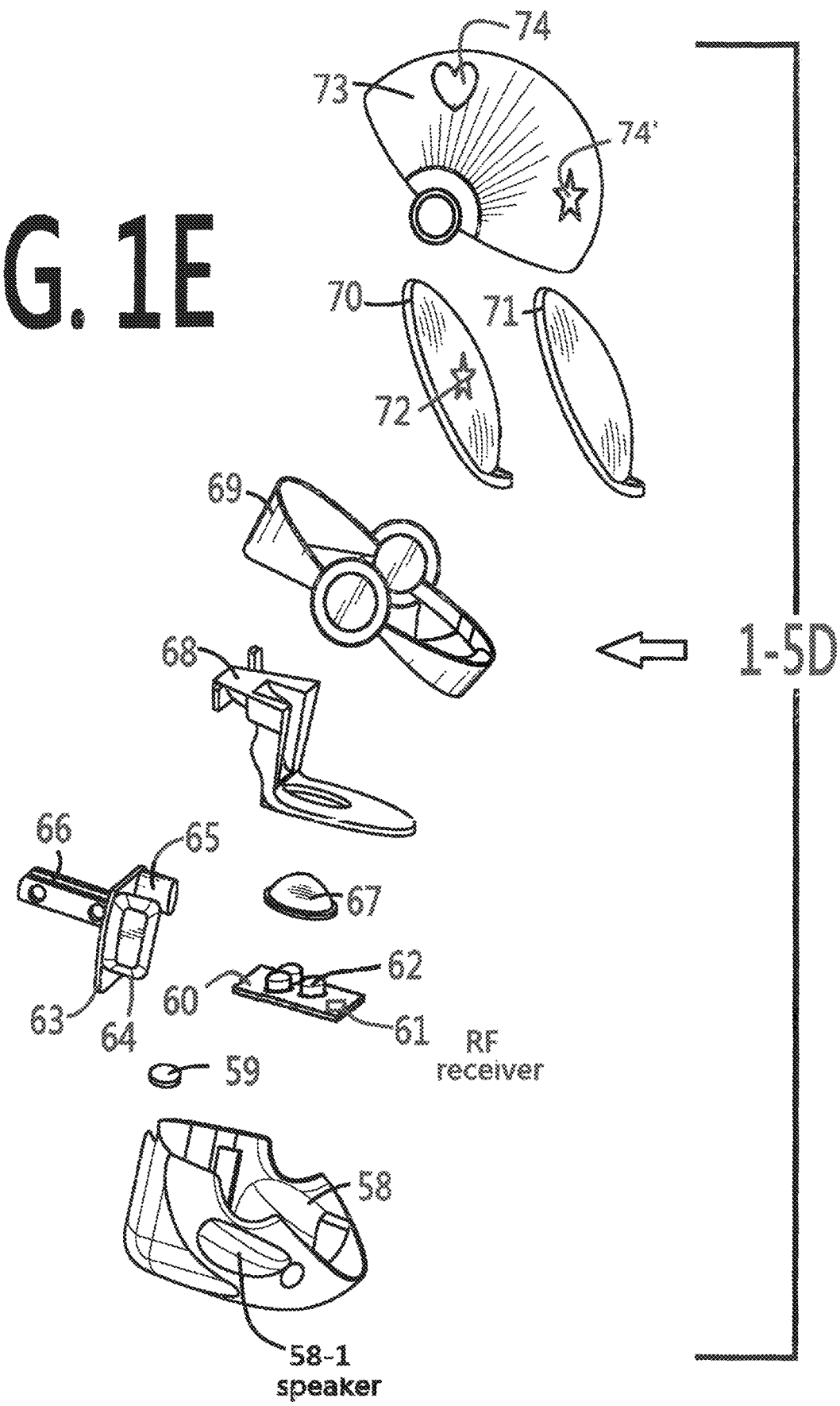

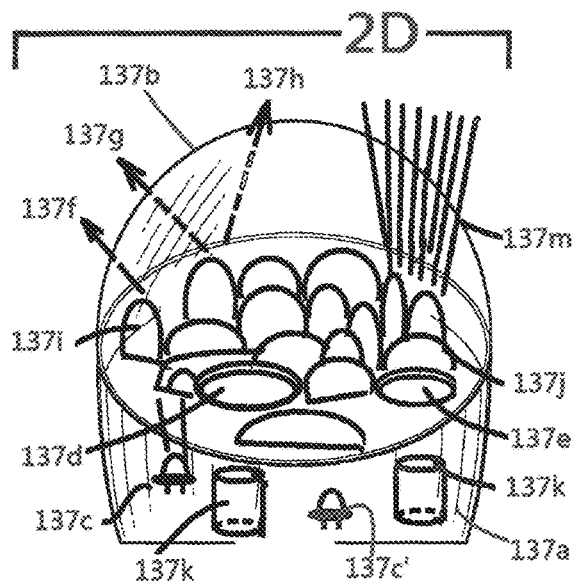
Fig. 2D
Fig. 2E
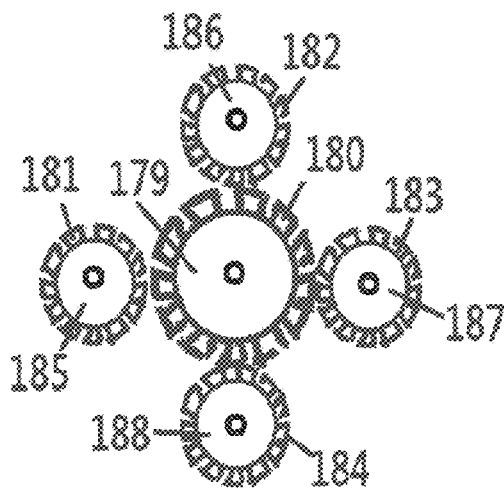
Fig. 2F
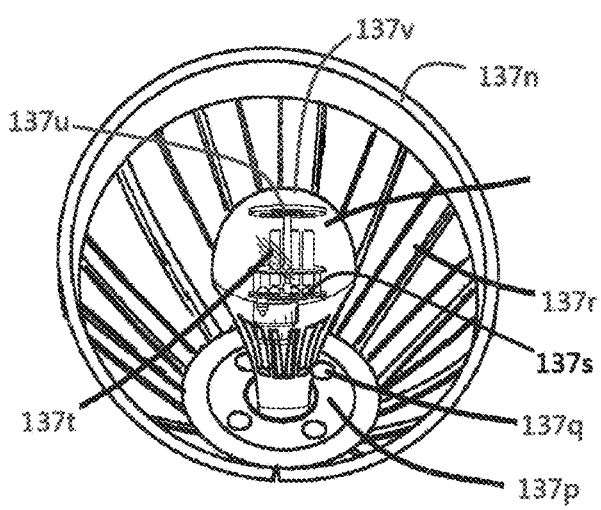
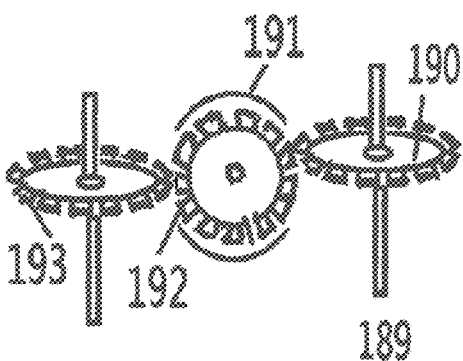
Fig. 2G

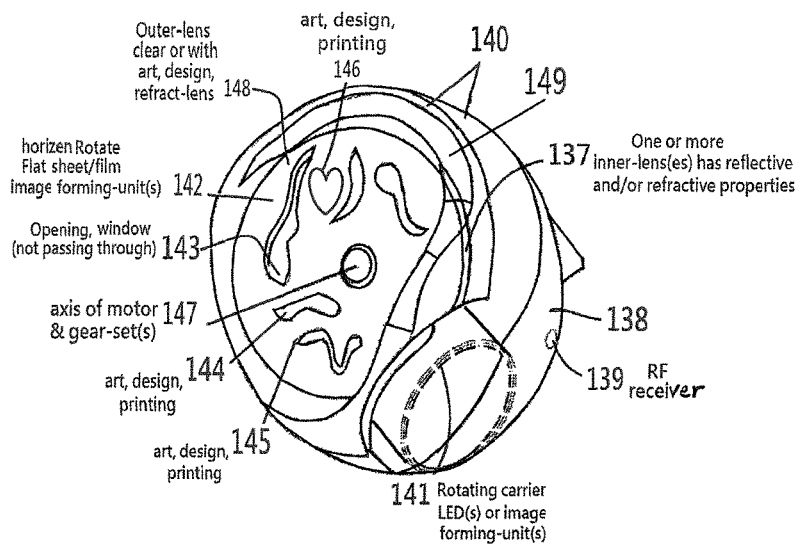
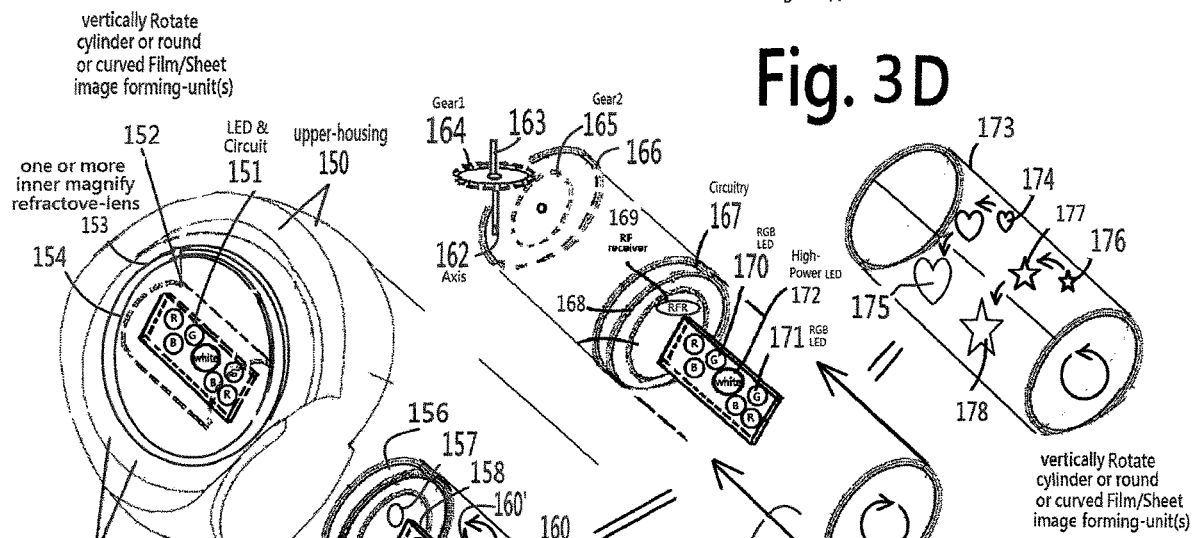
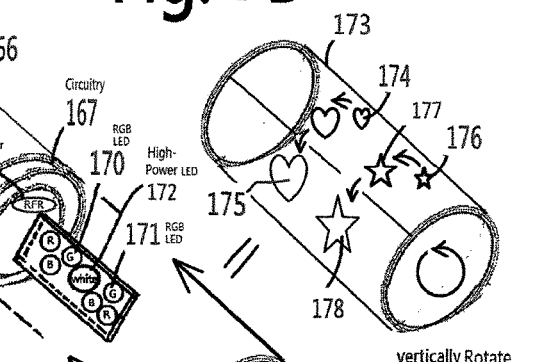
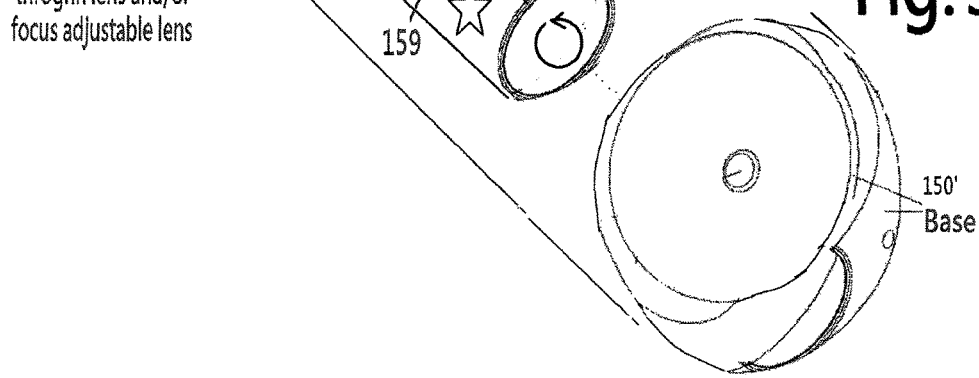

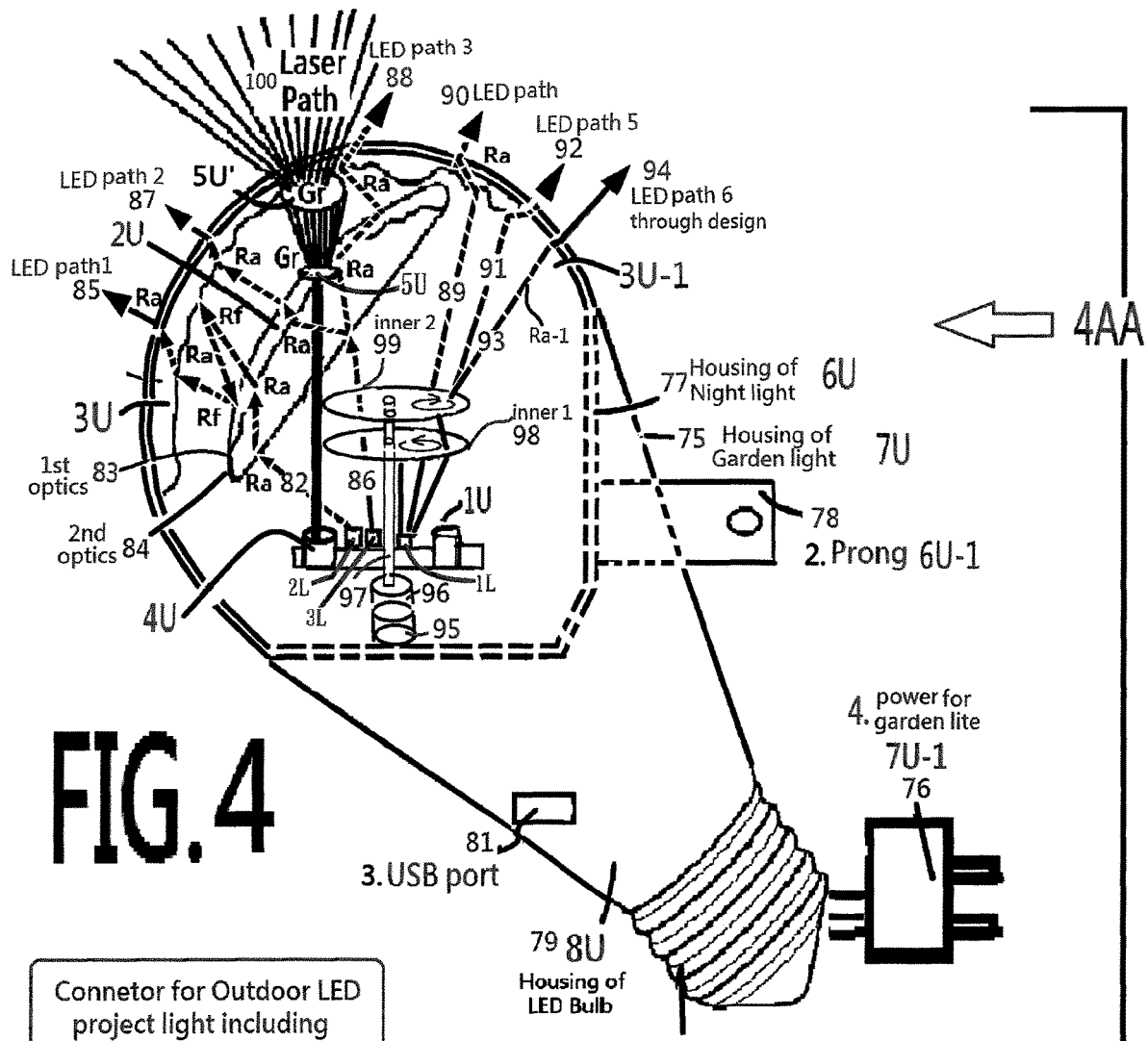

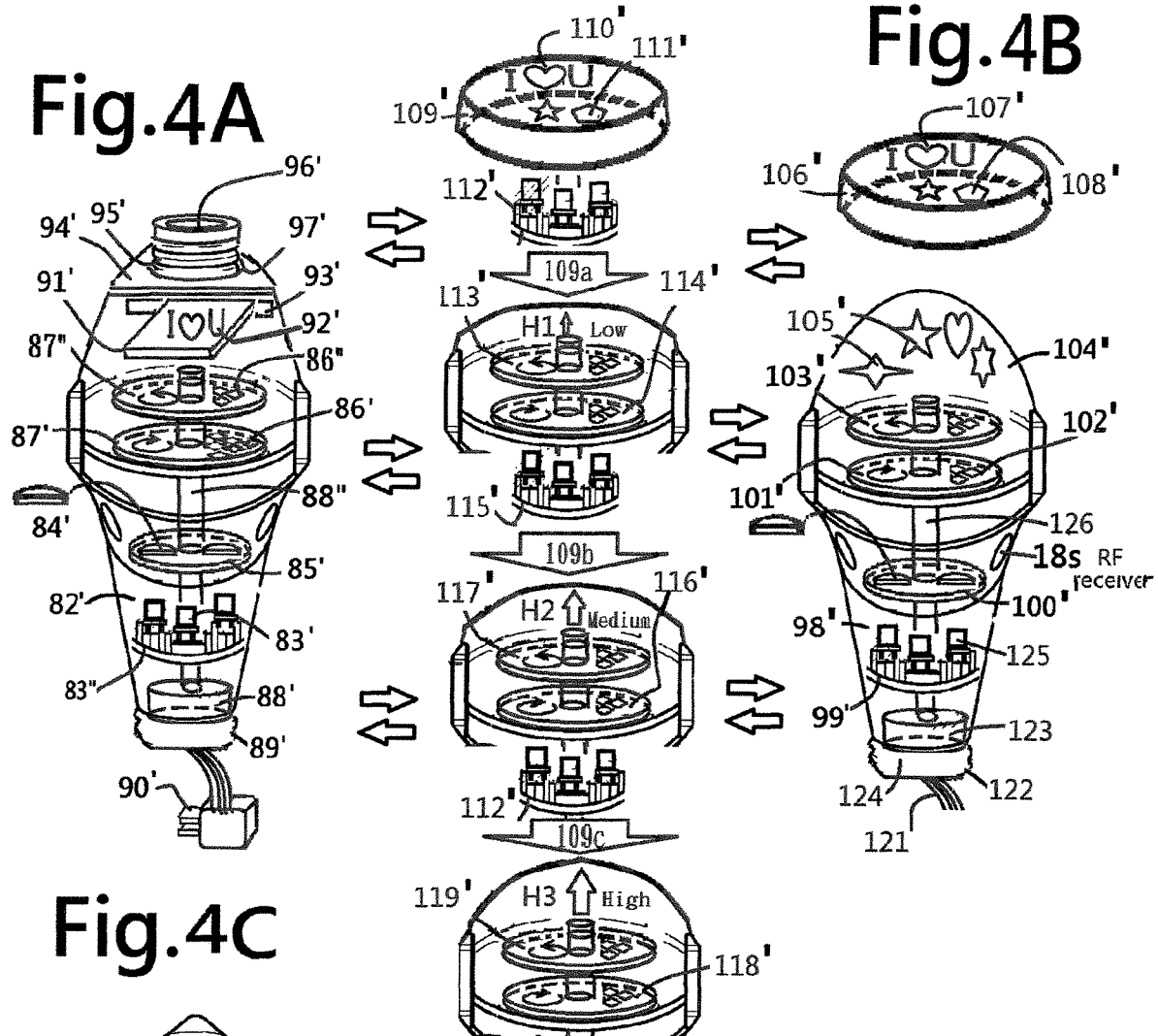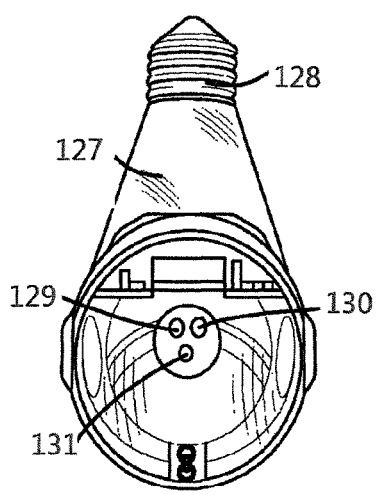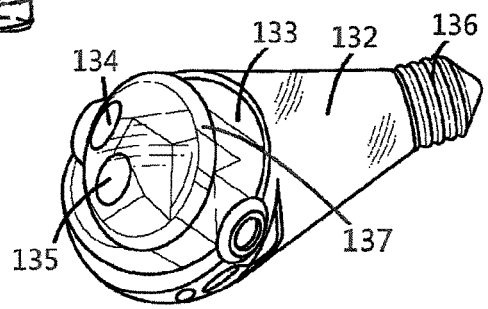

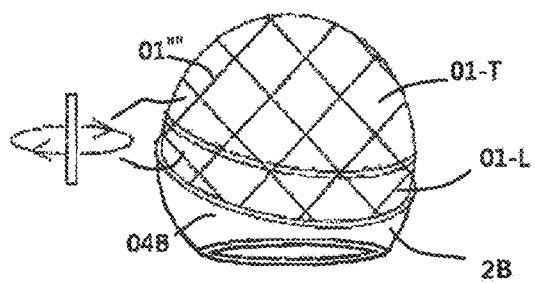
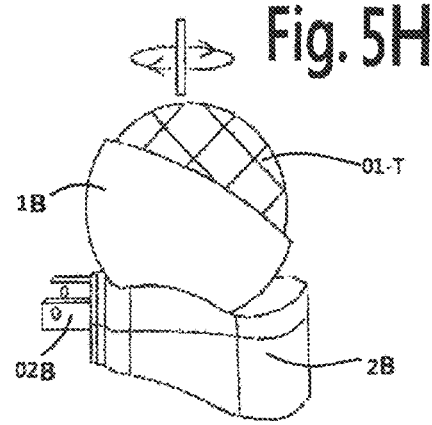
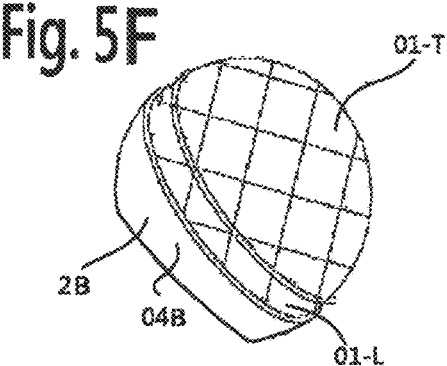
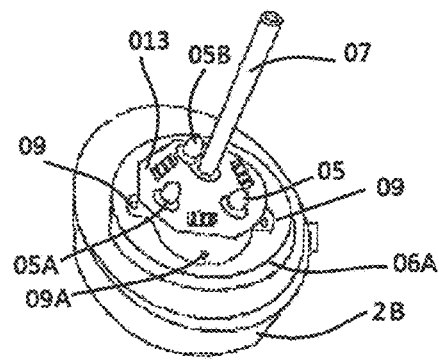
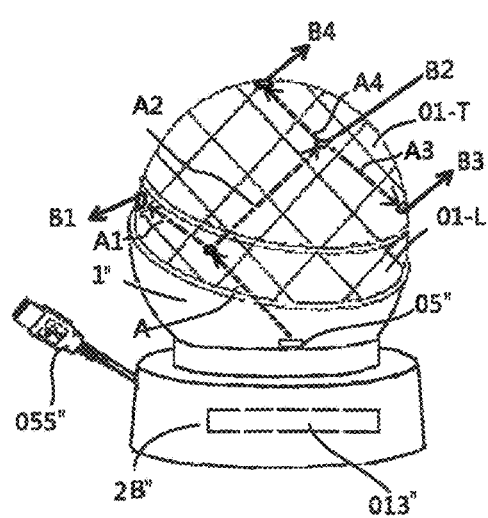
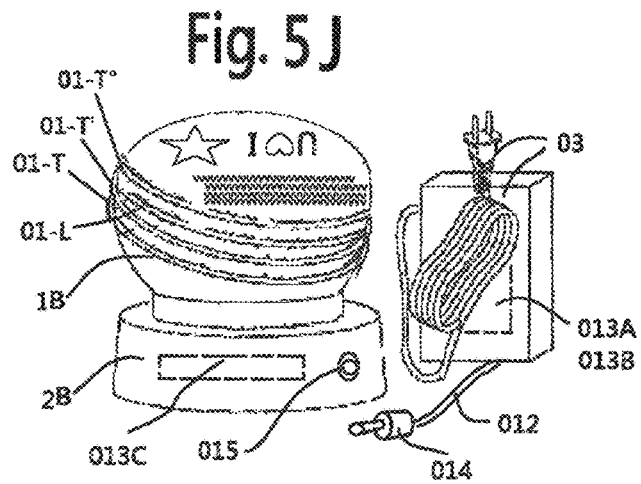

Patent Application Publication Nov. 19, 2009 Sheet1of7 US 2009/0284980 A1
Patent Application Publication Apr. 07, 2016 Sheet1of7 US 2016/0097499 A1 (# FF-4 ) Public data=Pending
Patent Application Publication Jan. 13, 2011 Sheet1of7 US 2011/0077496 A1 (#TT_2010) Public data=Pending
FIG. 6
FIG. 6B
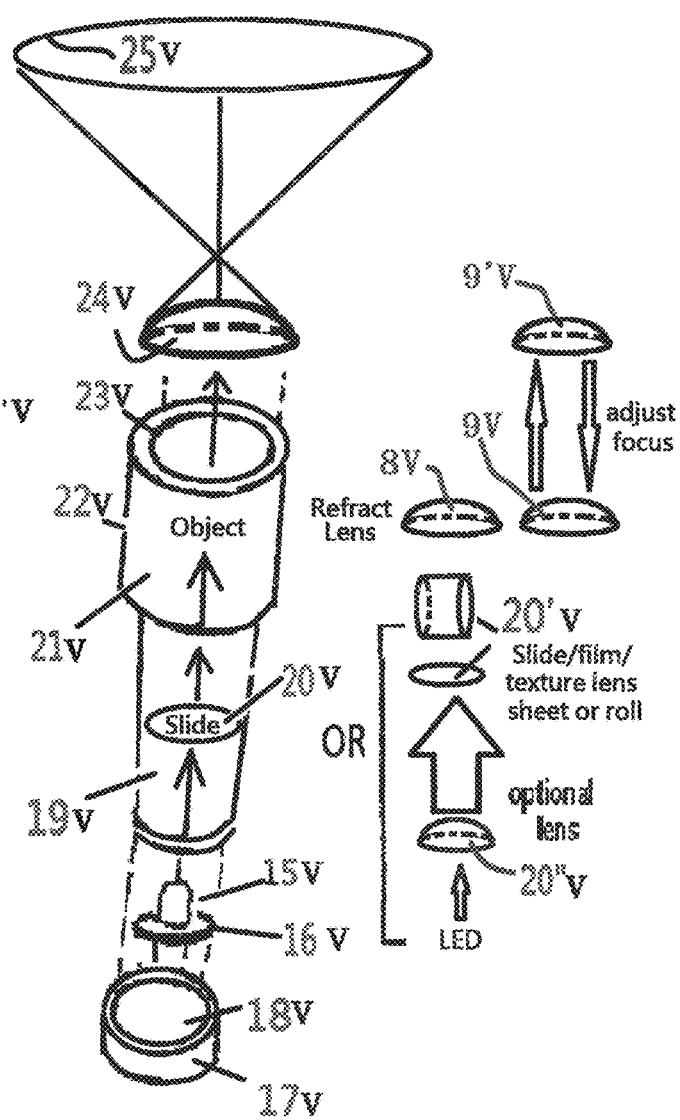
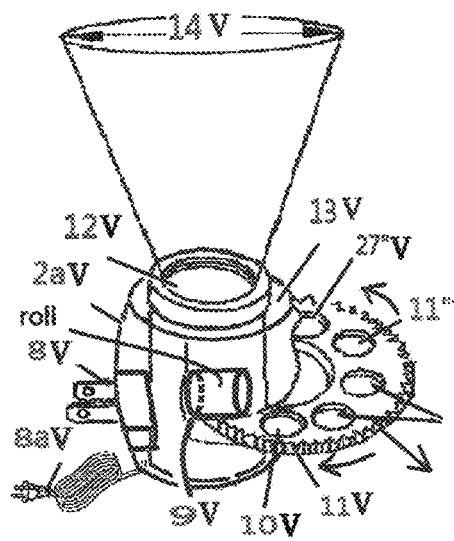
FIG. 6A
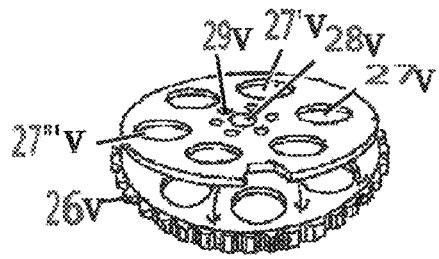
movable or rotate disc or holder to install plurality of film/slide/texture lens/image forming unit/ refractive or-and by manual or motor or rotate-kit

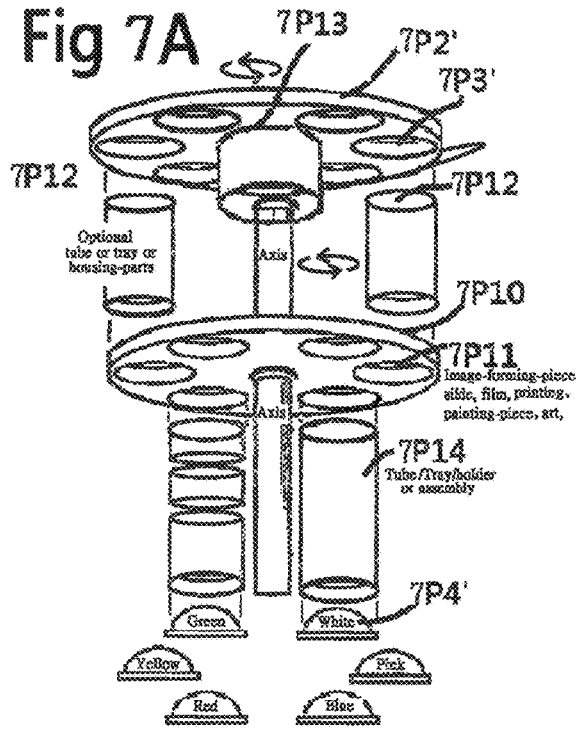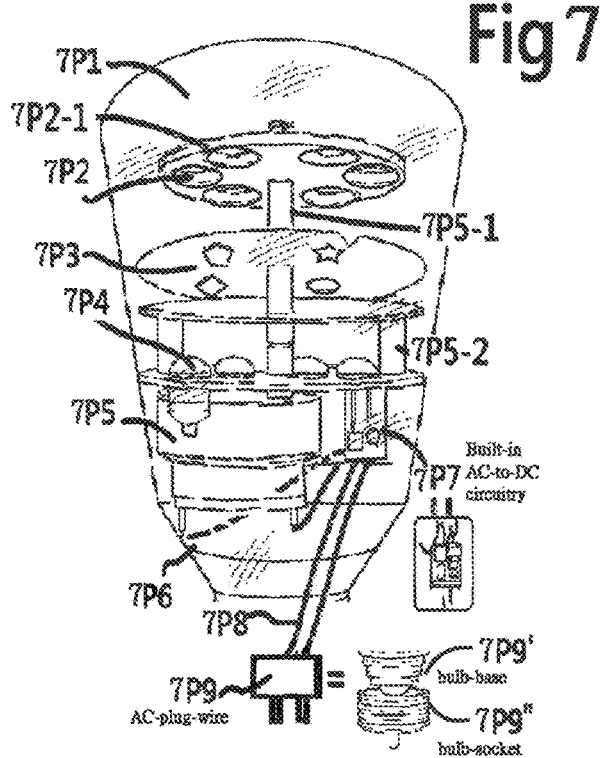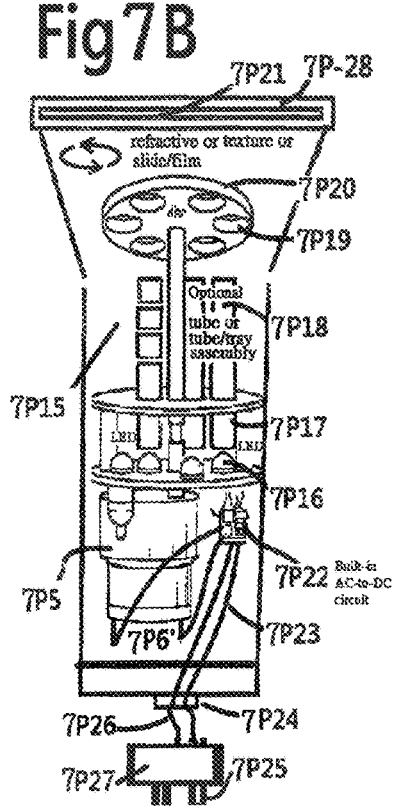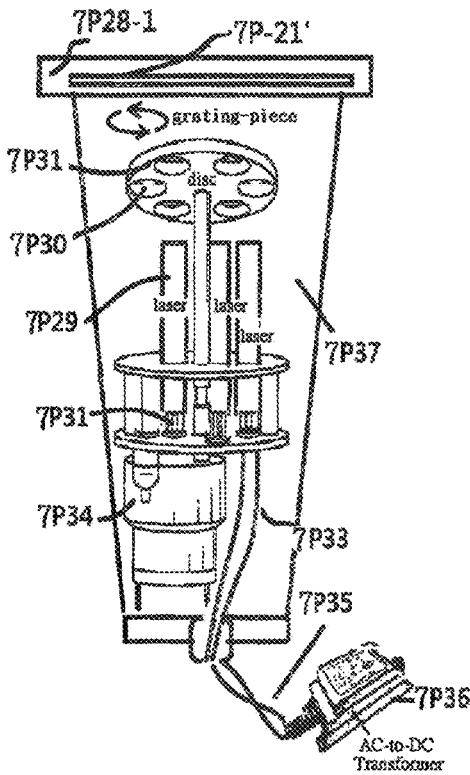

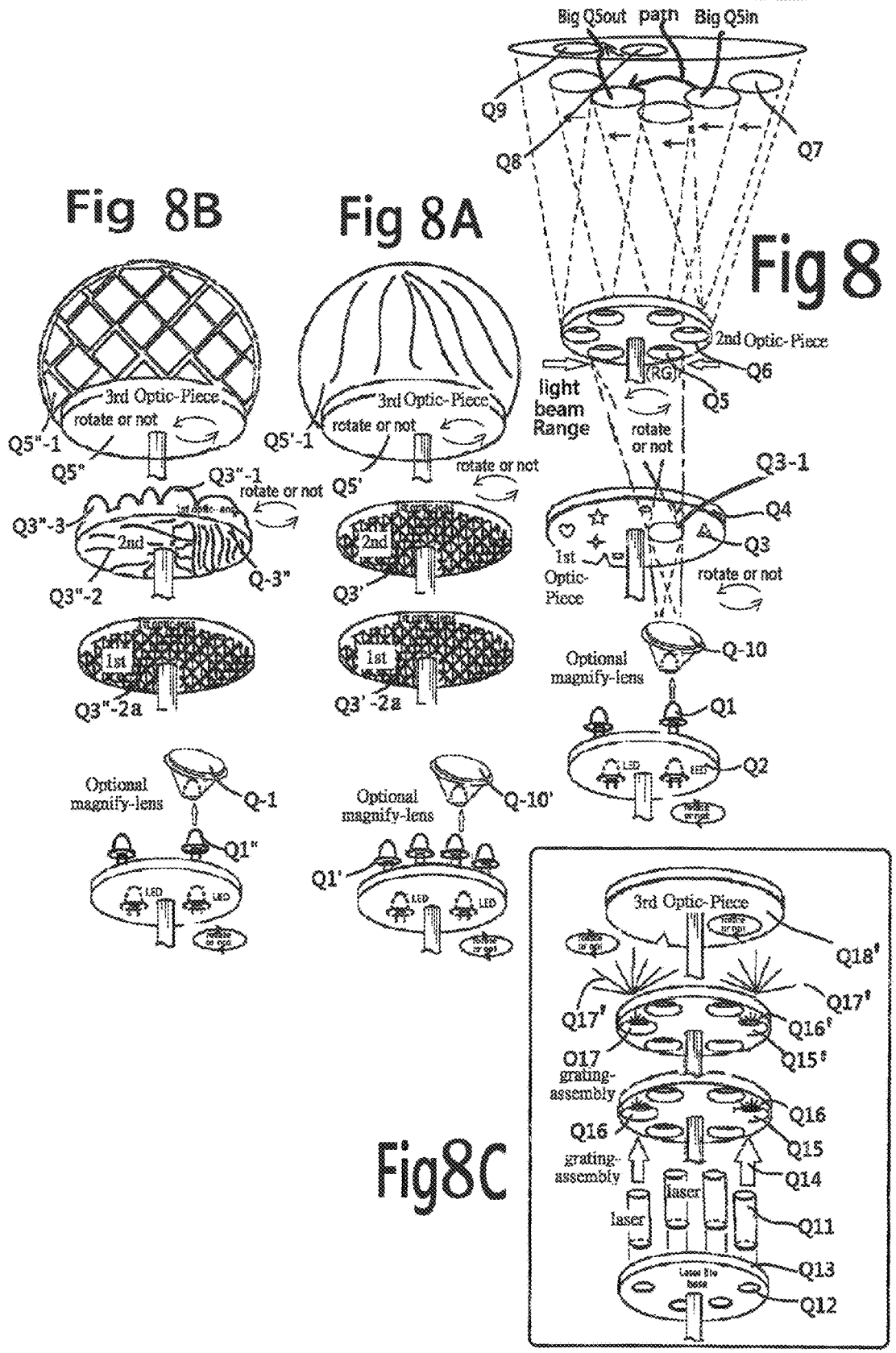

LED AND/OR LASER OUTDOOR PROJECTION LIGHT DEVICE HAVING MORE THAN ONE INNER AND/OR OUTER ROTATING OPTIC-PIECE TO CREATE MOVING, CHANGEABLE LIGHTED IMAGE AND/OR PATTERN

RELATED CO-PENDING US PATENTS (#FF-4) U.S. application Ser. No. 14/968,862, Filed on Dec. 14, 2015 which is Continue in Part of (#FF-3) U.S. application Ser. No. 14/539,267, Filed on Nov. 12, 2014 which is Continue in Part of (#FF-2) U.S. application Ser. No. 14/275,184, Filed on May 12, 2014 which is Continue in Part of (#FF-1) U.S. application Ser. No. 12-886,832 filed on Sep. 21, 2010 now is U.S. Pat. No. 8,721,160 which is CIP for filing of (#FF-2008) US application Ser. No. 12-318,470 filed on Dec. 30, 2008 now abandoned, which is Division for filing of which is Division for filing of (#Q-2007) U.S. application Ser. No. 11-806,284 Filed on Dec. 15, 2007 now is U.S. Pat. No. 7,630,004

In addition, the following U.S. patents show light devices having some features that are similar to and some that are different from the current invention:

This filing is Division filing of (#ZZZ-4) U.S. application Ser. No. 14/296,599 Filed on Oct. 18, 2016 which is Continue In Part filing of (#ZZZ-3) U.S. application Ser. No. 14/503,647 filed on Oct. 1, 2014 now is U.S. Pat. No. 9,719,654 which is Division filing of (#ZZZ-2) U.S. application Ser. No. 14/451,822 filed on Aug. 5, 2014, which is Continue In Part filing of (#ZZZ-1) U.S. application Ser. No. 14/323,318 filed on Jul. 3, 2014 which is Continue In Part filing of (#ZZZ-2013) U.S. application Ser. No. 14/023,889 filed on Sep. 11, 2013.

Related to the wider area image or project image night light or LED bulb or AC plug wire LED outdoor light with or without motor/spin/rotating kits for moving image.

This filing is Division filing of (#QQQ-7) U.S. application Ser. No. 15/494,477 filed on Apr. 24, 2017 which is continue in part of (#QQQ-6) U.S. application Ser. No. 15/355,515 filed on Nov. 18, 2016 which is continue in part of (#QQQ-5) U.S. application Ser. No. 15/341,782 filed on Nov. 2, 2016 which is continue in part of (#QQQ-4) U.S. application Ser. No. 15/348,218 filed on Nov. 10, 2016 which is continue in part of (#QQQ-3) U.S. application Ser. No. 14/983,993 filed on Dec. 30, 2015 Now is allowanced which is continue in part of (#QQQ-2) U.S. application Ser. No. 14/289,968 filed on May 29, 2014 Now is U.S. Pat. No. 9,551,477 which is continue in part of (#QQQ-1) U.S. application Ser. No. 14/280,865 filed on May 19, 2014 Now is U.S. Pat. No. 9,581,299 which is continue in part of (#QQQ-2012) U.S. application Ser. No. 13/540,728 filed on Jul. 3, 2012 now is U.S. Pat. No. 8,834,009 which is division filed of (#JJJ-1) U.S. application Ser. No. 13-296,469 Filed on Nov. 15, 2011 now is U.S. Pat. No. 8,711,216

This filing is Division filing of (#MMM-2) U.S. application Ser. No. 15/402,965 filed on Jan. 10, 2017 Which is continue in Part of (#MMM-1) U.S. application Ser. No. 14/606,242 filed on Jan. 27, 2015 now is U.S. Pat. No. 9,541,260 which is Continue in Part of (#MMM-12) U.S. application Ser. No. 13/367,758 filed on Feb. 7, 2012 now is U.S. Pat. No. 8,967,831.

Related for the LED Bulb has more than one area has illumination including head, body.

This filing is Division filing of (#JJJ-1) U.S. application Ser. No. 14/049,427 Filed May 22, 2014, now is U.S. Pat. No. 9,010,986 Apr. 21, 2015 issued, which is continue filing of (#JJJ-2011) U.S. application Ser. No. 13/296,508 Filed on Nov. 15, 2011. Now is U.S. Pat. No. 8,562,158 issued on Oct. 22, 2013.

Related the LED bulb has built-in Camera and storage-kits with multiple functions to replay, see by wired or wireless.

The current invention is Division or continuously filing for (#AAA-1) U.S. application Ser. No. which is Continue in Part of (#AAA) U.S. application Ser. No. 12/984,583, Filed on Now is U.S. Pat. No. 9,157,589 which is Continue in Part of (#TT-2) U.S. application Ser. No. 14/968,250, Filed on Dec. 14, 2015 which is Continue in Part of (#TT-1) U.S. application Ser. No. 14/944,953 Filed on Nov. 18, 2015 which is Continue in Part of (#TT-2010) U.S. application Ser. No. 12/866,832, Filed on Sep. 21, 2010 This is Division filing for Related to the wider area image or project image night light or LED bulb or AC plug wire LED outdoor light with or without motor/spin/rotating kits for moving image.

This is Division filing for (#11-2) U.S. application Ser. No. 13/540,689 filed on Jul. 3, 2012. Publication data US 2012-026-8668 dated on Oct. 25, 2012, Now is U.S. Pat. No. 8,511,877 issued date Aug. 20, 2013 v.s. Current parent (#QQQ-2012) U.S. application Ser. No. 13/540,728 filed on Jul. 3, 2012 now is U.S. Pat. No. 8,834,009 and (#ZZZ-2013) U.S. application Ser. No. 14/023,889 filed on Sep. 11, 2013. Which (#11-2) cover for all seasonal garden light and outdoor lighting.

This is continue in part of (#II-1) U.S. application Ser. No. 13/534,611 filed on Jun. 27, 2012, publication data US 2012/026-8947 dated on Oct. 25, 2012, now is U.S. Pat. No. 8,714,799 issued date May 6, 2014 v.s. Current parent (#QQQ-2012) U.S. application Ser. No. 13/540,728 filed on Jul. 3, 2012 now is U.S. Pat. No. 8,834,009 and (#ZZZ-2013) U.S. application Ser. No. 14/023,889 filed on Sep. 11, 2013. Which (#II-1) cover for all seasonal garden light and outdoor lighting.

This is continue in part of (#11-2009) U.S. application Ser. No. 12/624,621 filed on Nov. 24, 2009, publication data US2010/0214541 date Aug. 26, 2010, now is U.S. Pat. No. 8,303,150 Issued on Nov. 6, 2012 v.s. Current parent (#QQQ-2012) U.S. application Ser. No. 13/540,728 filed on Jul. 3, 2012 now is U.S. Pat. No. 8,834,009 and (#ZZ-2013) U.S. application Ser. No. 14/023,889 filed on Sep. 11, 2013. Which (#11-2009) cover for all seasonal garden light and outdoor light device(es).

This is Division filing for (#HH-2009) U. S. application Ser. No. 12-622,200 filed on Nov. 19, 2009, Publication data US 2010-102-8497 date on May 27, 2010 now is U.S. Pat. No. 8,434,927 issued date May 7, 2013 v.s. Current parent (#QQQ-2012) U.S. application Ser. No. 13/540,728 filed on Jul. 3, 2012 now is U.S. Pat. No. 8,834,009 and. (#ZZZ-2013) U.S. application Ser.

No. 14/023,889 filed on Sep. 11, 2013. Which (#11-2009) cover for all seasonal garden light and outdoor lights.

This is Division filing for

The current invention is continuous Filing or Division filing for U.S. Ser. No. (#ZZZ-3) 14/503,647 filed date Oct. 1, 2014 which is Continue Filing for U.S. Ser. No. (#ZZZ-2) 14/451,822 filed date Aug. 5, 2014 which is Continue Filing for U.S. Ser. No. (#ZZZ-1) 14/323,318 filed date Jul. 3, 2014 which is Continue Filing for U.S. Ser. No. (#ZZZ-2013) 14/023,889 filed date Sep. 11, 2013.

The current invention is continuous Filing or Division filing for U.S. Ser. No. (#QQQ-3) 14/983,993 filed date Dec. 30, 2015 which is Continue Filing for U.S. Ser. No. (#QQQ-2) 14/289,968 filed date May 29, 2014 which is Continue Filing for U.S. Ser. No. (#QQQ-1) 14/280,865 filed date May 19, 2014 (now allowanced) which is Continue Filing for U.S. Ser. No. (#QQQ-2012) 13/40,728 filed date Jul. 3, 2012 now is U.S. Pat. No. 8,834,009.

The current invention is continuous Filing or Division filing for U.S. Ser. No. (#MMM-1) 14/606,642 filed date Dec. 30, 2015 which is Continue Filing for US series number (#MMM-2012) 13/367,758 filed date Feb. 7, 2012 Now is U.S. Pat. No. 8,967,831.

The current invention is continuous Filing or Division filing for U.S. Ser. No. (#JJJ-1) 14/049,427 filed date Oct. 9, 2013 (now is U.S. Pat. No. 9,010,508) which is Continue Filing for US series number (#JJJ-2011) 13/296,508 filed date Nov. 15, 2011 now is U.S. Pat. No. 8,562,158.

BACKGROUND

In the U.S. Market, there are some incandescent-bulb light device that had bulky shape and large sizes with heat-issue to melt the front film or slide, or some LED light-device for hand-held with incandescent bulb for very low brightness because it not allow to have high-power bulb for big power consumption for limited battery capacity, or other bulky LED light; these items do not have more than one optics-lens to get multiple times reflected and/or refracted LED and/or laser light-beam through image-forming-piece and optic-lens with motor related mechanics to show and project images or any information towards the outdoor location including the garden, fence, garage door, front door, building, home, or wall. However, all these items are overpriced and not technically compact enough to be a good item in this market.

(Feature 1)

The current invention is designed mainly to design for outdoor LED and/or laser garden, seasonal, holiday projection lights with no-heat, compact-size, super brightness LED which has white LED and high-brightness available since 2005 so had the high-brightness white LED then can lighted the colorful film, slide, image-forming-piece for full colors while apply the update super brightness white LED for projection colorful image and/or patterns with LED compact-size and no-heat features to overcome the some US out-of-date prior arts including US prior art including:

U.S. Pat. No. 5,517,264 Sutton for super heat incandescent bulb which will melt the top film or slide and also have the side light to share the incandescent bulb brightness so it is too dim for make ceiling projection, 1: The '264 shape is television shaped night light (Abstract line 5 and line 7)→The current invention (add limitation for cylinder or tubular shape).→The current invention DO NOT have (display panel for side).

2: The '264 is the One of housing→The current invention has the two or more parts has upper and lower housing parts. The refractive lens is install on under the upper housing-parts and top of lower positioned tube or tube-assembly or housing→Claim been add the limitation very clear.

3: The '264 is radiation incandescent bulb is powered by AC power source with heat and will melt the top position film or slide→so, Sutton '264 is not practically and will catch fire→The current invention use non-heat, non-radiation LED light source.

4-3: The '264 without any circuit needed→The current invention has clear said AC-to-DC circuit to get DC current from this circuit and circuitry.

4: The '264 do not teach adjustable image angle, position, orientation→current invention had this features so can project image to wall or change to ceiling or change to garage door or change to outdoor building.

And

U.S. Pat. No. 5,321,449 Coco for hand held flashlight with the film and incandescent bulb 20 and power by batteries to make project as technical study and theory the said incandescent bulb is radiation light source and the light-beam spread-out to 360 degree and also brightness is not enough for the hand-held device because '449 use very high-brightness for hand-held device for too high-heat will delivery to plastic-material flashlight for melting or metal material flashlight to more quickly delivery heat to handle-bar. So this is not practically for LED light-source for outlet connection which need AC-to-DC circuit to get LED need DC current.

U.S. Pat. No. 6,431,719 Lau teach a LED night light and display the image on the front surface which is not same as current invention for outdoor LED and/or laser project light which see the image on the outdoor building, house, garage door, garden, fence.

Compare with the US prior-art as below;

(1) U.S. Pat. No. 7,390,092=(Belliveau)=U.S. Ser. No. 10/290,660=Filed on Nov. 8, 20012

(Image project lighting device with visible and infra-Red image)

1-a: From Detail description (Column line 6)→The '092 Belliveau teach

"An Apparatus 10 comprised of a central controller 150, a communication interface 138, and IPLE (image projection lighting device) 102, an IPLD 104, and an IPLD 106. The IPLEDs 102, 104, and 106 are electrically connected by communication lines 142, 144, and 146, respectively, to the communication interface 138. The communication interface 138 is electrically connected to the central controller 150 by communication line 136. The central controller 150 may be a dedicated control console or personal computer system.

The IPLDs, 102, 104 and 106 are shown for simple example, although many more IPLDs such as for examples thirty IPLDS each one like any one of 102, 104, and 106 could be use in a lighting system or apparatus, such as apparatus 10. The communication interface 138 may be a router or hub as known in the communications art."

Compare with current invention:

1-b: The current invention only one LED and image-forming piece (slide/film or digital image related displayer) and LED light-beam passing through the said image forming piece to formed lighted image and go through top refractive lens to spread out to big areas shown on indoor or outdoor surface→'932 has camera and central controller and interface those is not use for current invention.

1-c: The current invention has the Top for LED and image-forming piece and refractive lens is fit into upper housing-parts of the said LED light and the said AC-to-DC circuit and conductive prong or AC-plug-wire is fit within the lower housing-part to form one product.→Not same as '092 have many wires to connect with the said IPLDs even up to 30 units.

1-d: The current invention has the said AC-to-DC circuitry or circuit to supply DC current to LED light source→This is not existing on the said '092 text Conclusion→The '092 is nothing to do with current invention for any concept, (2) U.S. Pat. No. 6,199,999=(Cotton)=U.S. Ser. No. 09/203, 056=Filed on Dec. 1, 1998

(Lighting system for Theater seating)

2-a: From Abstract description→The '999 teach "A lighting system for use in areas or low-level lighting, such as a planetarium, theater, museum, or auditorium, which improve visibility of objects without detracting from the overall desired low-level lighting."→So '999 is to install and fit within the back of seat which is not movable and connect by prong or AC-plug-wire and people can move to insert into any location outlet for illumination purpose.

Compare with current invention→

2-b: 1-b: The current invention only one LED and image-forming piece (slide/film or digital image related displayer) and LED light-beam passing through the said image forming piece to formed lighted image and go through top refractive lens to spread out to big areas shown on indoor or outdoor surface.→'999 has no such arrangement for crating the image to project far away surface.

2-c: The current invention has the Top for LED and image-forming piece and refractive lens is fit into upper housing-parts of the said LED light and the said AC-to-DC circuit and conductive prong or AC-plug-wire is fit within the lower housing-part to form one product and can plug into any location outlet or connect with AC power source by AC-plug-wire.→Not same as '999 have only built-in the seat related products which is fix there forever not movable and no prong or no AC-plug-wire to connected with outlet.

2-d: The current invention has the said AC-to-DC circuitry or circuit to supply DC current to LED light source→The '999 has no such circuit because 1988 has no any white LED or any brighter LED available at market to create the good projection such as '999 the light source 47, 9a, 9b, 27 and 36 is one of bulb.

2-e: The current invention product is freely move and can fit into any outlet

The said '999 which is install fit within the seat back as Column 3 Line 6 "Which the lighting system 8 is attached to the back 7, the lighting system 8 can also comprises a light source 9a which is depicted as being associated with the support 11, the cover 10 blocks light emitted upwardly from the light source 9a but permits light emitted downwardly toward the ground 6 to escape the light system."→The current invention is to project light to upward to ceiling or emit to far away walls or both . . . . So this is totally different application for products.

Conclusion→The '999 is nothing to do with current invention for any concept, (3) U.S. Pat. No. 5,517,264=(Sutton)=U.S. Ser. No. 281, 016=Filed on Jul. 27, 1994

(Projector Night Light)

3-1: The '264 shape is television shaped night light (Abstract line 5 and line 7)→The current invention do not have display panel for side.

3-2: The '264 is the One of housing→The current invention has the two or more parts has upper and lower housing parts shown on FIGS. 1, 2, 2-1, 2-2, 3, 4, 5, 5-1, 6, 7, 7-1, 7-2, 8, 9, 10, 10A to 10C, 11, 12, 12A, 13, 14, 15, 16, 17, 18, 19, 20, 21, 24, 26, 27, 28, 30, 30A, 30B, 31, 32, 33, 34A, 34B, 35, 36, 37, 38, 39,40, 41, 42, 43, 44, 45, 47, 56, 57, 58, 59, 60, 61, 62, 63, 65, 67 and 68. And the refractive lens is installed on under the upper-area of housing-parts and on top-areas of lower positioned inner-tube or inner tube-assembly or housing-parts.

3-3: The '264 is radiation incandescent bulb is powered by AC power source with heat and will melt the top position film or slide→so, Sutton '264 is not practically and will catch fire→The current invention use non-heat, non-radiation LED light source.

3-4: The '264 without any circuit needed→The current invention has clear said AC-to-DC circuit to get DC current from this circuit and circuitry.

3-5: The '264 do not teach adjustable image angle, position, orientation→The current invention had this features so can project image to wall or change to ceiling or change to garage door or change to outdoor building.

The current optics-lens (Magnify or refractive lens). This install on the high portion of housing location or-and the said top-area of inner or lower position tube or tube-set or housing. This is shown on current invention drawing FIGS. 56, 57, 58, 59 and other drawings Compare with '264 which all the lens is lower or recess than the TOP of the Tube or Housing. '264 drawing the big-Image will be limited because the tube or housing wall is HIGHER than magnify lens.==> This is what '264 DO NOT UNDERSTAND THE OPTICS AT ALL.

3-6. The current invention also teach

The current project LED light (Not limited to Night Light, it should be cover all indoor and outdoor project light with current invention simple optics-arrangement).

The current invention teach some applications has movable or rotatable (As FIGS. 47, 56, 58, 60, 61, 65, 68, 68A, 68B to move adjust parts or housing or image-carries(s), optic-piece(s) to make the said housing or-and project-assembly or-and image-forming element or-and optics-lens to MOVED, ROTATED, ADJUSTABLE to make the enlarge image to change or moved to other location→This also '264 did not have any discussion at all.

3-8→Movable or rotatable or adjustable

The current invention has join-arms or bar or pole or ears or joint-kit to make the said movable or rotatable or adjustable function and (From FIG. 62 shown the current invention without the wires twisted together or damaged arrangement) . . . . Same As shown on the FIGS. 56, 57, 58, 59 . . . etc.→

Compare with '264 which has nothing can change the enlarge image or patterns or light-beam shown on locations because '264 do not have such constructions.

3-9: location for refractive optics-lens

The current invention the said refractive project optics-lens location is big difference with 2264 fact from current invention FIGS. 56, 57, 58, 59 show the Lens (4*e*) and (5*e*) both is on the front of tube or top of inner tube or tube-assembly . . . . It is so clear the optic-lens is NOT INSIDE THE TUBE.

These are major different which '264 have a lot of optics-lens is fit within or inside the tube which also lower than surrounding housing, so the light-beam will be limited to the tube inner diameter and light do not spread-out as the current invention . . . .

3-7: The '264 prior arts compare with the current invention for below other (7 features) vs '264

Examiner already point out the difference:

| Parts: | Saltoon '264 | Current Invention |
|---|---|---|
| 1. Light source | use Bulb which is radiation light source from inside filament and light beam spread out everywhere for 360 degree illumination | LED has limited light beam emit angle such as 30 degree |
| 2. Circuit | work direct with AC current no need any circuit | Need AC-to-DC current to meet DC operated LED to work |
| | The Problem for '264 and current invention solve these 7 by its features | |
| (1) Heat & Parts | 264 use Bulb which is high temperatures light source, which almost get over 80 degree (C) and will accumulated since bulb is turn-on and start to accumulated. So '264 bulb heat will need to use Non-Plastic material items (slide 412 and in-out lens 414/415) top of the bulb because all heat is flow to upper and '264 device is put all the parts on top, so the heat will up to 80 or more higher. This means Top items (slide 412 and in-out lens 414/415) do not (1) Plastic injection Lens (2) Do not be Film or slide which made by plastic subtracts. This will caused the any plastic-object deforming of melt. So this is why Bulb project never show at market. Salton FIG. 4 + 5 + 6 is not possible to has slide (412) put in-front of the Bulb because in-earth not existing such slide (412) can in front of bulb (market all Night light bulb glass around 3 inch v.s. ¼ of bulb glass-body). The ¾ inch distance between Bulb to slide --> In earth no such technical can make out slide till today. | The current invention use LED because LED is cool light source. The current to project cartoon image which need use the plastic lens and film/slide which all made by plastic. Especially the full colorful cartoon image which need use film or slide so can project out the real image. There is no any replaceable film or slide from current technical and this is '264 do not do at all while use Bulb high-heat light source. ==> Solution: The current invention claim add the Plastic material for (a) image carrier (b) the lens is plastic injection piece to over come the '264 |
| (2) Light source v.s. light path | 264 use Bulb as light source which is radiation light cover 360 degree all over the inside of housing which the top of bulb light brightness is so limited so '264 has the top and side to illuminated the TOP and SIDE display, this is why '264 need a reflector (407) to try to get more light reflected to top but it will not all light into the slide carrier (412) and image (103). | The current invention use LED which has narrow angle for light emit direction so can make all LED light beam emit into tube or-and tube-like housing (corn or cylinder shape). Key at the almost all the light beam is emit into the plastic material image-carrier not like '264 only maybe 15% (top arc of bulb) emit into image carrier. |
| (3) Light source vs product size | The C7 bulb glass size is around a cigarette light length 3-4 inch which is very long unit already + too hot so do not install any '264 claim (transparent film has image recorded) or image (103) because distance from '264 should be less then ¾ inch. Because the Bulb is too hot, so all '264 top of housing may need use fiber or super expensive anti-heat plastic + big distance from bulb to arrange lens frame or non-plastic image-forming units. This is too big to cause | The current invention use the LED light source which fit into front tube or fit-within the tube-like housing which all light beam is almost 100% inside because LED is fit into or |

-continued

| Parts: | Saltoon '264 | Current Invention |
|---|---|---|
| | the light device too much weight so prong of night light do not insert into outlet well and not-fall apart. | emit into or fit within the tube or tube-like housing. Because it is cool light so no any damage the any frame, parts, holder for image-forming unit or the said plastic-lens or plastic film or slide. V.S. '264 add the plastic material for the (a) holder or frame to hold image forming or film or slide (b) clear said the LED is fit-into or-and emit-to or-and fit-within the said tube or-and tube-like housing. |
| (4) Optics theory and concept and lens arrangement Big Difference | '264 has a (project system) different with current invention as below:<br>(A) '264 has more than one lens (414) (415) for image input and image output lens which is different optics theory as the current invention including;<br>(1) has the simple one refractive-project top optics-lens which has the refractive-theory which only need one piece and the MOST IMPORTANT<br>(2) CURRENT INVENTION THE ONLY ONE top refractive project OPTIC-LENS is LOCATED ON TOP-AREA of the Light housing (FIG. 2 Detail description (0048) line 4 to Line 6 "The night light has a top body (2m) with an opening (2e) to allow the telesocping optic-mens (2d) lens (2k) to be installed and project . . . "<br>Same as FIG. 3 has opening (3c) on top-area of housing to be installed the optics-lens (3m) => which means magnify-lens is on housing top-area location or top-areas or the inner tube or inner-housing) >==> this make the Projected image can spread-out to wider areas like current invention can do. V.S. '264 to arrange Image-in (414) or image-out (415)<br>(a) deep inside FIG. 6 (Further more image been block out by top frame), or<br>(b) lower than the top surface FIG. 4 and FIG. 10 (image will limited size) so<br>(c) '264 All image size out of the night light will be same size of the '264 claim's "same size of the project-system diameter", so NEVER CAN SPREAD OUT like the current-invention optic-lens ON TOP-areas SURFACE as FIG. 2 (2e) and FIG. 3 (3d) and FIG. 4 (4e) and FIG. 5 (5e) shown on current invention==><br>This is Totally different for the optics-arrangement and optics-result to get wider spread-out image on ceiling! NOT SAME AS '264 all the image in (414) or image-out (415) is deep inside or far-away from top-surface of the Night light | This is totally different design on the Optics. In spite of (1) the other Liu's LED night light or (2) Not majority light into Image-forming or image-carrier, or (3) no AC-to-DC circuit, or (4) High-heat to destroy the slide (text of '264) or transparent film (claim of '264) Both proof is the FILM or SLIDE made of plastic which equal the '264 is not workable concept - Invalid at all, or (5) Totally different optics-lens arrangement to get different image projected concept, construction, and result, or (6) One top project piece optics-lens on housing top-area or above inner tube or the inner-housing position v.s. deep or below the top openings, or (7) cost different, assembly different, optic-theory difference. or (8) Big difference for optics-arrangement which is the most important for projection light which The Optics-design and arrangement is key to make the seasonal image to show out. ==> Basing on these (8) major difference for current fiing for (UTILITY PATENT) which only need 1 or 2 different on concept, construction, |

| Parts: | Saltoon '264 | Current Invention |
|---|---|---|
| | | circuit, design, Optics-lens number, or optics-theory, or optics-locations, or optics-result should get allowed. |
| (5) Otpics theory and concept and lens arrangement Big Difference | (d) The '264 lens is make all image go through the 1st image input lens (414) to make all light input to spread-out and go through the 2nd image out-lens which means spread-out wider image to into 2nd optic-lens and spread-out again. This will make image touched or make image is not clear enough. The current invention only use 1 ps of top refractive project optics-lens or outer-cover which is double curved so can make the clear image and simple construction and lower cost especially not MELT or DEFORMING than the '264 FIG. 4 and FIG. 5 for 2 optics-lens. Plug the FIG. 6 is more different for focus adjustment lens need to use 3 pcs or lens and it even more worese the image came out from slide (142) is deviated and part of light is BLOCKED by top (Fram or parts). This is ridiculos optic-design and also too costly than the current invention. (e) . . . More important '264 has 2 or more optics-lens on FIG. 5 and FIG. 6 and FIG. 10 not install on top or above the housing, These are different optics-constrution and theory and arrangement with current invention for optics-result, cost, construction, concept, physics theory. Further move the '264 FIG. 6.. So this is why the '264 claim have to said the image need go through the project-system. Not like current invention only 1pcs of double-sides curved optics-lens is enough and better design. | |
| (6) Rotating feature v.s '264 Fix project direction | 264 unit or design is for fixed project directioin. The current invention has the ball or sphere or low-high dome shape outer-cover or optics-lens to load the "project LED + iamge-carrier or displayer + Top surface has refractive lens" inside so while force apply to the ball or sphere will also change the project direction ==> This is never been found by examiner for this unique "ROTATABLE OR ADJUSTABLE THE PROJECT ASSEMBLY OR PROJECTED IMAGE DIRECTION" && "The current invention need all constrution for make the electric deliver to inside ball FIG. 4 and FIG. 5" && "The current invention has consturction to make the ball movable or rotatable which need extened into main-body housing FIG. 4 & FIG. 5" same as show on current invention show the wires(4f) (4g) (4h) (4i) from Main-Body to passing through the JOINT-EARS and rotatable connector or contactors (4g) (4h) (4g') (4h')of ball and connect with inner LED's electric poles FIG. 4 and FIG. 5" . . . These are shown on the current invention drawing.. Which are totally different construction and total different arrangement and totally different result to make the movable or rotatable for the project-image device than '264, The current all these movable or rotatable features so can project image to ceiling or wall.. Not like '264 only to ceiling for project image. | |
| (7) Image carrier | The '264 claim on text no any details description only said (103) slide holder. At the Claim said "Transparent film has image recorded" which can prove it is "Plastic" and within that ¾ inch distance (Compare with Glass top of C7 Bulb which is 3 inch long, from drawing slide holder is within the ½ to ¾ inch) which prove the film will be deforming and melt or too hot cause the "record image" been vanish because it "film or slide" chemical very sensitive to the heat. This equal said '264 patent is not workable item while use C7 bulb which accumulated heat up to 80-100 degree Centigrade so it will melt every plastic or film even PC film. so this is why the current invention is ONLY WAY to use LED cool light source . . . This is major issued offer evidence for '264 is not workable and not equivalent for LED light source. | |

-continued

| Parts: | Saltoon '264 | Current Invention |
|---|---|---|
| (8) Movable or rotatable or adjustable parts or housing to change or more or adjust the enlarge image | From '264 details description or drawing show nothing for these "Movable or rotatable or adjustable parts or housing to change or more or adjust the enlarge image". (1) From Current invention FIG. 4 and FIG. 5 show very clear the wire-arrangement and Pole/ear for ball housing to make rotating along the 2 ears. (2) Also show the wire (4f) (4g) (4h) (4i)arrangement from base into rotating or movable ball housing, (3) Also shown the rotating contactor (4g) (4h) (4g) (4h') it will not tringle-together for wires while make a rotating or move of ball as FIG. 4 and FIG. 5. (4) Also from FIG. 2 and FIG. 3 show how to make the enlarge image to change or adjust or move by rotating, movable disc which can install plurality of image-forming or optics-lens. (5) The Abstract discussed the (Magnify optic-lens) and (Bigger image) which show very clear the project image is from (SMALL --> Enlarge to Bigger image by Magnify optics-lens) . . . Which it install on OPENING of TOP HOUSING . . . Not inside tube as '264 !! (4) These are all the current invention disclosure and the said '264 never show there really features for projectable. | |

(4) U.S. Pat. No. 5,535,230=(Abe)=U.S. Ser. No. 368,552=Filed on Jan. 3, 1995
(Illuminating light source device using semiconductor laser element)
4-1: The '230 Abe laser illuminating light which is use for a vibrating place or a portion where an electric lamp is hardly exchangeable for new one→This is totally not same as current laser project light for outdoor to present the desired lighted-image, lighted-pattern, light-beam for everyday or seasonal time where has no vibration or difficult replace.
4-2: The '230 laser semiconductor element mainly for outputting a laser beam of a particular wavelength in the range from infra-red ray to ultraviolet ray=> This is different with current invention to use simple Red, or Green or Blue laser light beam go through the grating-piece (Detail definition of grating-piece list on below Big text for definition).→The current invention do not change any wavelength for input laser light-beam to output end. So this is different.
4-3: '230 laser to change the wavelength from infra-Red range to Ultra-violet ray→The current invention is keep same wavelength laser input light-beam go through the said diffractive-piece in flat or coiled roll or folded or any geometric shape to allow the single high-wattage laser-beam split or divide into plurality desired shaped-image, shaped-patterns, shaped light-beams.
⇨ Conclusion: The totally different wavelength change by semiconductor as '230 compare with current invention for only make one laser light-beam go through the diffractive grating-piece is totally different physics theory and one is Apple one is Noodle . . . . Totally different and no any similar concept, construction, electric or physical at all.
(5) U.S. Pat. No. 5,926,440=(Chien)=U.S. Pat. No. 08,923,988=Filed Sep. 5, 1997
(Electro-luminescent night light and time piece)
5-a: The '440 is same inventor prior art for the "Electro-luminescent light source (EL)" The said EL is powered by AC (Alternative current) so no need any AC-to-DC circuitry or circuit to make the illumination.
⇨ The current invention have the different light source with the said LED light source that is powered by DC (Direct current) so need AC-to-DC circuitry or circuit to make the LED for illumination.
5-b: The '440 is one unit sealed inside one housing-part and all the EL light-beam is For back-light the front clock-arms or LCD displayer screen to show out time related message to people and also offer light for dark environment. There is no any magnify or refractive-lens to project image or pattern or both to outside the said EL time piece light unit.
⇨ The current invention has the upper housing parts has the project-assembly Including LED to emit light-beam to front image forming-piece to form the miniature lighted patterns or image or both to go through the front or top refractive-lens to magnify and project to outside wider areas including ceiling and the said far-away wall or floor or all areas for indoor or outdoor.
Conclusion 7
So, '4440 is totally different light source, different (1) current operated light source, (2) application, (3) different light-effects for back-light and far-away distance image or patterns or both projection (4) different construction for sealed-unit (5) housing can adjustable angle for lighted patterns or image or both (6) different housing number for one sealed-unit v.s. current invention for upper and lower housing-parts.
So, the '440 co-inventor's prior art is totally different with current invention.
(6) US 2005-009-4388=(Botty)=U.S. Pat. No. 10,699,251=Filed Oct. 31, 2003
(Dual-Beam Lantern-flashlight)
6-1: Booty '388 teach one hand-held lantern have front end light (20) and rear bottom light (29) also act as a handle-bar (22) which also is a battery compartment.
⇨ The current invention is
⇨ 6-1-a: AC powered light get the AC current form wall outlet if terminate the wall outlet power, the built-in night-light will lost power except the power-fail light can still work.

6-1-b: The said current invention get AC power but the inside use LED(s) as light source so need at least one AC-to-DC circuit to get DC current for inner DC powered LED(s) or IC or sensor or power fail circuit to have power for operation.

6-1-c: The '388 application do not have any image-forming, display-unit or image-carrier or may different optional other accessories including motor, gear, gear-set, film holder, tray, disc, disc with teeth, change focus, retract-and-extend similar telescope to change optics-lens position against the inner image-carrier, magnify refractive-lens, so this is total different the theory of optics.

⇨ So '388 Botty for dual-beam for DC powered is nothing to do with current invention.

(7) US 2009-0021946=(Nozaki) U.S. Ser. No. #12/224,364=Filed Mar. 30, 2007

(Projection Device)

7-1: The 364 Nozaki mainly for a camera or digital video device which has the image-catching and image saving kits and the built-in LED(s) to project the image from the DC-powered camera or digital video through a very complicated optic-lens assembly (226), (228a) (228b) which has reflected and triangle-lens to get 90 degree light-beam to change direction from input-end to output-end. These complicated and super expensive optics-lens(s) or lens assembly is not same as the current invention for following difference.

7-2: The current invention have AC power source from outlet and have at least one of the AC-to-DC circuit to get the DC current for inner DC operated LED(s), IC, Circuit, sensor, detector, power fail sensor to make the desired multiple function for Plug-into outlets by prong for indoor application or by AC-Plug-wire for outdoor applications.

7-3: The current invention have refractive optics-lens in front of the image-forming-piece or image-carrier or film or slide and most important the LED light-beam emit out and always is go straight through to image-carrier which in-front of the LED.

7-4: The current invention the do not make the image have 90 degree turn direction as the said '2364 lens (228a) 9228b).

⇨ Conclusion: This is total different with current invention.

(8) U.S. Pat. No. 5,404,283=(Yantz)=U.S. Ser. No. 861,181=Filed date Mar. 31, 1992

(Outdoor framing projector)

8-1: From '283 column 7 line 65 "The optical system 144, which includes the lamp 142 and a reflector 138, a shutter support 148, a rear lens 150, an optical stop 152 and a front lens 154, occupies substranfially the entire lateral area of the interior of the housing 12, because of the size of the elements required and the need for supports for the elements. Compare with the current invention different including:

8-2: '283 Yantz teach a very expensive and complicated optic-lens system as above listed.==> The current invention had so such complicated optic-system as above list.

8-3: '283 teach a lot of text for recirculation cooling system cools a lamp sith the warmed air flowing longitudinally back to front past top and side walls of the housing provided with cooling fans and a return air duct adjacent to the bottom wall drawing air from the rong of the housing back to the inlet of the fan. (Abstract).==> The current invention do not have such "Fan Recirculation System" at all.

8-4: '283 Yantz shown on column 9 line 11, "As noted above, the lamp 142 is preferably either an incandescent lamp, such as a quartz lamp for example if the projector 10 is to be used in a dimming application or a metal halide high-intensity discharge lamp, which may be desired for long lift and opening economy . . . .

An incandescent lamp, which is shown on the drawings and has been found suitable for use with the reflector specified is commercially available from GTE products Corp., OED Division of Westfield, in., under the commercial designation Sylvania EGG, 750 W. Quartz medium prefocus. This is a 750 Watt lamp, it being understand that smaller or larger wattage may also be used.

Compare with current invention for 0.25 Watt or Maximum is 1 to 3 Watt LEDs which no need any fan recirculation. Furthermore, the /283 use 750 Watt for totally different Quartz-Lamp that is totally different light source.

8-5: '283 use Quartz-Lamp for AC power and current invention use LED which is DC powered light source, so current invention need AC-to-DC circuit to get DC current for inner LED(s), IC, Sensor, Switch, Detector, Power fail failure system, motor for rotating the image-carrier or disc with teeth or disc have built-in plurality of the image-carrier or rotating the optics-lens or plurality of optics-lens fit within the disc or holder or rotatable disc-with-teeth or gear-sets.

So this is totally different circuit, electric, applications, sensor, trigger system and the rotating the said one or more optics-lens and image-carriers.

8-6" '283 need use reflector system to make light concentrate to front position.

The current invention is no needed such reflector-system.

Conclusion: This is totally different any aspect.

(9) US prior art=U.S. Pat. No. 7,667,770 Mazzochette 9-a: '770 teach (Column 2 Line 41) "a retrofit recessed LED down light fixture (10) includes a housing can 12, base 14, generally annular trim 16 and mounting bracket 19, 20 interconnected" and (Column 2 line 64 to 67) "A sealed reflector cone 50 focuses and directs light from the LED array 48 out of the light fixture 10, a heat sink 52 is mounted within the housing can 12"

The main application and construction is totally different with the current invention has the upper parts for project-assembly (LED+image forming piece+ top refractive-lens) and lower housing-parts have at least one for AC-to-DC circuit with prong or AC-plug wire to connect with the anywhere preferred outlets.

Furthermore, the current invention lighted-image or lighted-pattern is emit to upwardly to ceiling or emit to far-away wall surface or floor or all with adjustable angle kits.→The said '770 is fixed and only can emit light to one locations. This also is not same as current invention.

Conclusion:

The '077 is nothing to do with the current invention.

(10) US prior art U.S. Pat. No. 8,657,464 Lundberg et al 10-a→(From Abstract) '464 is teach "methods and systems of emitting different light from a multiple mode light emitting device" by a plurality of $1^{st}$ and $2^{nd}$ LEDs in a $1^{st}$ or $2^{nd}$ ring arrangement" with rotatable for $2^{nd}$ LEDs This is nothing to do with the current invention because the current invention only has one LED for lighted image or patterns or both projection and other LEDs is for the $2^{nd}$ function for night light which no need the said (a) ring arrangement and (b) the said LEDs inside for Night light or other color changing or color selection function without for rotating purpose. (c) The current invention for rotating or spin is for changing the image or-and patterns present location or direction not for rotating the said $2^{nd}$ or $1^{st}$ plurality number of the said $1^{st}$ or $2^{nd}$ LEDs.

10-b→'464 as shown on FIG. 7, the power source for the '464 is one of DC power as the diagram show (LED Power source 702) and also has the reflectors or lens rotating (106/108) which is not existing or current invention and (controller and actuator 502)

These 3 major parts of '464 FIG. 7 is not existing and use for current invention at all.

The current invention has no such 3 major parts of '464 described so '464 is nothing to do with the said lighted image or-and patterns projection which also has no any magnify project refractive-lens.

Conclusion:

The current invention for (1) projection has only 1 LED and 1 image forming-piece and 1 top magnify refractive projection lens without '464 3 major parts at all so different construction and (2) The current invention use the AC-to-DC circuitry or circuits to get DC power for LEDs which is not same as '464 FIG. 7 show is DC batteries and (3) the current invention without the '464 FIG. 7 for lens (106) and reflector (108) and Motor (706) to make the said LED for rotating and get light concentrate to direction.

So '464 is nothing to do with current invention.

(11) U.S. Pat. No. 8,089,691 Arbuckle 11-a: The '691 is for Desktop Microscope application, The '691 clear describe for the patterns shown on the object plane of the optics-microscope. (Abstract) Line 5 "A pattern mask is located within the illumination path for projecting one or a plurality of objects, structures, or patterns on a samples located at the object plane of the optical microscope"→The current invention for image forming-piece is one of Slide or Film or Digital data displayer that is not "One sample its structures or patterns" and the current invention lighted image or-and patterns is colorful from slide or film or digital displayer image related image which is not the black and white for "object samples".

11-b; The '691 is not a device to have lighted image or-and patterns use only refractive-magnify lens to far-away distance top ceiling or-and surrounding walls→From Abstract line 8 "The pattern mask may be use with structured illumination microscope (SIM) to project a MOVING STRIED OPTICAL GRID PATTERN OR RONCHI BULING ONTO THE SAMPLES at the OBJECT PANE in either fluorescence or reflected bright field imaging→so can prove the said (lighted patterns or image) is totally different.

11-c: The '691 light source (20) or (27) which is came from side-wall into the microscope device and image is present on 90 degree with the light-beam traveling as FIGS. 1, 2, 3. Furthermore the '691 light source (20) (27) not only is came from 90 degree side and need at reflector to change the light-beam into the object-mask so can make clear image of "Sample Object"→This is totally different with current invention that the LED light beam is straight to emit to image-forming-piece and go through the top or front magnify refractive project-lens all 3 major parts for current invention for project-assembly is in one straight-line without (1) Light source from 90 degree side direction, and (2) Need the reflector or mirror to reflect the light source (20) (27) to turn 90 degree into the microscope-tube, and (3) Also, the said '691 has no AC-to-DC current or circuit built-into the said microscope-tube or housing, and (4) The '691 light source has to go though many expensive optic-lens to make the light-beam strong enough to illumination the "Object Samples" the current invention no need such plurality of optics-lens and accessories (19) (59) (24) (60) (62) (64) (66) for get proper light-beam.

Conclusion:

⇨ The '691 is totally different with current invention.

(12) US prior art—U.S. Pat. No. 7,286,101 Hosaka 12-a: '101 teach one projector that has $1^{st}$ and $2^{nd}$ display images on opposing side of an image display screen→This is different with current invention that the LED project light has only one lighted image or-and patterns been project out to any outside surface.

12-b: The '101 has pre-designed display screen which is special made for the '101

Projector and not same as current invention to project lighted-image or-and patterns to anywhere existing of indoor or outdoor surface including ceiling, walls, ground, fence, garage door, building, housing or garden or patio areas or any combination 12-c From '101 Column 2 (Summary) Can see the '101 special made display screen is one of (12-c-1) has reflective parts or transmissive part (column Line 13 to 20), and (12-c-2) The image has "incident side" and back (Column line 16 to 26) which is more than one image and current invention without able to project front and back construction, and (12-c-3) '101 have to have the reflector (Column 2 line 17) to help to create image which current invention without any reflector or reflective parts for application, and (12-c-4) image screen is shown on the opposite side (hereinafter "back side"—column 2 line 26), and (12-c-5) the display screen is special made and "has plurality of reflective and parts which formed as a narrow strips . . . ", this is totally different with current invention.

Conclusion:

The '101 is nothing to do with current invention.

(13) US prior art—U.S. Pat. No. 8,328,368 Luciamo 13-a: '368 teach the laser light source (56) incorporate with mirror (53) (50) to get the multiple reflected laser light beam. This is different light source (Laser v.s. current LED).

13-b: '368 incorporated mirror(s) to create the multiple times reflection and also change the light traveling path from straight to $2^{nd}$ angle and to 3re angle to form the plurality of laser light beam→This is nothing to do with the current invention for 1 single lighted image or-and pattern created by LED light beam go straight to the image-forming-piece and go straight again to the top or front magnify refractive project-lens to spread out to outside the LED light for indoor or outdoor ceiling, walls, fence, garage door, building, house without any reflective-piece and without multiple time reflection to change the single. The said laser light-beam is plurality number of the said laser light-beams.

Conclusion:

'101 is nothing to with the current LED project light at all.

(14) US Prior Art (Lai)

The Lai 042

14-1: show the Cylinder body which has a complicated construction to make focus adjustment Which compare with the current invention FIG. 1 to FIG. 9 can see the current invention especially the FIG. 2+3+4+5 show the LED light source which is 5 mm Diameter and length around 10 mm. which is totally different with '042 for the light source use.→construction is different at all.

14-2: Lai '042 the power source need to get from outside transformer (12) and through the cord (121) to connect with inner light means (Column 2 line 63 and Column 3 line 11 to line 14).→so this is not same for the current invention LED light source is connected with Built-in housing simple Bridge-circuit because LED only need 20ma current so no need any Big outside transformer (12 of '042) to supply the big current.→

So this is totally different electric arrangement with '042 for transformer and big cord (121) needed.

14-3: Lai '042 the lens (22) and photo (7) is fixed on the lens holder (25) and front case (221) which is a frame construction is not like current invention the (image-forming kit or slide or film and lens) is install a tube or housing which is sealed and prevent light to emit out because LED light beam is very limited light so do not leakage out→The current invention all image-forming kits/slide/film and project lens is sealed inside the tube or housing. . . . The '042 Lai is fixed on a hollow-frame and light can leakage to everywhere.

14-4: Lai '042 The all lens (22) and Photo (7) is sandwich for frame (221) (23) or the (25) (251) which are belong to frame parts with screw to built-up the construction.→Not like current invention for Tube or housing and inside has the installation-gap to install or arrange and not allow Limited LED light beam emit-out.

So these are totally different on (a-1) construction (a-2) electric and power source and circuit (a-3) light leakage and frame leakage light everywhere (a-4) Lens or photos is sand-which on many frame or extra piece so different with current invention for simple installation.

→Conclusion,

The Lai is not any similar with current invention for size, construction, concept, circuit so not any similar with Ivan invention.

(15) U.S. Pat. No. 5,321,449 →

Teach a incandescent bulb Flashlight projection 15-1: The Incandescent flash light no need to have Bridge-circuit to change the Home appliance electricity AC to the direct current (DC) at certain LED working voltage and current to make the light turn on.

So the Circuit for Portable flashlight v.s. Home use Indoor or outdoor light circuit is different.

This is not said all light source (Incandescent bulb) and (LED) is same and all belong to light source.

The Incandescent bulb to use current invention will burn out whole tiny unit because radiation heat and very hot than cold temperatures LED . . . . This is not equivalent or replaceable at all.

15-2: The portable Flashlight projection. '449 construction

'449 has the different construction with the current invention for enlarge head (14) at one end which has straight tangential spaced to install the Reflector (28) because the bulb light is radiation spread out so need reflector to concentrate bulb light beam to front.→This is not same as LED light for narrow angle to emit light so no need such (Reflector 28)→This is other construction and light source difference.

15-3: The portable flash light projection '449

The reflector (28) with integral socket (30) to install the bulb→The current invention the LED on the end of non-reflective tube. Different for '499 install on the reflector.

15-4: The '449 the power source (32) is carried within the housing (24) for illumination the light bulb (20).

The current invention gets power from outlets which have unlimited power same as home electricity. Not limited power like battery.

15-5: '499 need a switch to manual to turn on and turn off the flashlight.

The current invention the light is (Automatically) turn on or remote controller or (4) Moving sensors or (5) wireless signals including Zegebii or wife or Bluetooth or App software. Never need manual switch to turn on and turn off 15-6: '499 projecting device 10. Includes a flexible holder (40) with a central socket located within the transverse slot (16) in the enlarged head (14)→which is not same as the Current invention Slide or film is install within a light non-leakage tube or housing . . . . Not same as '499 to into s disc and disc need a holder (40) to hold it and allow to change slide.

From above (b-1 to b-6) for electric, for construction, for construction, for applications, for power source, and for light device is totally different with current invention.

(16) U.S. Pat. No. 7,001,027—Fujisawa et. Al 16-1: From FIG. 1: Column 4 line 25 "the light source lamp unit 10 that irradiated a light beam emitted by a light source lamp 11" and has an ellipsoidal reflector (212), a-sub-reflection mirror (13) and a parallelizing concave lens (14).

v.s. current invention:

current invention had no such complicated parts (11) (212) (14) to make lighted patterns or image project to outdoors including, fence, wall, building, house, or indoor ceiling, walls, floor and powered by AC or DC powered source.

The current invention use LED light source which is not belong to "irradiates light mean" device. LED light for current invention only had 30 degree emit direction so can 100% into tube without light-beam leakage out from tube, or tray, or holder wall even it is more than one piece of tubes, trays, holders assembled together.

irradiation light aligned by the eclipse reflector (212), so light parallelized by the parallelizing concave lens (14) and irradiated to the integrator illuminating optics system (20) . . . →The current invention do not have (212) (14) (20) at all.

'027 has the first lens array (21) and second lens array (22), the current invention has so such (21) (22).

'027 further PBS array (23) need an alternating of Polarization separating films and reflection mirror→this is belong to totally different refraction optic-lens. The said polarization separating film is a Light-BEAM FILTER . . . . Like sunglass to filter out the non-necessary light-beams. The current invention never can use this for colorful lighted patterns or image projection.

So From the '027 which is totally different optics-construction, optics-theory, optics-elements, optics-lens, light-source(s) and purpose for applications.

(17) US 2002-015-2656 Huang 17-a: The '656 is one of the Back-light application which the light source is the incandescent bulb (41) and the inner lampshade (30) and a magnifying outer lampshade (32) for the application is too costly→current invention use a limited angle for light-beam and not a radiation light-beam for incandescent bulb (41) so '656 can make 360 degree light passing through the surrounding wall. That is not same as current invention for limited angle have LED light-beam.

17-b: The '656 magnifying glass (32) fixedly mounted on the base (40) over the inner lampshade (30) . . . . The outside wall of the magnifying outer lamp shade (32) is not a smooth wall→The current invention had no any WALL have optics-properties furthermore the "Magnify", Also, No idea how the '656 can make for this function on a WALL.

17-c: From [0039] The outer lampshade (32) has a plurality of ribs (W) on the outside wall (34), producing a convex lens effects to magnify the apparent dimensions of the inner lampshade (30) So '656 magnify is by a RIBS on the Wall→The current invention for tens drawing no anyone to make optics-properties on the wall. No any optics-treatment is RIBS ON WALL.

17-d: From '656 all image or screen to be seen is on the lampshade (32) no any image shown on distance away on the ceiling, housing, garage door, or fence or front entrance door→So this totally different application than current invention.

Conclusion: '656 is other technical for radiation light-source and different application and different construction so nothing to do with current invention.

(18) Re: US prior art-(2005-019-5598) Denes==

From the definition for Grating optics-unit for laser light source, which is totally with the '598 for '598 denes diffusing-lens (29) in front of '598 denes 3 light source (43)

18-1: From "Column [0047] line 15→A light source 43 includes three light emitting diode (LED's) that are disposed on the printed circuit board 30 and are configured to project light through a front lens 27, a diffuser lens 29, and a back lens 28."→LED is not the single-wave length so do not project light as above grating-unit for laser (single wave-length light source).

18-2: From the above definition for grating optic-unit for laser light source, '589 Denes show on all text including [0088][0089][0090] [0091][0092][0093][0094] lens 27,28, 1614 and diffuser 10, 1601 can be different thickness or different treatment even has "A lit may also include one or more stick-on labels 95 (See FIG. 1) that may be attached to the lens or lens 27,28 to project a pattern of light from the device. Or as Column [0089] Page 10 Right Line 1" The lenses 27,28, 1614 may also be constructed with one or more shaped cutouts or windows 1634, through which the light may pass, so as to project image on a wall or other surface L1, L2 (See FIG. 18) . . . →The current invention for Laser is only created by "Grating-unit or grating assembly" which without (cutout, opening) or sticker to make lighted patterns. The current invention just need pre-designed grating-unit with plurality of lines or arts within each mini-meter (nm). No need cutout, no opening, no any sticker to form the lighted patterns as '589 Denes.

18-3: From Above comparison:

18-3-a: The current invention is use single wave-length Laser which is not same as LED for non-single wave-length light source.

18-3-b: The current invention laser light source is non-radiation light source and Laser light beam is from laser light source location will emit to object surface for 100 feet away without spread out.

'589 Dence is radiation light source which from location and light beam spread out and more big distance the LED light beam spread more wider so can not emit to long distance.

So '589 Dence LED light source is not good for outdoor application because '589 Dence use diffuser lens which increase the limited LED brightness LEDs light-beam spread out while light-beam touch the said diffuser lens . . . 10,1601 (Page 10 [column 0090] line 1), or (Page 3 [column 0045] Line 1 "The lens of the present invention may be use in any application where diffused or dispersed a.)

18-5 Basing on above listed (1-1) (1-2) (1-3) all the light source and optics-unit is totally different (a) theory and (b) construction and (c) light-beam traveling and (d) wave-length, (e) light travel distance, (f) lighted patterns forming construction, (g) outdoor lighted patterns shown on far distance capability. So, the '598 is totally different with current laser light with grating unit to make outdoor very bright laser lighted patterns or image.

(19) Re: US prior art (2005-=011-1212) Smith now is issued U.S. Pat. No. 7,056,006

19-1: '212 Smith has light bulb (13) is AC power bulb basing on the FIG. 3 electric diagram and powered by the AC current (22) so that is not the LED or even laser light source (laser diode), both need DC power. From the '212 Smith FIG. 3 and text show the light-bulb (13) is incandescent→so this is totally different with current invention for Laser light source.

19-2: From '212 Smith FIG. 1 show the night light 910) has the opening to emit the incandescent bulb light beam to front disc (18) which has desired different front movable design→This is optics-theory for back-light arrangement. And only the multiple wave-length of the incandescent bulb can make the color changing such as FIG. 4B use the front disc (18b) has red, orange, yellow, green, blue, violet 6 color film or design to make the back-light light-bulb light-beam to passing and change color.

19-3: From Smith '212 is not a illegally items because the moving parts do not pass the safety standard test for drop & pualling testament.

19-4: Basing the different (a) light source (b) light source wave-length (c) back-light front design v.s. laser grating film (d) light traveling distance for light-Bulb is very short maybe only 3 feet v.s. laser light-beam over 100 feet (e) circuit need for AC for '212 Smith v.s. Laser need at least one AC-to-DC circuit to get desired DC current, (f) light-bulb image only less than 3 feet v.s. 100 feet or more laser lighted patterns or image . . . . So '212 Smith is out-of-date device.

→Conclusion:

The said Smith '212 is not any relation with current laser light with grating optics-unit to make out the lighted patterns or image or contour shape project to desired place.

Re: "Grating" definition as below so can clear grating-piece with all US prior art with current invention for laser project light.

(20) Also other US prior arts also nothing to with current invention.

U.S. Pat. No. 5,218,388 Purdy, U.S. Pat. No. 5,404,283 Yantz, U.S. Pat. No. 5,535,230 ABE, U.S. Pat. No. 7,390,092 Bulliveau, U.S. Pat. No. 7,677,770 Mazzochette, U.S. Pat. No. 5,926,440 Chien, U.S. Pat. Nos. 8,657,464, 8,089,691 Arbuckle, U.S. Pat. Nos. 7,286,101, 8,328,368, 7,390,092 Bulliveau, U.S. Pat. No. 8,328,368 Luciamo, U.S. Pat. No. 8,657,464 Lundber, 2009-0021946 Nozaki, 2005-0094308 Booty.

(21) U.S. Pat. No. 8,128,259 Myers et al.

disclosure a spherical ornamental fixtures which is not
(1) A LED bulb (2) No optics lens to get refraction light design (3) No rotating or moving device such as motor or movement (4) No any image forming arrangement such as texture on lens or film or slide.

'259 maximum can be a ceiling light or desktop light which has light source (59) or (159) arrange on the post and emit light to the ornament piece which need glow the whole sphere which should be more close the co-inventor's earlier issued U.S. Pat. No. 5,667,736 has laser treated lens to spread the inner light source to wider range which filed on Feb. 7, 1995 and Sep. 16, 1997 issues.

So, this is nothing to do with current invention for above listed (4) major difference for (a) Application (b) physics theory (c) Construction (d) design.

(22) U.S. Pat. No. 7,748,869 Sevack et al. disclosure (1) a clip-on project assembly for recessed lighting fixture on it trim area. (2) The light source use the existing recessed light for (3) super high heat light source 50Wa MR16 or GU 10 halogen bulb so (4) need use the thin metal template disk with cutout patterns or etched glass so can (5) project the patterns on surface on floor, wall from ceiling recessed lighting fixture. (column 1)

'869 major difference with current invention including (a) Not a Bulb with bulb has to fit into bulb receiving socket (b) Not has self-contained LED light source (3) No use the cool light source so no need use heavy metal or glass (4) Not possible use film/slide/plastic printed piece as image forming kits because use the High wattage and high power consumption existing halogen bulb. So all major application, physical theory, attachment, installation, construction. None of any one is similar with current invention.

23. U.S. Pat. No. 6,558,022 Karahara disclosure the different device with current invention including (1) From FIG. 1,2,3,4,5,6 can see the Light source (16) is a Radiant light 17 (which is not the LED light source because LED light has no this radiant light 117 to emit light to 360 degree)

Also, from Column 4 line 54 to 63) all the light source all belong to the Radiant light source. So the light source need for 360 degree radiant type not same as current invention for LED light.

(2) The '022 patent teach a pin-hole image to form the image from a radiant light source (Bulb) which is not same as the current invention has to use convex lens to get lighted image passing through and enlarge image. The '022 use pin-hold image to create the enlarge size of the image by distance between the light source/shade/image location so can get desired image. So the physics theory for (Pin-Hole image) v.s. (convex lens image forming image) theory is totally different.

(3) '022 use the convergent lens which is not same as convex lens. Convex lens is enlar and make the light beam spread out not convergent purpose.

(4) '022 use the radiant light source as column 4 line 53 to 63 which has high heat so the shape with opening or design have to far away with the light source or will be burn which is not like the current invention the image forming piece is made of plastic or slide or film or texture lens which all made by plastic and very close to light source because current invention use cool light source LED.

(5) The '022 is not a LED bulb, '022 is a lighting fixture which can not insert into bulb receiving socket at all. So Pen and Rocket totally nothing to do with '022 patent for current invention.

(23) U.S. Pat. No. 6,267,478, The Chen disclosure the changeable image construction for single image project to the locations which is different with current invention as (A) As FIG. 1 shown the display unit (40) is position front the opening (20) rotating-disc which is front of the single opening base-plate (10) so the image present to location is only SINGLE image not like the current invention for (Multiple images shown on the locations at same time). (B) The light source is Light Bulb (50) at the 2001 there is no any LED for white light can get at market place and has sufficient light source and lighted any image. (c) '478 the theory is as column 4 Line 1 to Line 18 stating the light source (50) on reflector (531) because bulb radiant light source so need reflector (531) to collect all light beam to front and the light beam go though the light transmitting hole (12) of base-plate and again go through hole of rotating-disc (20) and hit the image carrier-disc (40) and go out from the single Front Lens.

(531) This is different than current invention for light from LED light source go to preferred and optional optical lens to adjustable LED light beam and go through the image forming means (may rotating or steady) and go through the magnify lens sets (rotating or steady) and go to outer Dome or sphere optics-lens to get as wider as possible illumination areas. So (AA) the current invention the position for the Image forming means is directly top of the LED (Light source) because no heat issue like the '478 high heat bulb will melt the plastic slide/film/printed plastic piece. (BB) The Current invention no need reflector (531) to collect all the radiant light beam like bulb (CC) The current invention only moving the Optics-lens disc not the image forming means and this moving optics-lens will create the image is MOVING, Not changing functions so this is image performance and effects and theory different (DD) The '478 use a Spring pressure box (35) and a lot of cam 33, pad 352, screw 231, nut 44 flap 31 teeth 24 pressure spring 351 for locking or freeze or release for mechanical design is not needed for current invention.

So the current invention just use a gear-box which can get desired rotating speed which is much simple than the '478 construction and lower cost so not compatable at all. (EE) '478 is not for a LED bulb that is mechanical construction which is totally different with current invention construction for rotating part, image function, light performance . . . etc.

So this is major different with current invention for different image performance and different rotating object and different construction for motor and disc assembly and position so not same as current invention at all.

(24) U.S. Pat. No. 3,762,082 Mincy disclosure the varicolored disk install on a fenestrated disk and juxtaposed varicolored to make the below light beam to reflected out to see hrobbing or twinkling pulses of color . . . The difference at (A) light source (34) is high power bulb which is so hot so can not have any image forming plastic piece on top because heat is always flow to top as current invention to use slide/film/printed plastic piece (B) the illumination member (14) which '082 as column 2 line 9 to 20 said how to make the distorted regions 36 and created the interface 38 of the top Cylinder shape. So this is not same as current image forming piece is flat plastic piece such as slide/film/printed plastic piece. (CC) The '082 has no moving device (DD) The '082 is not for a LED bulb (EE) The '082 has no optics theory for enlarge lighted image, So '082 is totally different with current invention.

(26) U.S. Pat. No. 8,262,252 Bergman disclosure the image design change from 1 image to N-number of image depend on how many image and optics lens been arranged. This is not same as the current invention to make the each image to travel a arc or partial of circle at the same time which is not become 1 n-number 1 . . . . The light performance because major different is the current invention (A) not rotating the image and optics-lens together at the same time. The current invention only make the said Plurality of optics-lens rotating on desired speed so need gear box which '252 do not need this gear-box. (B) '252 need to very precisely to design for distance and focus for the image to project on fixed distance so this will be a custom-made product which is not same as current invention the image can fit for any kind of ceiling or wall distance the image can be readable and acceptable because never had image effects to combine N-number of image into one clear image and/or separated 1 consolidated image to separate into N-Number of separated clear image. So the requirement for precisely calculation for the distance or gap of the LED or image carrier or the image location distance needed (C) '252 other big issues is the optics lens is too complicated in order to get the FIG. 1A, FIG. 2-A, FIG. 2-B light path because to get the light beam travel for a straight direction without enlarge so it is not using the current invention simple convex lens which will enlarge or/and diversify the image which never like the '252 FIG. 1A, FIG. 2-A, FIG. 2-B for precisely complicated lens assembly to get the result for parallel image present to image location just keep same radio same size as LED and image spacing or gap. So '252 is get image same size as the Image forming. Not enlarge to N time bigger for these parallel light beam after complicated lens assembly.

More important '252 is a illumination system. Not same as current invention (AA) is a LED bulb (BB) The image is moving effects for arc or partial circle moving (CC) The current invention has multiple image spread only not consolidate into 1 image or/and separated into N-image both is clear (DD) the current invention has magnify and enlarge the image. Not like '252 still parallel and keep same size shown on the image locations (EE) The current invention use simple convex lens not same as '252 have to keep same space and distance as LEDs and Image space from lower device. So '252 is nothing to do with the current invention.

(27) US Prior Art U.S. Pat. No. 6,588,002 as below.

The '002 is typical for Physics is (Pin-Hole image) system which the Light traveling theory and direction—→Passing through the holes-> Light beam go direction to the screen→To show the shape.

The '002 light emit direction is straight which has no any reflective (emit into and emit back v.s. the angle of emit-into angle) or refractive (The light beam passing through the optics-lens to emit into the lens material and make deviation and emit out from optics-lens other surface). So the light traveling path is totally different as '002 all drawing show is simple straight light traveling.

Light source different:

'002 show the Light source is radiation spread out from light source which means that is bulb light source So can have more than 120 degree light beam emit out from single light source.

The current invention is LED light source which have to use DC current to drive so while apply for the outdoor light for big power have to connect with AC plug wire with Outside or built-in AC-to-DC circuit or get DC Big current power from outside AC-to-DC transformer to supply enough current to outdoor light device or high power consumption LEDs for other location application.

The Physics theory and light traveling theory is totally different:

'002 Pin-Hole image with Radiation Bulb light source as all text of '002 and Figures. The current invention is not same as '002, The current invention is (Lens imaging) as the attached theory for (Object→Located on certain distance to the Lens focus points to form the size changed image which has smaller or equal or enlarge basing on the object located outside the $2^{nd}$ focus point or within the $1^{st}$ or $2^{nd}$ focus location or within the $1^{st}$ focus location.==> More simple physics word is (refraction). This is not only can created (colorful) (detail) (Sharp pixel image).

Also, the current invention also incorporated with the (Reflective properties) which is the Light beam emit to the lens with certain emit angle to lens and will reflected to certain angles out of the lens.

That is not same as '002 Pin-hold image light beam travel straight through the opening or holes or light passing able material.

The '002 is a radiation light source which is a bulb so the (Display unit) have to far away to the super high Temperatures light source as all '002 drawing show. It is not same as the current invention which has is LED which is cold light source which will not make the some display-unit like film or slide or paper or plastic sheet or laser film to melt or even fired.

The current invention has make big improvement than all these (27) prior arts and make it simple manufacture, low cost, less assembly process, make different light functions.

As for the a lot of later file filed patents which should belong to invalid patents basing on all prior art study examiner did not review the all co-inventor's earlier public or issued patent data and each invalid patents has same of the all co-inventor's same concept and scope and construction and idea and should not granted patents at all including U.S. Pat. No. 9,068,726 U.S. Ser. No. 12/079,628 filed on Nov. 13, 2013, U.S. Pat. No. 9,194,551 U.S. Ser. No. 14/337,662 filed on Jul. 22, 2014

U.S. Pat. No. 9,395,608 U.S. Ser. No. 14/341,345 filed on Jul. 25, 2014

Which is later than current inventor's filed (#ZZ-family) on Sep. 3, 2013 which have the AC-wire for outdoor application to get AC power source, or Later than co-inventor (#TT-family) on 2010, (#II-Family) on 2009, (#FF-Family) on 2008

(A) Basing on (#FF-family) FIG. 2+FIGS. 2-1, 2-2, 2-3+ FIGS. 2-4, 2-5, 2-6, 2-7+FIG. 2-8+ FIG. 2-9 filed on 2008 and (#Q-Family) FIG. 2-10 drawing and claims has:
  (1) Disc to load plurality of the image-forming units
  (2) has motor to make automatically rotating the disc or compartment or holder
  (3) has rotating means to rotate the optics-lens.
(B) Basin on the (#II-Family) FIG. 2-11+FIG. 2-12+FIG. 2-13+FIG. 2-14, 2-15, 2-16, 2-17+FIG. 2-18, 2-19, 2-20, 2-21,2-22,2-23 filed on 2009 has drawing and claims has:
  (4) The 3 project-assembly 3 parts (LED+ image forming-unit+ refractive lens) install or arrange or fit into Outdoor lighting, garden light, or seasonal lighting.
(C) Basing on (#ZZZ-Family) file don Sep. 3, 2013 has Figure+FIGS. 7, 7A, 7B+FIGS. 8, 8A,8B, 8C, 8D+FIGS. 9, 9A, 9b, 9C+drawing and claims has:
  (5) the LED light especially outdoor lighting has the "More than one of optics-lens and has LED light beam came out from LED to go through $1^{st}$ optic-lens has reflective or-and refractive properties and the light beam also passing through the $2^{nd}$ optics-lens has reflective or-and refractive properties, after the light beam go through the $1^{st}$ optic-lens".
(D) Basing on the (#QQQ-12)Family file don 2012 has FIGS. 2-24, 2-25, 2-26+FIGS. 3, 3A, 3B, 4+FIGS. 5, 5A, 5B, 5C, 5D+FIGS. 6, 6A, 6B, 6C drawing and claims
  (6) all the LED outdoor project light has moving effects caused by move the (a) image forming unit(s), or-and (b) plurality of optics-lens inside disc by motor, or-and (c) single $1^{st}$ inner optics-lens with prism or diamond arrangement has reflective or-and refractive optics properties, or-and (d) move LED(s) light source or-and (e) use IC control LEDs for different timing to turn on and turn off. These has all details drawing and claims of the (#QQQ-2012 filed parent and it all child filed cases).

As for LASER PROJECT OUTDOOR LIGHT U.S. patents:

U.S. Pat. No. 9,458,994 Ser. No. 14/976,202 filed on Dec. 21, 2015 and

U.S. Pat. No. 9,546,775 Ser. No. 15/142,789 filed on Apr. 29, 2016, issued on Jan. 17, 2017

U.S. Pat. No. 9,752,761 Ser. No. 15/001,942 filed on Jan. 20, 2016, issued on Sep. 5, 2017

U.S. Ser. No. 14/958,667 Dec. 3, 2015 filed, and U.S. Ser. No. 14/958,657 Dec. 1, 2015 filed. All these related Laser outdoor project light which is 5 years later filed than current inventor's (#TT-Family) 2010 filed and (#XX-2010) filed.

(E) Basing on the attached FIG. 9D+FIGS. 9E, 9F+FIG. 9G+FIG. 9H, 9I, 9J+FIGS. 10, 10A, 10B, 10C+FIG. 11+FIG. 12+FIG. 13+FIGS. 14, 14A, 14B, 14C, 14D, 14E, 14F, 14G+FIG. 15, 15A, 15B, 15C, 15D, 15E, 15F for all kind of Laser light source application for Outdoor lighting+Garden light+Laser Bulb has drawing and claims from the below listed family filed cases:

The (#XX-2010) Filed on 2010 for Laser project LED light has CIP Filed for (#XX-1) (#XX-2) as above listed which apply the co-inventor's prior art the laser grating film for the LED light source as U.S. Pat. No. 5,667,736 which filed on Feb. 7, 1995 and Sep. 16, 1997 issued for how to make the injection or stamping grating film.

Further more, the (#ZZZ-3) U.S. application Ser. No. 14/503,647 filed on Sep. 11, 2013 now is U.S. Pat. No. 9,719,654 which has brief and details laser outdoor project light fatal kids are (1) Laser light source (2) grating film infront of the LED light source or-and (3) Rotating disc for plurality of different design grating film(s) or Piece(s), or-and (4) incorporated LED light source to get other contour or shaped color image, or-and (5) use pin-hole image theory with LED or laser grating to show the different color or multiple color shape, contours . . . or other alternative or combination of LED and Laser image or lighted patterns. All these simple and brief description but those are fatal construction for the Laser outdoor projection light has the grating film or piece infront of laser light source which is same as the above listed 5 US 2014/2015 4-5 years later filed case than co-inventor's (#XX-2010) and (#TT-2010) Filed cases. So the above 5 later filed cases should all belong to invalid US patents because co-inventor parent and child filed cases is 5 years earlier filed into PTO with earlier publication data can be verify for the concept.

The above discussion for the current invention has the PARENT FILED case with all details drawing and Claims which should overcome all 4-6 years later filed case including the (1) Laser outdoor project light (2) LED outdoor or garden or seasonal light has (a) single moving optics lens (b) More than one optics lens (c) Plurality of optics-lens fit into rotating disc moved by motor device.

Basing on current invention for outdoor LED and/or laser project light as are meant to be projecting, showing, or creating image(s), message(s), word(s), number(s), time, geometric art(s), nature scene(s), galaxy(ies), milky way, sky(ies), cloud(s), space nebula, stars, moon, water-wave(s), aurora light(s), animal(s), character(s), cartoon(s), sign(s), logo(s), or commercial(s) with extra-small size and weight to allow users to be able to connect with power source from extension cords, power strips, USB power sources, or screw inside a bulb base, AC-plug-wire, or prong.

The current invention connect with outlet by AC-plug-wire or prong, or by USB-port or by male bulb-base connecting with the AC and/or DC power source for outdoor application and preferred to use conductive-kits including at least one of the AC-plug wire, built-in AC-to-DC circuitry, male bulb-base, or outside transformer with wire to get AC power source.

This invention is designed to incorporate with AC-plug wire, USB port(s), male bulb-bases to get AC power source for outdoor garden or outdoor application with AC outlet power source. As an advantage, the current invention have unlimited resource, unlike anything on the market which operates under the power of batteries, alkaline batteries, the current invention will not require replace batteries. This invention will bring big improvements over any battery-operated items on the market.

(Feature 2)

The current invention having one or more than one of moveable or changeable, replaceable, rotatable, assemble-able following parts in desired combination select from:

(1) image-forming-piece such as stencil, piece with cutout(s), opening(s), printing(s), design, arts, windows (not punch through), diffraction grating optics-properties, film, slide, LCD displayer, Wireless download digital data displayer or other displayer and/or (2) The optics-lens with desired combination optics-properties such as lens has texture, marking, reflective and/or refractive and/or diffusion, and/or light-passing, and/or or grating diffraction, and/or magnify, and/or (3) Light source is one or more of LED(s) and/or laser light-source with desired number and colors and brightness and emitting-angle, wattage, power, shape, type including dip, surface mounted (SMD), chip, dice, or chip-on-board (COB) for single color, multiple color, plurality of Red and/or Green and/or Blue color LEDs, or one LED with built-in Red and Green and B colors arrange on PCB to emit the single or multiple colors, or LED incorporate with IC and circuitry to make mixed or changeable color.

(4) Image-forming-unit or piece which in desired sheet, flat, coiled, roller, cylinder or other geometric-shape in front of the said LED light-beam travel direction and it ca be a steady, rolling, movable, replaceable, insert-able with or without frame or holder or tray to make it easily replace or installation or changed. It optional the said tray or disc or holder to fit the plurality of image-forming-piece within one holder, tray, holder, (5) The alternative arrangement for light-device having tube or tube-assembly or tray-assembly or housing-parts to hold the image-forming-piece(s) and/or optics-lens(s) for well assembled to prevent light-beam leakage out. And the said project and/or magnify optic-lens is located on top of lower positioned tube(s) tube-assembly or tray-assembly or housing-parts assembly so while LED light-beam emit to the said image-forming-unit or piece to make the tiny-image/patterns/art on tiny piece image-forming-piece become lighted tiny or small image and/or patterns and/or arts to go through the front preferred geometric-shape magnify or refractive and/or reflective project lens or cover to become desire size of the big image to shown on outdoor fence, wall, building, garden.

(6) The said LED and/or laser light source incorporate with IC and circuitry and control by wired or wireless controller or switch or sensor can changeable color, changeable duration, changeable function, changeable cycles of the said one or more than one piece of LED or LED(s) and/or laser light-source to make the said LED or Laser light device become multiple functions light device, so can increase the LED(s) or/and Laser light-device performance, effect, functions including color change, size change, sensor or wireless remote control and activate items have moving images and/or lighted patterns and/or other market available LED and/or laser light functions, performance and all combinations. Some preferred embodiment have No. 2 or N-number (N is any number) of the said optic-lens, LED, image-forming-piece to form preferred very splendid light show for outdoor application including garden light, seasonal light, light-string, Halloween outdoor project light, Christmas project light, outdoor project lights, outdoor tree light . . . etc. for outdoor applications.

The current invention to crate the moving or motion lighted image and/or patterns by incorporating with one or more of (A) Rotating device, (B) Motor and one or more gear-set(s), (C) Motor with more than one of gear-sets to change from horizon rotating to vertical rotating or reverse. Or, the said light-device with cam-shaft and motor-sets to make automatically changing circle-rotating to become linear moving back and forth, or (D) Inductive-assembly has magnetic & magnetic-coil assembly to move the said image-forming-piece or optic-lens or optics-elements, or (E) The silent clock movement to move, shake, wave, extend & retract, vibration, rotating, spin, change rotating circle, clock-wise to anti-clock-wise;

Above list moving or rotating related device to move or shake or rotate, spin at least one of the following parts selected from:

(i) Optical-elements, and/or (ii) Optic-lens, and/or (iii) Image-forming-unit or piece is single piece, or coiled into cylinder or geometric-shape fit-into tray, holder, disk, and/or (iv) The said extendable and retractable project-lens or telescoping-assembly with refractive-lens is incorporate with automatically motor-drive or manual-operate to change optic-lens relative position or orientation with said image-forming-piece by automatically or manual to change the focus of light-device, and/or (v) Rotate or move the said at least one of master-gear and plurality of connected others surrounding or different level gear-set with or without built-in image-forming-piece or film or slide or painting-piece or printed piece, and/or LED and/or light-source; to perform the said effects such as moving, and projecting image(s), message(s), number(s), time, geometric art(s), nature scene(s), galaxy(ies), milky way, sky(ies), cloud(s), space nebula, stars, moon, water-wave(s), aurora light(s), animal(s), character(s), cartoon(s), sign(s), logo(s), or commercial(s). This invention was designed to have multiple optical element(s) (with optics-lens or without the optics lens) to cooperate with rotating device or motor or movement to create or to show a movable or changeable colorful and splendid image of lighted patterns or-and projection.

(Feature 3)

Furthermore, the current invention may use alternative design to create the moving or variable or changeable light effects no need use the said motor, rotating, magnetic & magnetic-coil assembly is other alternative important improvement for cost consideration. I.E. The current invention preferred one of the said alternative arrangement is to turn-on and turn-off the said plurality of the said different locations and/or colors and/or power/wattage of the said LED or/and Laser light-source by IC for different time, cycle, duty, frequency, light-performance, light-functions, so it will be no any moving or rotating or spinning or movement related device at all, but the alternative arrangement still can make the said changeable image, message, wording, sign, shape time, geometric art, nature scene, galaxy, milky way, sky, cloud, starts, moon, water waves, animal, characters, cartoon, sign, logo, commercial while the alternative arrange light-beam passing through the said optics-lens or the said top flat or curved-flat or lower-dome, hill-like, arc-shape cover had logo, art, shape, design printed on or paint-on to show the shaking wording or image or patterns to been seen.

The current invention also can uses alternative ways to create splendid image(s), message(s), number(s), time, geometric art(s), nature scene(s), galaxy(ies), milky way, sky(ies), cloud(s), space nebula, stars, moon, water-wave(s), aurora light(s), animal(s), character(s), cartoon(s), sign(s), logo(s), or commercial(s) by not using an inner-layer optical lens, but using one or more than one inner image-forming-piece(s) with holes, stencils, walls, openings, printed art, painted design or shaped cutouts to incorporate with the movable $1^{st}$ image-forming-piece in flat or coiled construction to project or show a different effect that the is made out by the front magnify and/or refractive cover, or other optics or convex optical lens or assembly.

(Feature 4)

The current invention big improvement to make all moving or motion effects are made by IC is alternative arrangement to make the said plurality of LED or-and Laser light-source(s) to have sequential flashing, fade-in and fade-out, color changing, sequential, random, or color changing, color mixing, color selection, automatically changing color, or other LED light performance, effects, performance, duration and use the each LED or-and Laser light-source(s) with IC and/or remote-controller to make desired different including time, duration, on-off duty, cycles to turn on and turn off on different time and location and orientation, and/or focus-changing to make the viewing image to looking like moving, variable, changeable, One big improvement of this invention is the usage of different sequential patterns for the LED lights or-and laser light-source selected from at least one of fade-in and fade-out, flashing, color-changing, sequential on/off, random flashing, focus-changing, color mixing, color selection, function-selection, etc. The above mentioned changes are accompanied by built-in IC or MCP programming to make time, duration, on-off duty, day time, orientation, location, cycling and/or other changing from IC Chip or elements with or without the wireless controller or Blue-tooth/Z-way/Zigbee/IR/RF controller, or Wifi wireless with download APP controller, or controller system or other wireless device to make the said projected and showed image to have motion, moving, changeable for color, patterns, size, effects.

(Feature 5)

More advanced improvement, the shaped image, wording, message, time, geometric art, nature scene, galaxy, milky way, sky, cloud, starts, moon, water-wave, aurora light, animal, characters, cartoon, sign, logo, commercial can easily get from at least one or more than one of the optics-piece(s) which has its preferred texture, art, design, film, slide, opening, cutouts, holes, shape or other optics-treatments available from market place, so can incorporated with refractive and/or optics-lens to show splendid lighted image and/or patterns and/or wordings on outdoor broad areas to be seen and incorporate with at least one of LEDs or/and Laser light-source light-beam with and without rotating unit(s) to make the desired moving aurora effects.

The invention can have variety of different image(s), message(s), number(s), time, geometric art(s), nature scene(s), galaxy(ies), milky way, sky(ies), cloud(s), space nebula, stars, moon, water-wave(s), aurora light(s), animal(s), character(s), cartoon(s), sign(s), logo(s), or commercial(s) due to the current invention has ability to mix and match one or more optics-lenses with others one or more of image-forming-piece has holes, art, design, windows (not punch through), stencils, walls, openings, or cutouts and the said optic-element(s) and optics-lens not limited for number, relative position, orientation, locations with or without rotating, or movement, or motor with gear-set(s).

(Feature 6)

The current invention are Continue Filing or Division filing for co-pending filing U.S. Ser. No. 14/023,889 (#ZZZ) filed Sep. 11, 2013 and its continue filing U.S. Ser. No. 14/323,318 (#ZZZ-I) filed on Jul. 3, 2014 and (#ZZZ-2) U.S. Ser. No. 14/451,822 filed on Aug. 5, 2014. which is Continuously for co-inventor co-pending case (#FF-4) which is CIP of (#FF-3) which is CIP of (#FF-2)[now is allowed] Which is CIP of (#FF-1) now is US patented US (#FF-2008) and US issued U.S. Pat. No. 8,721,160 B2(e8x) $2^{nd}$ or N-number (N is any number) more replaceable or changeable image-forming-unit which inside tray or holder as FIG. 4-1 (92') fit within the holder (91') and change from housing slot (93') which is similar with co-inventor co-pending (#FF series) and (#DD-series) for same drawing with current invention FIG. 6 and FIG. 6A for plurality image-forming-unit (27") fit into the rotatable disc or holder or tray (26") to fit into light-device slot (9'"). These replace and/or rotatable like cylinder coiled image-forming-unit is same concept as co-inventor co-pending concept all the image-forming-device surface tiny or small image and/or pattern and/or design have to positioned on front of light-source light-beam traveling direction even it is replaceable, inter-changeable, rotatable, cylinder-coiled rotating piece, or insert into the housing slot tray . . . etc. All still same as the Continuously for co-inventor co-pending case (#FF-4) which is CIP of (#FF-3) which is CIP of (#FF-2)[now is allowed] Which is CIP of (#FF-1) now is US patented US (#FF-2008) and US issued U.S. Pat. No. 8,721,160 B2 and the current invention also is CIP of co-pending (#DD-5) which is CIP of (#DD-4) which is CIP of (#DD-3) U.S. Pat. No. 9,097,413 is CIP of parent case (#DD-2008) U.S. Ser. No. 12/292,153 filed on Nov. 12, 2008 now is U.S. Pat. No. 7,871,192 have FIG. 7, FIG. 7 same as current FIGS. 6, 6A, 6B and US patent for more than one image-forming-unit fit into replaceable and changeable disk, holder, tray of at least one of image and/or patterns image-forming-unit.

Both are the Continue filing U.S. Pat. No. 7,455,444 (More than one LED light source), U.S. Pat. No. 7,632,004 (more than one optic means), U.S. Pat. No. 8,277,087 (more than one reflective-unit create multiple visible images). This (XX-2010) is CIP filing for U.S. Ser. No. 12/938,564 Laser project which filed on Nov. 3, 2010 now is U.S. Pat. No. 9,239,513 Jan. 19, 2016 issued.

The current invention is CIP of co-inventor's co-pending filing or following projection light device including:

U.S. Ser. No. 14/024,229 LED light has kaleidoscope means, Filed on September 2013.

U.S. Ser. No. 13/021,124 LED light has changeable image and pattern by kaleidoscope means to project to surfaces. Filed on Feb. 4, 2011 and public on Aug. 9, 2012, public number is 2012-0200-828.

U.S. Ser. No. 12/710,918 LED light has more than one reflector means, Now U.S. Pat. No. 8,8277,087 which similar with current invention to apply the kaleidoscope means which has more than one reflective means hereof use mirror or mirror-like means to assembly into kaleidoscope means.

U.S. Ser. No. 11/806,284 LED light has more than one optic means, now U.S. Pat. No. 7,632,004 which has use more than one optics means which similar with current invention to apply the optics means in front of or back of back of kaleidoscope means to create, adjust, magnify, reduce, enlarge the said the said image, LEDs light beams, LED lights' image, shape which including the any combination from optics lens, optics mirror, laser hologram, laser grating film, optics assembly U.S. Pat. No. 7,455,444 LED light has more than one LED light source, the current invention use more than one LEDs for matrix arrangements with Circuit means, IC means, sensor means, switch means, brightness control means, color mix means, color selection means, color freeze means, motor means, gear means, turn-On and turn-Off means to make the certain number of LEDs turn-On with desired color, brightness, light brightness output, light functions, matrix combinations, motor means, rotating means, gear set means to pass though the said kaleidoscope means, optics means, laser mans, motor means, gear means, to has desired light patterns.

U.S. Ser. No. 12/948,953, U.S. Ser. No. 12/938,564 U.S. Ser. No. 12/886,832, U.S. Ser. No. 12/876,507, U.S. Ser. No. 12/771,003, U.S. Ser. No. 12/624,621, U.S. Ser. No. 12/914,584, U.S. Ser. No. 12/318,471, U.S. Ser. No. 12/318,470, U.S. Ser. No. 12/834,435 and also is continuous filing for co-inventor's prior filing cases as below issued patents:

U.S. Ser. No. 12/292,153 now is U.S. Pat. No. 7,871,192,
U.S. Ser. No. 12/232,505 now is U.S. Pat. No. 7,832,917,
U.S. Ser. No. 12/318,473 now is U.S. Pat. No. 7,832,918.
LED light has laser means
U.S. Ser. No. 12/624,621 (Now is U.S. Pat. No. 8,303,150) LED project light for Seasonal items
U.S. Ser. No. 12/771,003 (now is U.S. Pat. No. 8,408,736) Light device has More than one project means.
U.S. Ser. No. 12/876,507 (now U.S. Pat. No. 8,083,377) Light device has projection function with focus adjustable and project means can change position
U.S. Ser. No. 12/886,832 Digital data projection Light device, Sep. 8, 2010 filed U.S. Ser. No. 12/938,564 Laser projection light device, Nov. 4, 2010 filed, now is U.S. Pat. No. 9,239,513 issued on Jan. 19, 2016. U.S. Ser. No. 12/948,953 LED light has time projection. Nov. 13, 2010 filed.
U.S. Ser. No. 13/021,107 LED light has 3Dimensional projection, Feb. 4, 2011 filed. Above listed Projection light device total has (9) projection light device are parent filing cases as CIP filing of the current invention.

Furthermore the Co-invention also has co-pending filing for light device has interchangeable power source for Wall outlets AC power and Energy storage means (Direct current) including the all kind of combination selection from prong mean, extension cord, adaptor, transformer, Solar, wind power, Batteries, chemical power, biologic power all can be interchange or for any AC or battery power for Desk Top and Plug In type of current invention of project light device has build-in kaleidoscope means. The interchangeable co-filing cases as below:

U.S. Ser. No. 12/318,473,
U.S. Ser. No. 12/940,255 (Now U.S. Pat. No. 8,231,246) #FF-1

So the current invention are CIP for variety of co-inventor's co-pending or co-patents as above listed including: (1) Project light device (2) More than 1 optics means (3) More than 1 LEDs (4) More than 1 reflective means (5) Interchangeable power source (6) Laser Means (7) Adjustable focus and position changeable (8) motor & Gear set for moving adjustable.

This application has subject matter in common with U.S. patent application Ser. Nos. 12/710,561; 12/711,456; 12/771,003; 12/624,621; 12/622,100; 12/318,471; 12/318,470; 12/318,473; 12/292,153; 12/232,505; 12/232,035; 12/149,963; 12/149,964; 12/073,095; 12/073,889; 12/007,076; 12/003,691; 12/003,809; 11/806,711; 11/806,285; 11/806,284; 11/566,322; 11/527,628; 11,527,629; 11/498,874; 12/545,992; 12/806,711; 12/806,285; 12/806,284; 12/566,322; 12/527,628; 12/527,629; 12/527,631; 12/502,661; 11/498,881; 11/255,981; 11/184,771; 11/152,063; 11/094,215; 11/092,742; 11/092,741; 11/094,156. 11/094,155. 10/954,189; 10/902,123; 10/883,719; 10/883,747; 10/341,519; 12/545,992; and Ser. No. 12/292,580.

In particular, the following applications show light devices that have at least some features in common with included or optional features of the LED light device of the present invention: Ser. No. 12/710,561 ("LED power failure Light"); Ser. No. 12/711,456 ("LED light device has special effects"); Ser. No. 12/771,003 ("LED light device has more than 1 reflective means for plurality of image"); Ser. No. 12/624,621 ("projection device or assembly for variety of LED light"); Ser. No. 12/622,000 ("Interchangeable Universal Kits for all LED light"); Ser. No. 12/318,471 ("LED night light with pinhole imaging"); Ser. No. 12/318,470 ("LED night light with Projection features"); Ser. No. 12/318,473 ("LED night light with laser or hologram element"); Ser. No. 12/292,153 ("LED night light with Projection or imaging features"); Ser. No. 12/232,505 ("LED night light with Projection features"); Ser. No. 12/149,963 ("Removable LED light device"); Ser. No. 12/149,964 ("Surface Mounted Device with LED light"); Ser. No. 12/073,095 ("LED Track light device"); Ser. No. 12/073,889 ("LED light with changeable position with Preferable power source"); Ser. No. 12/007,076 ("LED light with changeable geometric system"); Ser. No. 12/003,691 ("LED light with changeable geometric dimension features"); Ser. No. 12/003,809 ("LED light with changeable features"); Ser. No. 11/806,711 ("Multiple LED light with adjustable angle features"); Ser. No. 11/806,285 ("LED Night light with outlet device"); Ser. No. 11/806,284 ("LED Night light with more than 1 optics means"); Ser. No. 11/527,628 ("Multiple function Night light with air freshener"); Ser. No. 11/527,629 ("LED Night light with interchangeable display unit"); Ser. No. 11/498,874 ("Area illumination Night light"); Ser. No. 11/527,631 ("LED Time piece night light"); Ser. No. 12/545,992 ("LED time piece Night light"); Ser. No. 12/292,580 ("LED Time Piece Night light"); Ser. No. 11/498,881 ("Poly Night light"); Ser. No. 11/255,981 ("Multiple light source Night Light"); Ser. No. 11/184,771 ("Light Device with EL elements"); Ser. No. 11/152,063 ("Outlet adaptor with EL"); Ser. No. 11/094,215 ("LED night light with liquid medium"); Ser. No. 11/094,215 ("LED Night light with Liquid optics medium"); Ser. No. 11/092,741 ("Night light with fiber optics"); Ser. No. 10/883,747 ("Fiber Optic light kits for footwear"); Ser. No. 11/498,874 ("Area Illumination for LED night light"); Ser. No. 11/527,629 ("Time Piece with LED night light"); Ser. No. 11/527,628 ("Multiple Function Night light with Air Freshener"); Ser. No. 11/806,284 ("LED Night light with more than one optics mediums"); Ser. No. 11/806,285 ("LED Night Light with multiple function"); and Ser. No. 11/806,711 ("Multiple LEDs Light with adjustable angle function").

A preferred embodiment of the current invention of LED(s) and/or Laser light-device have more than one optics-lens(s) and/or image-forming-piece(s), and each of optics-lens or image-forming-piece(s) has passing-though and/or reflective or/and refractive and/or diffusing and/or grating-diffraction and/or other market available optics-properties within the geometric shape, that provide a plurality of LED(s) or Laser light-beams to passing through or reflecting or/and refracting and/or diffused and/or diffracted and/or go-through and emit out from the said LED or-and laser outdoor projection light The LED(s) or/and laser-light(s) device including at least one LED(s) or/and laser light-source arranged on the inner of the geometric shape outdoor project light housing has more than one of the said reflective or/and refractive optics-lens, and at least one of second or N-number (N is any number) image-forming-piece(s) and/or optics-lens within the geometric shape housing which have reflect and/or refract and/or diffuse and/or diffract and/or go-through optics-properties allow LED(s) or/and Laser-light(s) light-beam from light-source to $1^{st}$ optics-piece (may is image-forming-piece, or optics-lens which has reflective or-and refractive or others optics-properties on both surface(s) including back and forth surface), so some light beams been reflected or-and refracted or-and travel or go-through within the $1^{st}$ optics-piece(s) and other some light beam are passing though the partial transparency optics-area(s) so the light-beam emit out from $1^{st}$ optic-piece(s) to $2^{nd}$ or N-number (N is any number) optics-piece which has refraction and/or reflective and/or go-through and/or grating diffraction and/or diffusing properties to make the light beams emit to outside and create a big range of viewing angle or cover big areas.

The outdoor LEDs or/and Laser-light(s) of current invention are preferably connected with desired circuit, power source, contact-kits, conductive kits, switch, sensor, motor, movement, magnetic unit & coil assembly, spin, rotating kits, gear set(s), speed controller, printed circuit, integrated circuit (I.C.), wireless controller, RF remote controller, and/or related parts and accessories to cause the LEDs or/and laser light-source(s) to turn on and off according to a predetermined time period, functions, colors, and/or effects to provide a desired lighting performance.

In the above-described background of the current invention, the reflective or/and refractive optics-lens may be a texture, printing, painting, art, design, words, reflective and/or refractive and/or diffusion and/or diffraction and/or passing-through and/or block-out optics-properties with mirror-like polished surface, optics lens, convex lens, concave lens, optics properties lens, chrome finished piece, polished piece, double-side mirror, and each one of above discussed item the said unit having desired size, shape, thickness, focus, wide viewing angle properties and let light beam can traveling or passing or reflected and/or refracted and/or diffused and/or diffracted and/or go through one or more than one of the said optics-lens in front of the said image-forming-piece or unit and suitable to the current invention.

The partial transparent, see-though, reflective, refractive, diffusing, diffraction, go-through, block-out optics-properties and features can be provided by a transparent piece, colored transparent piece, painted piece, printed piece, textured-piece, marking-piece, treated-piece, or any other pieces that allow light-beams to pass through or be reflected or refracted or diffused or diffracted or go-through. A power source of current invention can be in the form of an outlet, batteries, solar power, chemical power, or wind power by proper connector(s) at least for AC-plug-wire, prong, male bulb-base or USB-ports.

The LEDs or/and laser light-source can be selected from any combination of single color, multiple colors, multiple pieces, standard, special assemblies, and/or LED and Laser- Light number from 1 to N (N can be any number) to arrange in desire matrix, order, combination with proper spacing which available on the market.

Finally, the distance, position, orientation of the reflective or refractive or diffusing or diffraction or go-though or printed or painted or textured or optics-treated optics-lens in desired assortment for desired number for locations, orientation, position related to the said $2^{nd}$ or N-number (N is any number) more or other(s) light-source, image-forming-unit, project-lens so create desired light-effect(s) with moving or variable or changeable functions of LED(s) or laser light-device(s). The LEDs or Laser light-device(s) arrangement for different of LED or Laser light-source number, position, color incorporate with desired IC chip, controller circuit, functions, and brightness and may selected to incorporate with the said motor/movement/spin/rotating/magnetic & coil assembly can create a desire plurality of light patterns, show, color changing, images changing, moving effects to people to be seen on surface(s) including outdoor garden, building, house, garage-door, fence, walls, floor, front-door, walk-way, path or outdoor desire surface(s).

The said geometric shape optic-lenses have any desired shaped with desired constructions having different effects, the said geometric optic-lenses can have any desired combination selected from the passing through lens, reflective lens, convex lens, concave lens, laser lens, hologram lens, desired focus, thickness, variable thickness, plurality of optics means, wave texture, desired texture, curvature, curve, optics properties on the inner optical element and/or on the outer optical element and/or on all sides of the surfaces to make a certained and desired lighting effects, projections, or effects.

From all the details above, this invention, having more than one built in reflective and/or refractive and/or diffusing and/or diffraction and/or go-through optics-properties optical-piece. The current invention use more than one geometric shape optical-piece(s) for desired arrangement to create plurality or multiple LED and/or laser lighted image and/or patterns and/or beams and/or wordings to pass through, reflect, retro-reflect, refract, diffuse, diffract, go through the said more than one optical-piece(s) combinations or assortment or assembly including position, orientation, orders, desired front-and-back or rotating-or-steady or overlay-or-underlay.

The said optical lens(s) or element(s) may be selected to be incorporated with other electric parts and/or accessories to be able to project, create, or show a wider viewing angle projection of lighted image and/or patterns with motion or steady effects or both effects. The relative distance, position and/or orientation of the said optical-lens(s) or image-forming-piece(s) or projection-lens, the light-source, or any additional elements will result in different light beam performances.

This invention creates a simple way to make splendid, eye-catching, beautiful light show, performance, projection, and creation with the said wide viewing angle to cover a huge outdoor surface or area including garden, building, residence, fence, garage door, pathway, stair, patio, ceiling, wall, or any surfaces that are visibly easy to see but not limited to it.

The current invention is connect with AC and/or DC power source including DC power from USB ports, AC power source from outlet(s), DC power from generator, DC power from chemical material, DC power from solar, DC power from electric-magnetic assembly, DC power from wind generator, and AC power from the male bulb-base power, AC power from AC-Plug wire, . . . etc.

BRIEF OF DRAWINGS

FIGS. 1 and 2 and 3 shown the $1^{st}$ embodiment for LED and/or laser light-device has more than one of optics-piece(s) for multiple times reflection and/or refraction.

Figure 2:
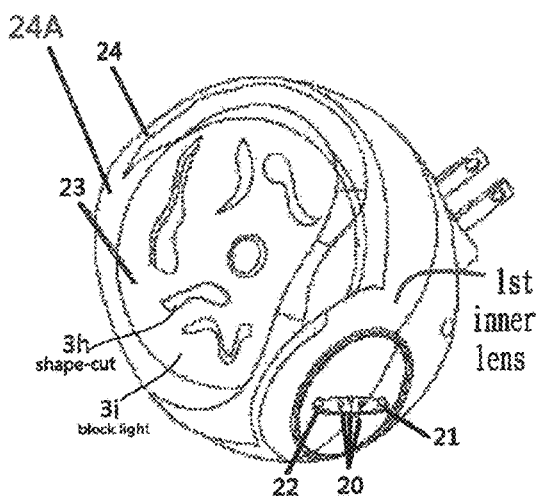
Figure 2A:
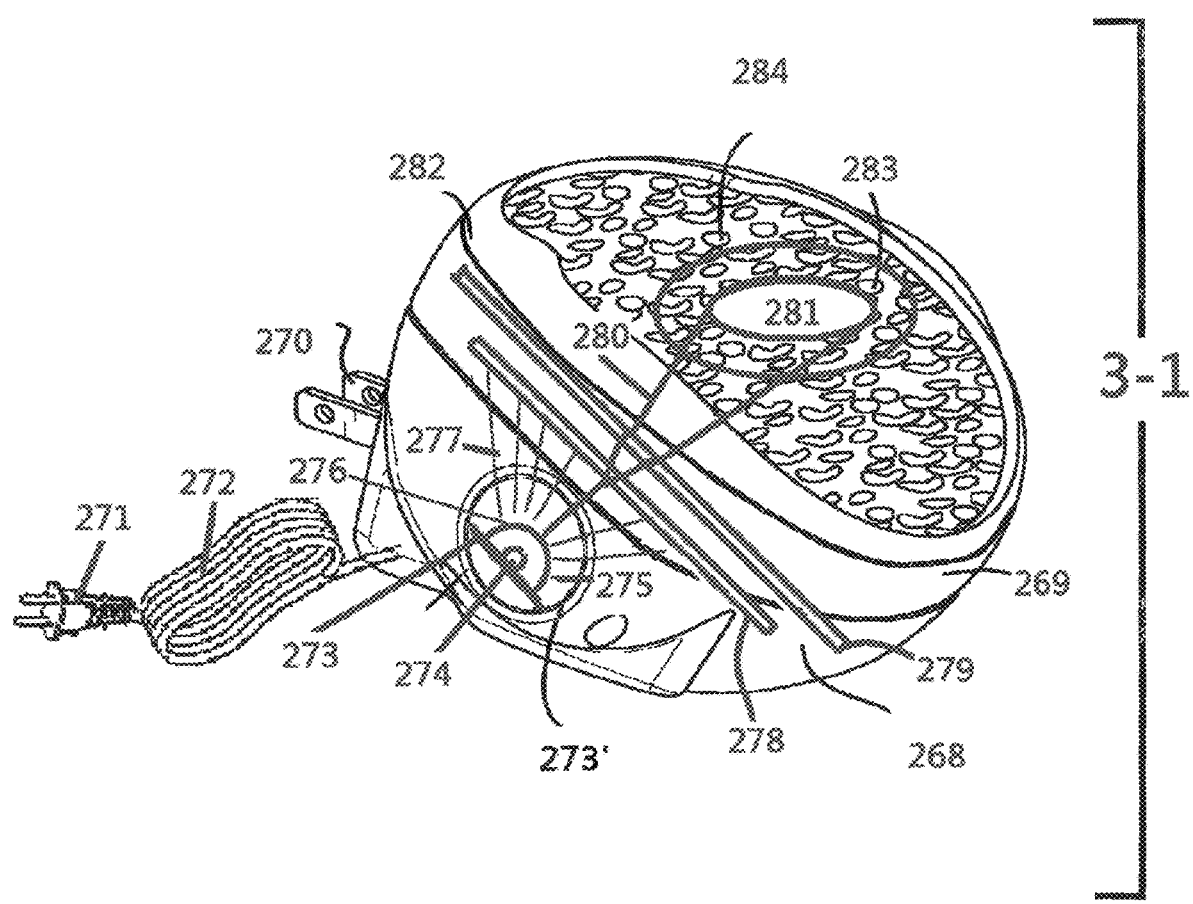

FIG. 2A show the $1^{st}$ alternative LED outdoor project light up-grade model have LED and $1^{st}$ optics-piece to wider LED light-beam emit to rotating cylinder or roll optic-piece(s) by motor & gear-set(s) and go through the $2^{nd}$ fixed position image-forming-piece and $2^{nd}$ magnify-lens to enlarge tiny lighted image and/or pattern and emit to front project-lens or extend-and-retractable project-assembly for manual or automatically adjust focus and power from AC-plug-wire connect with outlet.

Figure 2B:
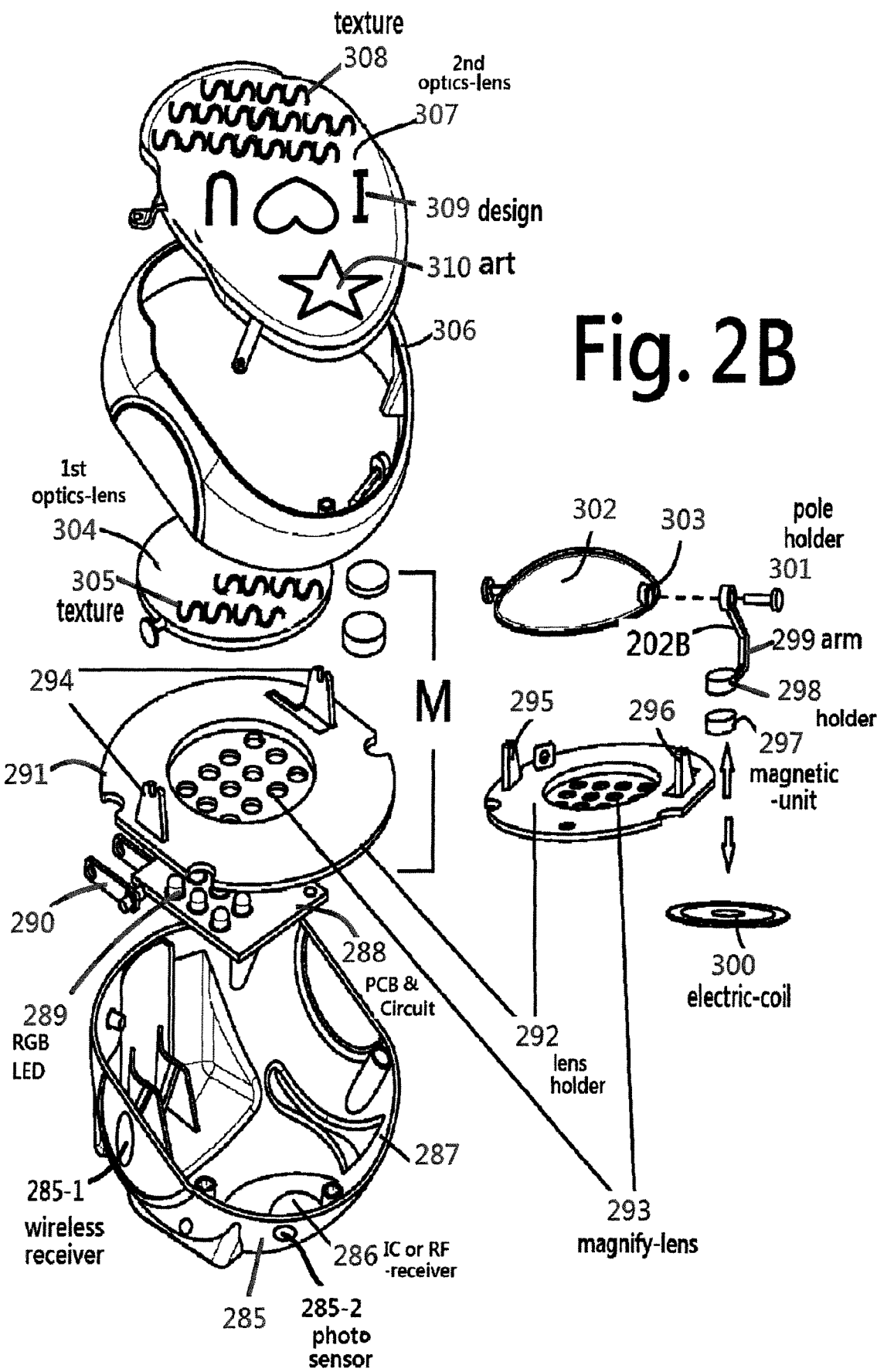

FIG. 2B show the $2^{nd}$ alternative embodiment have the magnetic-unit and electric-coil to make at least one of inner optics-piece(s) having texture or art or design for moving or shaving or waving and go through the $2^{nd}$ optics-piece(s) or top-cover with design, art, opening, printed or painted areas to present desired image and/pattern project out to outdoor surface(s).

Figure 2C:
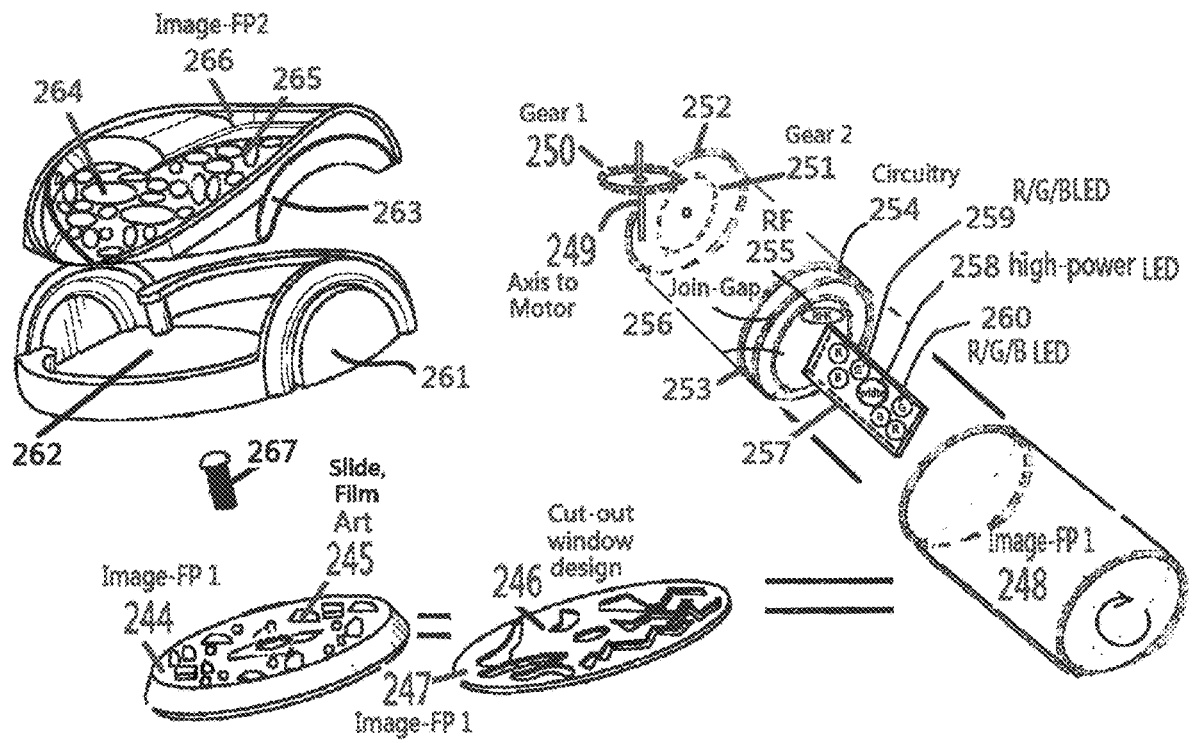
Figure 2C:
Figure 2C:
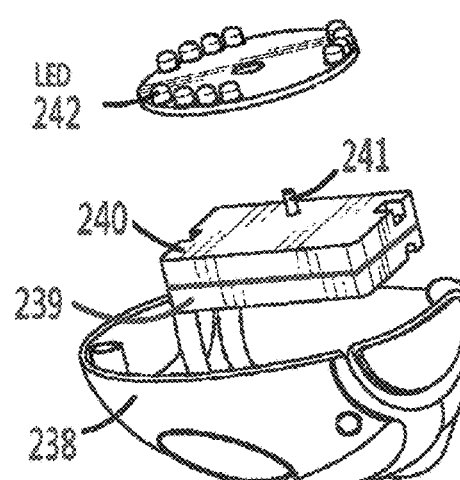
Figure 2C:
Figure 2C:

FIG. 2C show the 3rd alternative embodiment have the motor & gear set(s) to make at least one of inner optic-piece(s) wherein are image-forming-piece(s) and light-beam emit to the $1^{st}$ and $2^{nd}$ optic-piece(s) to get the desired projected image and/or patterns.

FIG. 2D show the one of preferred inner optics-piece(s) of the said LED and/or laser outdoor light device have different treatment of the optic-piece(s) for LED and/or laser light-source.

FIG. 2E show the alternative inner optics-piece(s) of the said LED and/or laser light-device to created very splendid light-beam before emit to the top cover or top optics-piece(s).

FIG. 2F show the gear and gear-assembly that is same as disc-with-teeth same as co-pending (#FF-4=U.S. Ser. No. 14,967,862=Pending case) (#FF-3=U.S. application Ser. No. 14-539,027=Pending case) (#FF-2 U.S. Ser. No. 14/275,184=now allowed) (#FF-1 now is issued patent) (#FF-2008) which parent U.S. Ser. No. 12/318,470 filed on Dec. 30, 2008 now is U.S. Pat. No. 8,721,160 issued on May 13, 2014

FIG. 2G show apply the gear(s) arrangement to change the horizon rotating to vertical rotating or/reverse.

Figure 3:
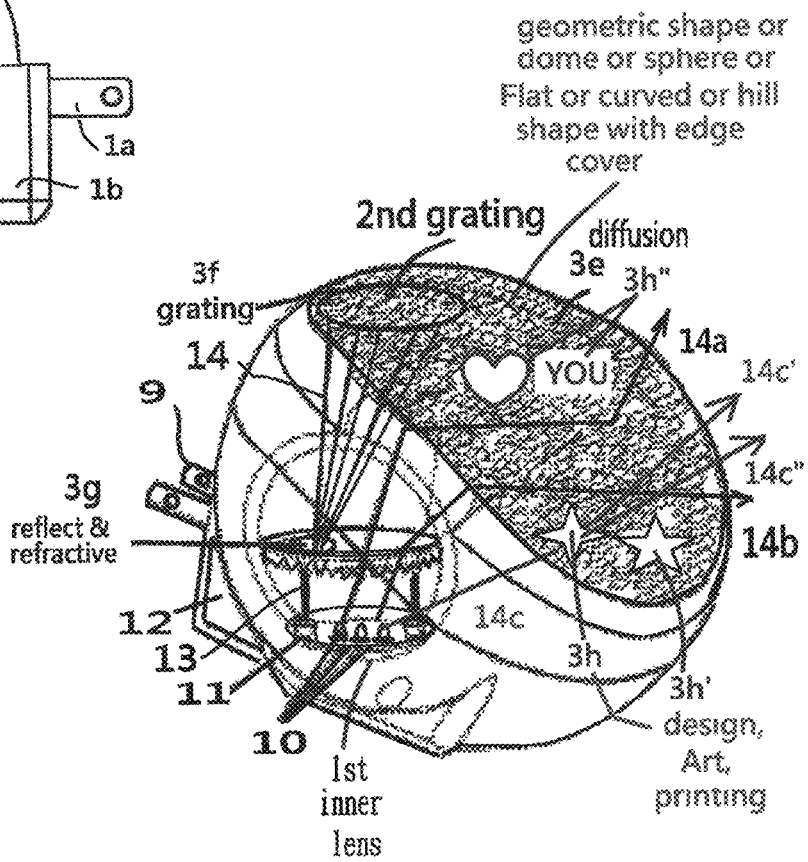

FIG. 3A show the preferred alternative construction for FIG. 3.

Figure 3E:
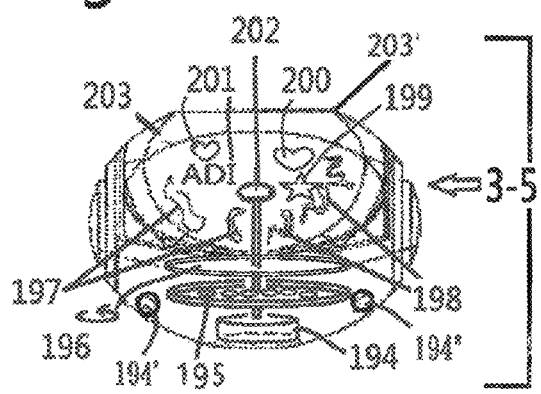

FIGS. 3B and 3C and 3D show the LED outdoor project light have the $1^{st}$ cylinder or roll type optic-piece(s) wherein the $1^{st}$ optics-piece is rotating image-forming-piece and front have the $2^{nd}$ fixed image-forming-piece to form the said image-forming-assembly FIG. 3E show the one of the alternative construction of FIG. 3 LED outdoor project light-device details construction.

Figure 3F:
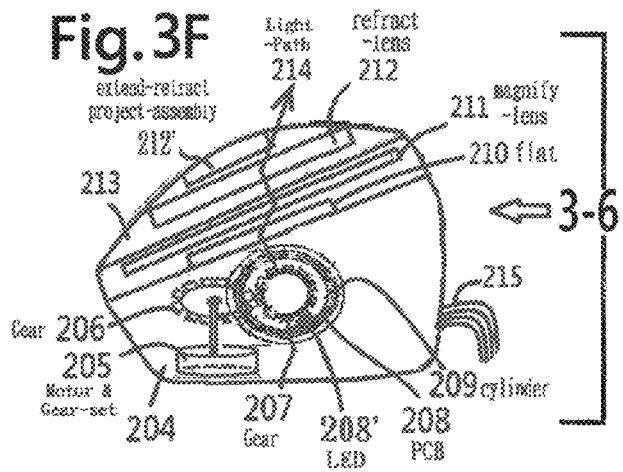

FIG. 3F show the preferred LED outdoor project light-device has motor & gear set and other gear(s) to change rotating-direction to make $1^{st}$ cylinder type optic-piece to rotate and LED light-beam emit to $1^{st}$ and $2^{nd}$ fix image-forming-piece with optional magnify-lens to enlarge tiny lighted image and/or patterns emit to the said project or refract lens or extend-and-retract project refract-lens or assembly to make focus adjust by manual or automatically.

Figure 3G:
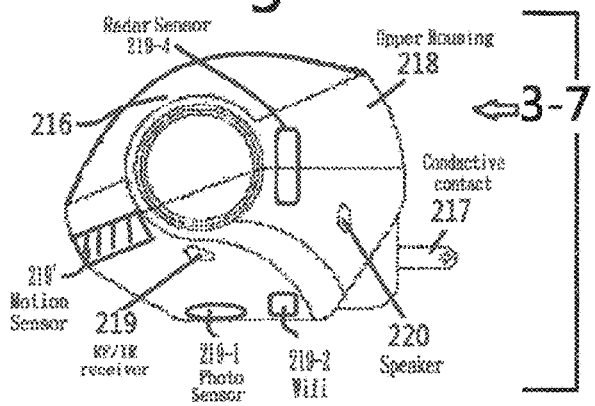

FIG. 3G show the all switch and sensor or other electric parts for LED and/or laser light device including speaker, wireless receiver, all kid of sensor including PIR, radar, power fail, photo sensor, or moving detector to operate the said LED and/or laser light-source or audio system.

Figure 3H:
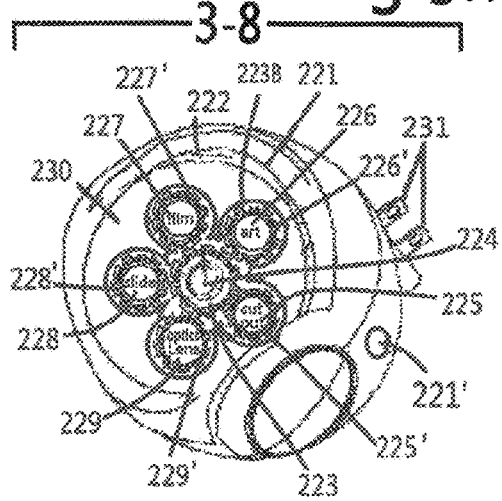

FIG. 3H show the master and surround gear-assembly wherein the said gear-housing have the image-forming-piece within same as current inventor co-pending (#FF-4=U.S. Ser. No. 14,967,862=Pending case) (#FF-3=U.S. application Ser. No. 14-539,027=Pending case) (#FF-2 U.S. Ser. No. 14/275,184=now allowed) (#FF-1 now is issued patent) (#FF-2008) which parent U.S. Ser. No. 12/318,470 filed on Dec. 30, 2008 now is U.S. Pat. No. 8,721,160 issued on May 13, 2014

Figures 3, 4, 5, 6, 7, 8, 9:
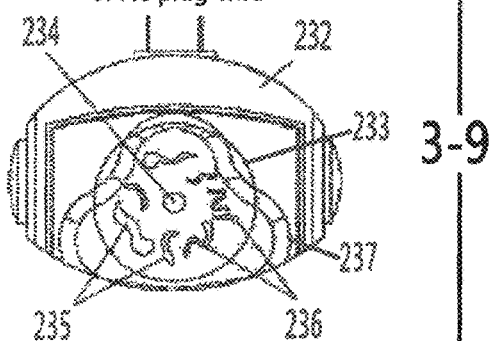
Figures 3, 4, 5, 6, 7, 8, 9, 10:
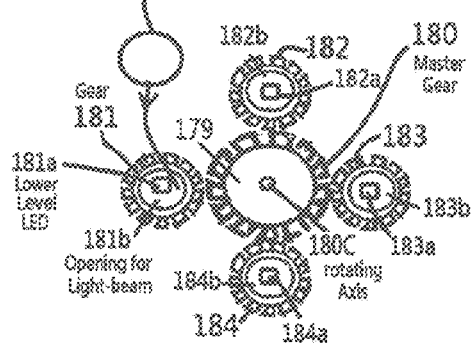

FIGS. 3-9 show the top view of the FIGS. 3-5.

FIGS. 3-10 show the gear-assembly with master and surrounding linkable gear-unit(s) and related LED and image-forming-piece(s).

FIG. 4 show the LED and/or laser light-device where is one of (1) indoor night light has prong (2) outdoor garden or landscape or patio or accent, or holiday, or seasonal light or light-string with the more than one optic-piece(s) to make multiple times of reflection and/or refraction to get desired projected image and/or pattern and/or light-beams.

FIG. 4A show the traditional tube or ice-cream or speaker shape garden light with the AC-plug-wire to get AC power source or outside AC-to-DC transformer to drive inside motor & gear-set(s) and light-source. The said one or more the inner optic-piece(s) rotating and create the very splendid light-beam mixing and emit to front of $3^{rd}$ image-forming-piece which had art, design, window, film, slide fit within the said tray or holder or disc which can replace from housing slot or opening. The said art or design or window has very splendid mixing light-beam get into at least one of the automatically adjust extend-and-retract project refractive-lens or assembly to emit from very fuzzy to very clear continuously focus changing or automatically to get very clear and sharp lighted image and/or patterns depend on market requirement.

FIG. 4B show the motor and gear set make one or more inner optics-piece(s) rotating to get very splendid mixing light-beam and emit out directly from top-cover art, design, window, printed or painting areas to show out projected lighted image and/or patterns without the manual or automatically focus adjustable extend-and-retract refractive-assembly.

FIG. 4C and FIG. 4D show the alternative model for LED and/or laser outdoor project light-device wherein is bulb-type with male bulb-base.

Figure 5:
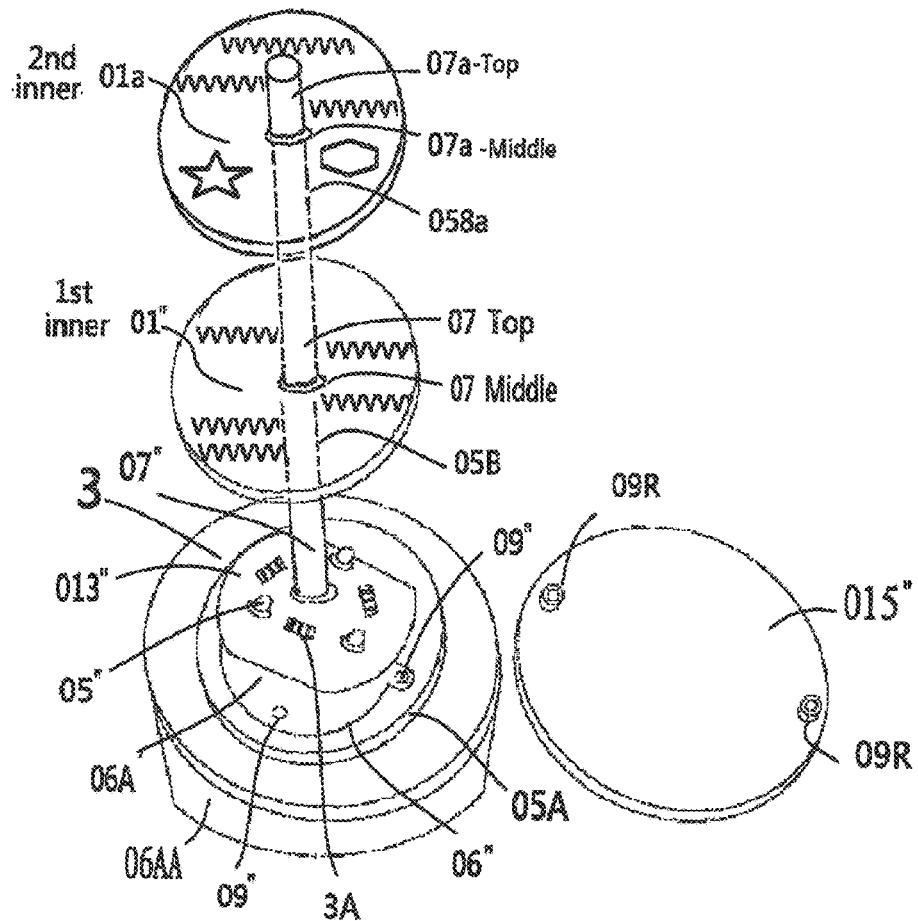
Figure 5A:
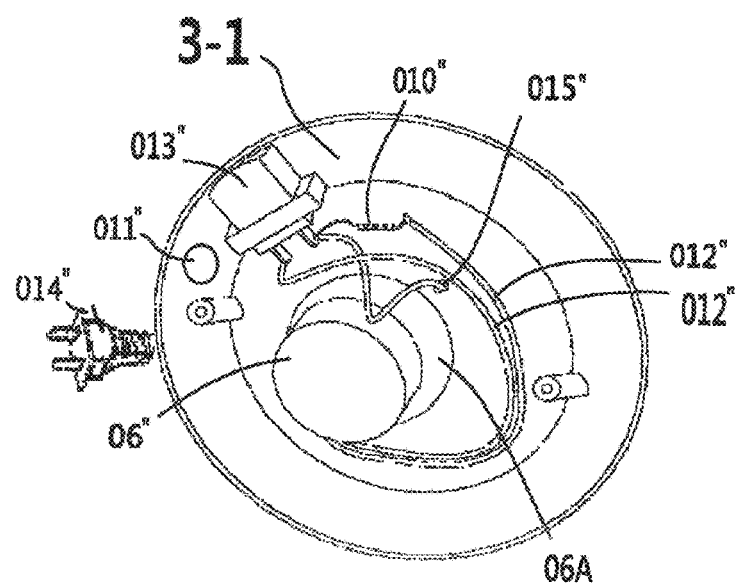

FIG. 5 and FIG. 5A show the basic model for motor & gear-sets to make the inner one or more than one optics-pieces(s) to rotate along the axis and the detail of preferred one of many combination or parts & accessories.

Figure 5B:
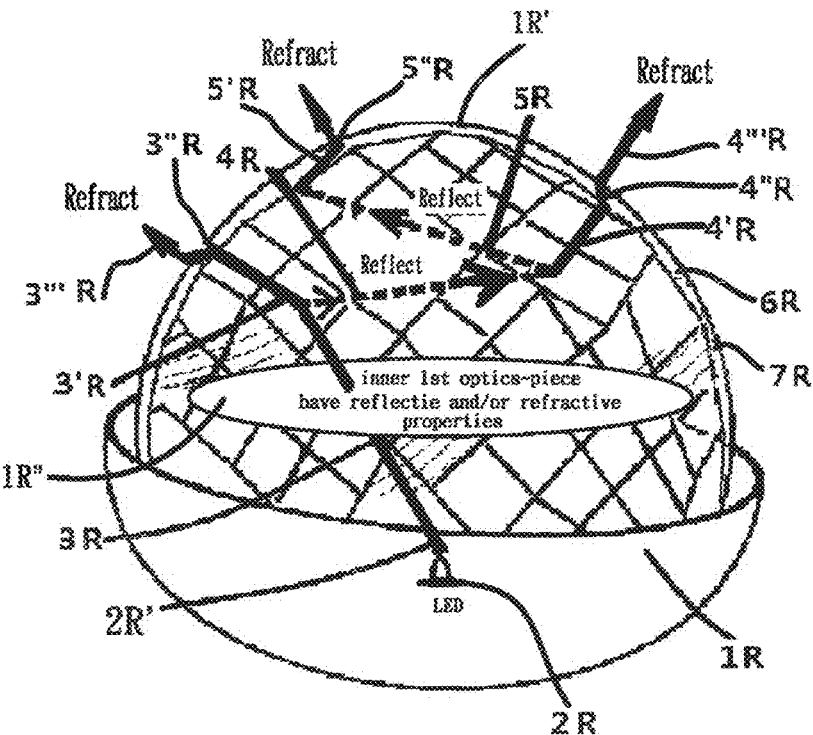
Figure 5C:
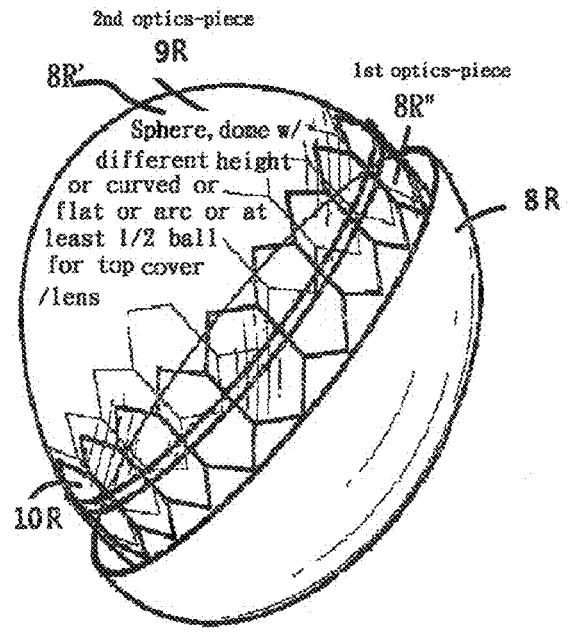
Figure 5D:
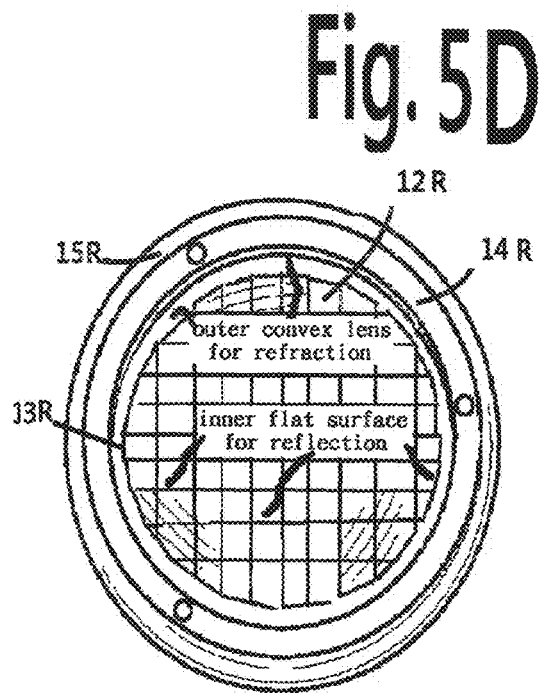

FIGS. 5B and 5C and 5D show the parent filed case for the one of preferred top cover for half-ball, or ⅔ ball, or flat-shape or dome with high or medium or low height which have desired optics-lens or image-forming-piece optics-properties within the top-cover.

FIGS. 5E, 5F, 5G, 5H, 5I, 5J show co-pending parent filed case drawing for detail description for relation with the current invention. This filing is Division filing of (#ZZZ-4) U.S. application Ser. No. 14/296,599 Filed on Oct. 18, 2016 which is Continue In Part filing of (#ZZZ-3) U.S. application Ser. No. 14/503,647 filed on Oct. 1, 2014 now is U.S. Pat. No. 9,719,654 which is Division filing of (#ZZZ-2) U.S. application Ser. No. 14/451,822 filed on Aug. 5, 2014, which is Continue In Part filing of (#ZZZ-1) U.S. application Ser. No. 14/323,318 filed on Jul. 3, 2014 which is Continue In Part filing of (#ZZZ-13) U.S. application Ser. No. 14/023,889 filed on Sep. 11, 2013.

FIGS. 6, 6A, and 6B show co-pending for detail description for relation with the current invention.

(#FF-4=U.S. Ser. No. 14,967,862=Pending case) (#FF-3=U.S. application Ser. No. 14-539,027=Pending case) (#FF-2 U.S. Ser. No. 14/275,184=now allowed) (#FF-1 now is issued patent) (#FF-2008) which parent U.S. Ser. No. 12/318,470 filed on Dec. 30, 2008 now is U.S. Pat. No. 8,721,160 issued on May 13, 2014

FIG. 7 show the rotating inner optic-piece(s) construction and parts arrangement for plurality refractive or project-lens fit into rotatable disc, tray, holder.

FIG. 7A show the upgrade for FIG. 7 has center non-rotating and bigger-size projected image and/or patterns and/or light-beam.

FIG. 7B and FIG. 7C show the alternative for FIG. 7 with top or front cover.

FIG. 7D show the 4 different connector or conductive-contact for current outdoor LED and/or laser project light-device.

FIG. 8 shown the FIG. 7 the arrangement and light-beam traveling path and how to form the big-size project-image traveling path for partial circle or arc.

FIG. 8A and FIG. 8B show the how to apply more than one inner rotating optics-lens to get preferred light-effects with top cover.

FIG. 8C show the laser light application for more than one rotating grating or diffractive properties optic-lens or use a grating-assembly to create laser projected image or patterns or light-beam and how to make the one unit with changeable projected-image/patters/light-beam.

DETAIL DESCRIPTION OF DRAWINGS

Figure 1:
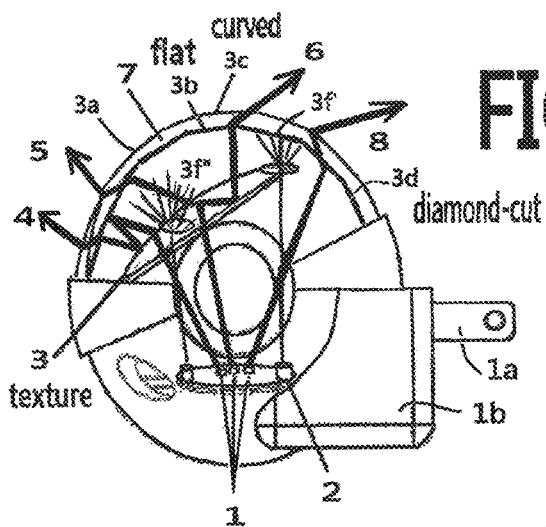
FIG. 1A show the motor & gear-set(s) to make one or more than one of the optic-piece(s) rotating to create lighted image and/or lighted patterns.
FIG. 1B show the LED light device have motor & gear-set(s) to make one or more than one of optic-piece(s) rotating to get desired light effect, performance, functions.
FIG. 1C show the LED and/or laser light device have the desired optic-piece(s) in front of light-source and light-source also aim to the project-image and/or patterns output-end or FIG. 1D show the detail arrangement for the FIG. 1 from top view.
FIG. 1E show one of alternative arrangement for LED outdoor project light with inner one or more optic-piece(s) to create multiple reflection and/or refraction light-beam to came out top-cover art or design or printed-area, painting-sections.

FIG. 1 is the $1^{st}$ preferred embodiment show the LED and/or laser light device (1b) has more than one optics-piece including the $1^{st}$ reflective and/or refractive lens (3) and also the diffractive grating-piece (3f) (3f') fit within the $1^{st}$ optic-lens (3) both belong to the $1^{st}$ optic-lens for LED or laser light-source light-beam.

The light-device has the $2^{nd}$ optic-lens (3a) with flat (3b) and/or convex-lens (3c) and/or diamond-cut (3d) and/or even-thickness optics-lens (3b) for LED light-beam. The LED light-beam came out from $1^{st}$ reflective and/or refractive and/or texture lens (3) emit to the $2^{nd}$ optics-lens (3a) which is outer in preferred shape selected from one or more than one piece at least partial ball combination, ½ with ⅓ ball or other combination, dome(s) with different height, flat-shape, curved shape cover (3a) which having different height, curve-flat or sphere shape and construction for $2^{nd}$ optic-piece which is optics-lens. The said light device has the inner geometric shape inner $1^{st}$ optics-piece (3) which is other optics-lens. Both has its pre-determined optics properties so can allow LED and/or laser light-beam emit out to big area or wider view angle to viewer after multiple reflected and/or refracted the said light-beam. From FIG. 1 the LED light-beam from LED light-source (1) to emit to three directions and path (4) (5) (6) $1^{st}$ hit the $1^{st}$ optic-lens (3) and be reflected and/or refracted and some LED light-beam hit the $2^{nd}$ optic-cover and emit out. The laser light-beam hit the $1^{st}$ optic-lens built-in diffraction grating-piece (3f) (3f') and split the original high-power or wattage laser light-beam into plurality of laser light-beam and can go through the $2^{nd}$ optics-cover built-in diffractive grating-piece to create more splendid laser light-beam or lighted pattern and/or image to get no-harm people eye wattage or power.

FIG. 2 is one of the outdoor garden project light has base (12) and built-in LED (10) and/or laser (11) light source to emit the LED light-beam go through the front $1^{st}$ reflective and/or refractive optic-lens (3i) and go through the top cover reflective and/or refractive and/or diffusion $2^{nd}$ optics-lens to spread out (14a), or the LED light-beam not go through the $1^{st}$ optics-lens (3i) but direct go through the $2^{nd}$ optics-lens opening or window (not punch through) or hit the $1^{st}$ light-beam passable areas (3h) to emit out as line (14c') (14c") to form the lighted image and/or patterns and/or art.

FIG. 2 The said LED and/or laser light-source, the said laser light-source (11) laser light-beam (13) emit to top $1^{st}$ inner optics-lens which having areas with diffractive grating-piece so can split the said laser light-beam (13) into plurality of lower wattage or power middle laser light-beam (14) or lighted patterns or image. The middle laser light-beam (14) emit to front cover which having the areas with diffraction grating-piece (3j) which will split the middle power or wattage laser light-beam into more plurality of the small power or wattage laser light-beam or lighted patterns and/or image.

FIG. 3 is the 3rd preferred embodiment show the LED and/or laser light device (24) has more than one optics-piece(s) including the outer around 180 flat wider opening cover (24A) is the $1^{st}$ optic-piece which is optics-lens (24A) and the light device also have the inner geometric shape $2^{nd}$ optics-piece (23) which is an image-forming-piece in the form of plastic film, slide, film, printed sheet, shape-forming carrier, color film, piece has openings (3h) or cutouts (3h), or windows which is not punch through area (3h), or shaped printed area (3h) made by preferred material to make the inner or lower or behind positioned LED (20) or-and laser (21) (22) light-beam to pass though non-block areas (3h) to create the lighted beam and/or image and/or patterns. The light device (24) also have added N-number (N is any number) inner optics-piece [FIGS. 4 (98)(99), FIG. 4-1 (86') (86"), FIG. 4-2 (102)(103)] [FIG. 3-8 (210) (210')] which is not only one inner optics-lens[FIGS. 4 (98)(99), FIG. 4A (86') (86"), FIG. 4B (102)(103)] [FIG. 3-8 (210) (210')] and the one or more than one of optics-lens [FIGS. 4 (98)(99), FIG. 4A (86') (86"), FIG. 4B (102)(103)] may rotating with different direction so can make the lower or inner LED (20) and/laser (21) (22) light-source light-beam to passing through and emit to the top cover to become very splendid light effects.

The added N-number inner optics-lens [FIGS. 4 (98)(99), FIG. 4A (86') (86"), FIG. 4B (102)(103)] [FIG. 3-8 (210) (210')]can work with moving device [FIG. 4 (95)(96), FIG. 4A (88'), FIG. 4B (123)] to make the lighted image and/or patterns and/or words to be shaking, vibration (1) while the added number of optic-lens is "One" and rotating related to the said inner or lower fixed LED and/or laser light source so the light-beam will changing direction through the "only one rotating optic-lens with reflective and/or refractive properties lens such as prism-lens, so the changing light-beam traveling directions and emit to the fixed front or top cover opening or light-passing through areas to cause (1-1) sometime light emit to right side of openings or hole and (1-2) sometime the light emit to left side of openings or hole, so make the lighted image and/or patterns and/or words look like shaking, vibration, waving effects.

(2) While the Added N-number of optics-lens is "more than one", and at least two of optics-lens is rotating along the different direction such as (2-1) one is clock-wise and (2-2) other is anti-clockwise, so can allow the inner or lower LED and/or laser light-beam to go through "Double times" of reflective and/or refractive and/or diffractive properties optics-lens(s) to created "Double splendid" light-beam before go out from top or front geometric-shape cover. While the light-beam emit out from two or more rotated optic-lens emit to the front or top geometric shape cover which is fixed position not rotating may having art, design, opening, printing, painting, cutout, windows (not punch through) so each light-passing-area(s) has very splendid light-beams and present the splendid lighted image and/or patterns and/or words with splendid moving, changeable effects. Both the said lighted image, patterns came out from the pre-determined image-forming-piece and more than two desired optics properties optics-lens so can allow LED or-laser light-beam emit out to big area or wider view angle to viewer.

FIG. 1A, FIG. 1B, FIG. 1C, FIG. 1D shown the $1^{st}$ preferable embodiment major 2 optics-piece(s) and parts details.

From FIG. 1A the inner housing the $1^{st}$ or more number of the inner optics-piece is optic-lens (28) which has reflect and/or refract and/or laser diffraction grating optics-properties optics-lens(s) rotating in clockwise and/or anti-clockwise for each one by motor and gear-set(s) to change the lower positioned at least one LED (26) and/or laser light-beam for splendid light effects. The said $2^{nd}$ or more number of optics-lens(s) is a front cover (27) having geometric shape including different height dome, curved, flat, sphere shape front cover with art, design, painting, printing, window (not punch through), film, slide or cut-outs fit within so can let light-beam emit out from the $1^{st}$ optic-piece (28) to become lighted image and/or pattern and/or wordings.

From FIG. 1A inside housing (25) have motor(s) and related gear-set(s) (26-1) to make individual or more than one image-forming-unit(s) or film or slide or cutouts or inner optics-lens (28) to rotating along with related LED (26) and/or refract-lens and/or front added focus adjustable lens-assembly, and/or front magnify-lens assembly.

From FIG. 1B show the $1^{st}$ inner optic-piece is optics-lens (31) or lens-assembly (31) and LED (30) and optional motor (30') and related gear-set(s) (30") fit into the housing (29) with the conductive-contact which can be prong (33) (34) or bulb-base (35) or AC-plug-wire (36) or outside AC-to-DC transformer (37) for outdoor garden, seasonal, holiday light or light-string applications.

The said LED (30) light-beam emit through the $1^{st}$ or more number of the $1^{st}$ optics-lens or lens-assembly (31) and LED and/or laser light-beam at least some of light-beam have reflected and/or refracted and some of light-beam emit to the $2^{nd}$ outer optic-piece which is a optics-cover in desired geometric shape and construction with desired combination for above list the optics-properties so make the lighted pattern, and/or image, and/or wording with moving or changeable or shaking or vibration or rotating while incorporate the lower positioned motor (30') and its related gear-sets (30") to rotate the said at least one or more of inner optics-lens (31).

From FIG. 1C show the LED and/or laser light device have the inner LED (40) light-beam go through the inner $1^{st}$ or more fixed or rotating optics-lens (not shown) and light-beam emit out from the $1^{st}$ optics-lens (41) emit to the $2^{nd}$ optics-piece (41) having desired design or art or painted or printed or light-passing areas (43) to form the star or desired shape and go through the said outer the 3rd optics-lens (42) is a optics-cover has refractive and/or reflective optics-properties (42) to form the big size lighted-image and/or patterns or words on outdoor surface. Alternative or the said LED light device housing (38) also has built-in laser light-source (44) and emit out single high-wattage laser light-beam and emit to desired number of inner housing diffractive grating piece(s) (45) or area(s) inside the hosing (38) and emit plurality of the said lower-wattage laser lighted image and/or pattern through the outer-cover (46) which functions is protection cover.

It also show housing (38) embodiment incorporate the RF receiver unit (38-2) and the said LED and/or laser light-device housing (38) has incorporated with AC-plug wire (39) without AC-to-DC circuit inside or incorporated with the outside transformer (37) which has built-in AC-to-DC circuit inside and export the DC current into the light-device.

From FIG. 1D shown the LED and/or laser light-device have base (47) to install the said LEDs (49) and motor & gear-set(s) (47-2) and circuitry & IC board (50). The motor & gear-set(s) make the said inner at least one or more of $1^{st}$ optic-lens (51) to rotating to came out the splendid light-beam for desired colors, brightness, moving, waving, or shaking and the LED light-beam emit out from the at least one or more inner $1^{st}$ optic-lens (51) or go through the said outer the $2^{nd}$ optics-cover (52) design, opening, printed, painting areas (53) and emit out from the $2^{nd}$ optic-cover to wider outdoor areas. It is appreciated for alternative arrangement that the said art (53) or design or opening or cutout or film or slide is arranged on the inner most front optic-piece (51) in front of all other lower optics-lens (not shown) so the light-beam go through inner optic-lens design (53) or art or window area(s) to form the said lighted-image and/or patterns and go through the outer protection cover (51) with or without the said art or design.

From FIG. 1D also show the tubular or cylinder or ice-cream cone shape or other geometric housing (47) has built-in wireless controller receiver (4-01) or RF receiver (57) to receiver the electric signal or RF signal to drive the circuitry and IC (50) to make the said light-source (49) and/or motor & gear-set (47-2) to make desired functions, light effects, color mixing, color selection, functions selection, motor & gear-sets setting or speed adjustable.

The said LED and/or laser light-device get AC power source for the current invention for outdoor project light is from outside transformer (55) which has built-in AC-to-DC circuitry.

From FIG. 1, FIG. 2, FIG. 3, FIGS. 1A to 1D the current invention show the some optics-piece(s) including;

(1) Optic-lens has textures (2) image-forming-piece made of other material has shape holes, opening, cutouts, window, stencil, film, slide, LCD display, wireless changeable images.

(3) Image-forming-piece or Optic-lens is moving while incorporate with motor with crane-shift, motor with more than one of gear-set(s) motor & gear-sets & axis, spin kit, rotating kits, clock movement, magnetic unit & coil assembly.

(4) optic-lens or optics-cover is a geometric shape unit has plurality tiny reflective lens arranged to form one geometric shape surface with different shape, size, color, thickness, variable thickness into or form a one unit to get fixed LEDs or-and Laser-light light-beam to plurality of light-beams become very splendid and spread out light beam including prism-lens, diamond cut-lens, jewelry-lens.

(5) Optic-lens for dome with different height, half ball, ⅔ ball or sphere shape Cover which has wide diameter-opening so can has wider viewing angle open-space to allow all light-beams to spread out to wider and bigger areas with said designed Image wanted with or without refractive optics properties.

(6) image-forming-piece is made by preferred material such as plastic can be any shape such as sheet, piece, flat, coil, roll, ball, half ball, dome, nuts, ⅔ ball, sphere, bar, cover or any other geometric shape with its preferred optic construction including texture, opening, window, printing, painting, art, design, slide, film, character image, LCD display, and incorporate the optional front $2^{nd}$ image-forming-device and/or incorporate with front extendable & retractable to adjustable focus project-lens assembly, convex lens, magnify lens, variable thickness lens, variable focus by plurality of tiny optic-lens, reflective piece, refraction-lens and make the said lighted image and/or patterns have steady fixed or have moving, waving, shaking, vibration, rotating device to added features. So these are the other features for the current invention from the above FIGS. 1, 2, 3, 1-1, 1-2, 1-3, 1-4.

From FIGS. 1, 2, 3 It has alternative design to get desired light effects which just has IC and related circuitry incorporate with more than one LEDs or/and laser light-source(s) so can use LED or-and Laser light source has different time to turn on and turn off with desired cycle, duration and frequency so can make the lighting is changeable for color, brightness so look like the moving or variable light effects to save a lot of complicated assembly or cost by using the motor or movement.

The LEDs or/and laser light-source(s) may selected from group of color, specification, size, functions, power, watt, and each LED or/and laser-light(s) can has its emit direction, orientation, angle to anywhere while the inner of light-device housing has more than one reflective and/or refractive lens as inventor's prior patented claims so the each LED or/and laser light-device has different light emit direction even LED or/and laser-light emit angle is narrow but after the light beam travel the said one or more than one of reflective or/and refractive lens(s), then, the light will come out from its wide opening cover including 180 flat, dome with different height, ½ ball, ⅔ ball, sphere or flat-dome shape protect or projection cover so can get the wider viewing angle image or lighted patterns shown on desired sides, areas, surface.

This is the result basing (1) more than one LEDs or laser light-source(s) (2) more than one Reflect and/or Refractive optics-lens or units (3) more than one image-forming-piece with desired optic properties (4) selected incorporate with other parts & accessories may in desired combination selected from motor, one or more than one gear-piece including the master-gear and more than one surrounding join gear-piece, cam-shaft, movement, magnetic unit & magnetic-coil assembly for inductive reaction the optic-lens waving, interchangeable power source, moving optics-elements, optic-element made of light-block material has shaped holes or opening or windows, texture lens, optics lens, plurality of optics lens, IC, wireless connection kit, wife receiver kit, RF receiver kits, and AC-plug-wire or other conductive-connector to get AC and/or DC power source . . . etc. It is appreciated that all above list co-pending or co-inventor earlier filed case still fall within the current invention scope, coverage and claims especially including all inventor's co-pending prior arts scope as inventor's all prior patents and co-pending all LED project light concept as above and below listed (9) co-pending and issued prior arts.

U.S. Ser. No. 12/318,471, U.S. Ser. No. 12/318,470, U.S. Ser. No. 12/834,435 and also is continuous filing for co-inventor's prior filing cases as below issued patents: U.S. Ser. No. 12/292,153 now is U.S. Pat. No. 7,871,192, U.S. Ser. No. 12/232,505 now is U.S. Pat. No. 7,832,917, U.S. Ser. No. 12/318,473 now is U.S. Pat. No. 7,832,918. LED light has laser means U.S. Ser. No. 12/624,621 (Now is U.S. Pat. No. 8,303,150) LED project light for Seasonal items U.S. Ser. No. 12/771,003 (now is U.S. Pat. No. 8,408,736) Light device has More than one project means.

U.S. Ser. No. 12/876,507 (now U.S. Pat. No. 8,083,377) Light device has projection function with focus adjustable and project means can change position U.S. Ser. No. 12/886,832 Digital data projection Light device, Sep. 8, 2010 filed U.S. Ser. No. 12/938,564 Laser projection light device, Nov. 4, 2010 filed U.S. Ser. No. 12/948,953 LED light has time projection. Nov. 13, 2010 filed.

U.S. Ser. No. 13/021,107 LED light has 3Dimensional projection, Feb. 4, 2011 filed. Above listed Projection light device total has (9) projection light device are parent filing cases as CIP filing of the current invention.

From FIG. 1 and FIG. 2 and FIG. 3 show the indoor application for LED and/or laser project light that is Plug-In type light device with have prong to plug-in wall outlet to get the Alternative Current (A.C.) to drive the inner circuit, LEDs or/and laser light, Sensor, switch, controller or wireless controller, and optional motor to make the moving optics-element including but not limited for optic-lens so can make motion effects of the related image to ceiling/walls/floor has plenty of color and moving (If add the motor or moving device). While FIGS. 1-1, 1-2, 1-3, 1-4 the prong (34) (33) change to AC-Plug-wire (37) (39) as the FIG. 1-3 and FIG. 1-4 is for the outdoor application LED and/or laser project light device.

The said geometric shape optics-element(s) has more than one optic-lens has optic-properties including reflective and/or refract and/or shape the lighted image, or image-forming-piece(s) that can create or shape the lighted patterns and/or image and/or the light-beam properties for the current FIGS. 1, 2, 3, 1A, 1B, 1C, 1D for all the said optics-elements of LED or-and laser light device.

The said LED or-and Laser light which preferred has the sphere or ball or half ball or ⅔ ball or dome or around 180 degree flat wide opening lens as top cover optics-lens has desired of optics-lens with desired optics properties including magnify and diffusion or spread out the light beams by (1) mirror-polished reflective or refractive lens for outside or inside and has (2) round convex surface outside of each optics-lens so it become a convex-lens so it will be not only can reflect the light beams also can allow light beam refraction and pass through to 180 degree wide opening flat cover or dome cover or sphere cover so the wider 180 degree flat opening or dome or sphere or half-ball or ⅔ ball Cover optics-lens is needed for current invention.

It is appreciated that the details drawing show as FIG. 5-10 for the Alternative Current (A.C.) to use outside transformer (013) get AC power by AC-plug-wire (03) and incorporated the light-device built-in receptacle (015) to receiving male plug (014) from transformer (013), or adaptor (014) or light-device has its own built-in AC-to-DC circuit inside and the AC-plug-wire. While male-plug (014) insert into the receiving-port (015) from the outside transformer (013A) so AC wires current drive the light-device circuit to make the light source(s) turn on and emit light beam to desire area(s) with sensor or switch or wireless controller. It also can use USB male-plug and wire to get power from the outside power source through light-device built-in USB Ports.

From FIG. 1E show the alternative embodiment for outdoor project light device has the base (58) which has built-in audio-system including the speaker (58-1) which can connect with blue-tooth or pre-recorded IC to play the sound matching the projected lighted image and/or patterns and/wording. The said base (58) have built-in circuit and PCB (60) which has desired electric parts and accessories fit within at least have the LEDs (62) And RF-receiver (61) and other IC related circuit to make the said LEDs (62) to have pre-determined light functions. The added magnify or optic-lens to put in front of the said each or all LED(s) (62) so make the LED light-beam wide spread out to the top image-forming-piece (70) and go through the texture of the optic-lens (70) or the design (72) or art (72) or printed-area or painted-areas. Alternatively can add $2^{nd}$ optic-lens (71) or $2^{nd}$ magnify-lens (71) to make the said $1^{st}$ image to be-enlarge for more good result. The lighted pattern or image came out from $1^{st}$ image-forming-piece or optics-lens (70) emit to the front optics-cover with desired optics-properties may selected from reflective and/or refractive and/or passing-through with or without art (74) (74') and/or simple just is one of the protective-lens. The said FIG. 1E light-device connect with AC power source can be use conductive-contactor is a prong (16b) for indoor project light only and it is appreciated the said conductive-contractor can be an AC-plug-wire for outdoor application but not limited to only an AC-plug-wire which also can be prong, USB-port, male bulb-base as above discussed. From FIG. 1E also had $2^{nd}$ circuit board (63) which has other circuitry to get AC power-source from outlet and change by built-in $2^{nd}$ circuit board (63) its AC-to-DC circuit to change AC current to DC current for all IC or RF receiver or Wifi receiver or blue-tooth receiver and also supply desired current to audio system to play sound or music match the lighted image and/or patterns.

From FIG. 1 and FIG. 2 and FIG. 3 shows light device its optic-element has more than one reflective or refractive on its surface within one optics-lens to allow light beam can traveling or pass though the convex-lens especially for the TOP Cover Optics-element and reflect within the reflective-lens or refractive lens (2 in one piece) to let light emit out to create image on ceilings, walls, floor, so the more than one of optics-elements also including the one piece of lens has more than one optic-properties.

FIG. 1A and FIG. 1B and FIG. 1C and FIG. 1D: shows a first preferred embodiment of the current invention has (2) optics elements—one is top cover is optic-lens with refractive or-and reflective properties and one is inner disc-like optics-lens has refractive or-and reflective properties or convex lens both has the preferred wave-textures has variable thickness so the LEDs or Laser-Lights some of the light beam can passing though the disc-like optics-lens has wave textures then has $1^{st}$ lighted patterns or image and all these $1^{st}$ group light beam will traveling or passing the $2^{nd}$ big and wide optics-lens to create the super large size viewing angle image, lighted patterns, message, time, geometric art, nature scene, galaxy, milky way, sky, cloud, starts, moon, water waves, animal, characters, cartoon, sign, logo, commercial to been seen.

From FIG. 2A shows the Third preferred embodiment (3-1) again has more than one of optics elements including top around 180 degree wide opening optic-lens cover (284) which preferred has wave-like textures or plurality of small convex lens (283) with different focus design big or small size mixed with variety of the thickness or-and refractive or-and reflective properties so has variable focus while the LEDs or/and laser-lights light-beam hit the cover (284) some light beam will reflective and some light beam will refractive to viewer or desired areas.

For FIG. 2A, the said outdoor project light-device (3-1) housing have more than one $1^{st}$ optics-piece (275) (278) (279) and the number is three and all belong to optic-lens(s). The said $1^{st}$ optics-lens (275) is making LED light-source (274) light-beam to spread out to wider areas (277) so can emit into the said $2^{nd}$ inner optics-lens (278) and then emit to the 3rd optic-lens (279) wherein in order to make more splendid LED light effects, the said $2^{nd}$ and 3rd optics-lens can rotating on anti-clock-wise direction so can make very splendid LED light-beams and emit out to the front art or design or painted or printed area (281) which and make the art or design has very splendid light performance to be seen on outdoor surface(s) including garage-door, front door, garden, building, fence, ground while have sufficient number of the high-power LED light-source (274). The said LED light-device (269) the said $2^{nd}$ and 3rd inner optic-lens incorporated with motor, or magnetic unit & coil assembly, to make shaving, waving, moving, motion of the said moving optic-lens (278) (279) so the light-beam traveling or passing though the inner moving optics-lens (278) (279) will make the LEDs light-beam become changeable position, direction, orientation and hit the top cover art or design area(s) or window(s) to come out more splendid light effects may be in any combination select from image, lighted patterns, message, time, geometric art, nature scene, galaxy, milky way, sky, cloud, starts, moon, water waves, animal, characters, cartoon, sign, logo, commercial to been seen. From FIG. 2-1 the front or top optics-cover has art or display or design area(s) (281) and rest-area (283) of the cover (283) may have other optics-lens with different or other optics-properties may selected from reflected and/or refractive and/or diffusion and/or diffraction grating and/or see-through or design combination for optics-properties from market place so can make the said one LED light-device had more than one light performance and can be change or select the preferred functions by switch, sensor, remote controller in blue-tooth, RF, IR, wifi with download APP to operate the functions including color-changing, color-mixing, brightness controller, functions change, color selection, functions selection, audio related changing as above discuss preferred embodiment from FIGS. 1, 2, 3, 1A to 1E Also, From FIG. 2A the LED light-device get AC power source by built-in prong (270) or AC-plug-wire (272) which has AC-plug (271).

From FIG. 2A also can have the Alternative arrangement for the optics-pieces that will make the continuously moving the lighted image and/or patterns while the LED (274) emit the light-beam out through the front magnify-lens (275) and emit to the a cylinder coiled image-forming-piece (273') form the $1^{st}$ image and/or patterns and the LED light-device (269) has $2^{nd}$ image-forming-piece which is flat and position in front of the said $1^{st}$ image-forming device so can make one continuously moving image shown on the steady-and-fixed position back-ground lighted-image effects. It also can have more steady-and-fixed position back-ground image-forming-unit(s) as co-inventor for LED light has such arrangement show on (#WWW-2013) U.S. Pat. No. 9,648,672 Filed on Jun. 21, 2013 U.S. Ser. No. 13/923,721 which show the motion effects by 3 layer of display to show continuously such as rain-drop or snow-flake falling down from sky to ground continuously effect and the U.S. Pat. No. 9,648,672 also show the coiled image-forming-piece as FIG. 4 show "3Dimension application such as 3 cylinder image-forming-piece" and its Child-filed case (#WWW-1) US patent U.S. Pat. No. 10,045,405 had the same drawing on FIG. 4 which issued on Aug. 7, 2018. So this is the co-inventor co-pending case and not for co-inventor PRIOR-ART for the same concept of coiled cylinder image-forming-piece for LED light-device and any US patent filed case after the Jun. 21, 2013 (#WWW-2013) U.S. Pat. No. 9,648,672 should not allow the "coiled cylinder image-forming-piece" for all LED light including indoor and outdoor light except the inventor of current case.

From FIG. 2A, the LED light-beam emit out from the magnify-lens (275) and emit to the coiled cylinder $1^{st}$ image-forming-piece (273') to create the continuously moving effect and plus the $2^{nd}$ image-forming-piece (278) which is a slide or printed or painting piece (278) with art or design to match the image or design or art of $1^{st}$ cylinder rolling image-forming-piece (273') so form a continuously moving image with steady-and-fix background as co-inventor (#WWW-2013) U.S. Pat. No. 9,648,672 filed on Jun. 21, 2013. The said continue moving image and patterns with steady-and-fixed background image emit to the front magnify-lens (279) to enlarge again because the rolling cylinder its image is very tiny so can coiled into very small diameter to reduce the light-device dimension so need the extra one or more magnify-lens in front to enlarge it more bigger so can emit to front the said reflective and/or refractive project lens or project-assembly which has the extend-and-retract refractive-lens to adjust the focus as above list the co-inventor co-pending (#FF-4=U.S. Ser. No. 14,967,862=Pending case) (#FF-3=U.S. application Ser. No. 14-539,027=Pending case) (#FF-2 U.S. Ser. No. 14/275,184=now allowed) (#FF-1 now is issued patent) (#FF-2008) which parent U.S. Ser. No. 12/318,470 filed on Dec. 30, 2008 now is U.S. Pat. No. 8,721,160 issued on May 13, 2014 on claim 5.

From FIG. 2A (275) (278) (279): One or more inner optics-lens having reflective and/or refractive properties to rotating to created splendid plurality of light-beams. This is same as above discussed said co-pending (#FF-4=US Series Number 14,967,862=Pending case) (#FF-3=U.S. Application Ser. No. 14-539,027=Pending case) (#FF-2 US Series Number 14-275,184=now allowed) (#FF-1 now is issued patent) (#FF-1) U.S. Pat. No. 8,721,160 B2 which file don 10-28-2010 and Division of application Ser. No. 12/318,470 filed on Dec. 30, 2008 claim 2 [An LED project light as claimed in claim 1, further comprising at least one of the following element (a) a telescope assembly, (b) tile means for tilting said optics means, (c) ROTATING MEANS FOR ROTATING SAID OPTICS MEANS, (d) adjust means for adjusting said optics means, (e) a roller and (0 an elastic member to change a project direction of said light]. Wherein, the (c) rotating means for rotating said optics-means", and/or At least one of the image-forming-device is a sheet or a roll or a cylinder or tubular construction to make it rotating to change image. This is same as co-pending(#FF-4=US Series Number 14,967,862=Pending case) (#FF-3=U.S. Application Ser. No. 14-539,027=Pending case) (#FF-2 US Series Number 14-275,184=now allowed) (#FF-1 now is issued patent) and issued (#FF-1) U.S. Pat. No. 8,721,160 B2 which file don 10-28-2010 and Division of application Ser. No. 12/318,470 filed on Dec. 30, 2008 claim 3 [An LED project light as claimed in claim 2, wherein said SLIDE ARE CHANGEED BY AT LEAST ONE OF SAID ROLLER, said elastic member, and a push button.

From FIG. 2B show the multiple different color of LED and/or laser light-source (289) wherein from FIG. 2B is LED which has Red, Green, Blue or other color LEDs (289) fit within the PCB (288) with preferred IC and circuitry to drive the same multiple LEDs (289) to turn-on/turn-off, chasing, sequential, flashing, fade-in and fade-out, random flash, pair-flashing, mixing color, auto changing color, select color or other LED light effects available from market place. In front of the each LED (298) optional to add the $1^{st}$ optic-piece (293) may select from one of magnify or convex lens or concave-lens (293) in order to get wider emit-out angle or focus the light-beam aim to front image-forming-piece (for each LED. The said $1^{st}$ optic-piece (293) can arrange in one holder or tray (291) to easily assemble with the each LED (298). The tray or holder (291) top surface may have a pair of the supporter or holder (294) to hold the $2^{nd}$ optics-piece (302) two ends or two ears (303) to make the $2^{nd}$ optics-piece (302) moving or shaking or waving along the two ends (303) and one of the end or ear (303) is assembled with one arm (298) by fixing-kits (301) and the arm bottom has one magnetic-unit (297) holder (298) so can fit the magnetic-unit (297) into and make reaction with the lower-positioned electric-coil (300) which is connect with the circuitry (not shown) to supply the electric signals with variable amount so the electric-coil (300) will change electricity to magnetic-force to push the top magnetic-unit (297) away to cause the arm (299) to move the $2^{nd}$ optic-piece here is $1^{st}$ or $2^{nd}$ (if count the lower $1^{st}$ optic-piece together) optics-lens (302) with preferred texture (305), optic-treatment, marking, logo, words, design, art so this will make the image and/or patterns while the lower position LEDs (289) light-beam travel the said $2^{nd}$ optic-lens (302). The light-beam passed the $1^{st}$ or $2^{nd}$ optics-lens will emit to front $2^{nd}$ or called 3rd optics-lens (307) which has optional $2^{nd}$ image-forming-piece (if count the $1^{st}$ or $2^{nd}$ optics-lens as $1^{st}$ image-forming-piece). The lower $1^{st}$ image-forming-piece (304) is moving or waving or shaking by magnetic-unit (297) and electric-coil (300) which is equivalent or equal function as earlier discussed the FIG. 2 or FIG. 3A both has the motor or movement or spin device to make the image-forming-piece or optics-lens with optics-treatments for form the image and/or patterns. The one preferred embodiment for FIG. 2B is the water-wave light-effect. While the LED light-beam emit to the inner $1^{st}$ optics-lens (304) with water-wave textures (305) so form the $1^{st}$ water-wave lighted image and/or patterns which is moving or shaking or waving by the reaction of the said magnetic-unit (297) and electric-coil (300). The waving or shaking or moving $1^{st}$ lighted water wave light-beam emit to the front $2^{nd}$ optics-lens (307) also has water wave textures or treatments (308) but it is fixed on the frame or top-housing-part (306) so one is moving, one is steady so can look similar real water waver like river or sea or ocean depend on the design or art for water wave texture and reaction of magnetic-force.

The FIG. 2B also can have alternative light arrangement for example, the LED light beam is sequential flash from right line to left for 4 steps and each step have 3 LEDs so the LED light is moving from the right→$2^{nd}$ right→$2^{nd}$ left→left and light-beam emit to the $1^{st}$ optic-lens (304) which has reflective and/or refractive optics-properties so can make the light become wider emit angle and splendid plurality of light-beam to emit to the front $2^{nd}$ optics-lens which has the design (309) or art (310) both have area can emit out the light beam to form the (I Love You) or (Star-Shape). The moving LEDs controlled by IC chip and circuitry and each 3 LEDs light-beam emit into the front $2^{nd}$ optics-lens with different input-angle so the 4 steps of the sequential flash or tune-on and turn-off will make the front design (309) or art (310) lighted image and/or art have different input-angle of light-beam to cause the different lighted image and/or pattern shown on the different outside surface basing on emit-into light-beam at different locations or angle.

The other replacement or alternative arrangement also can get same result to make the lighted image and/or pattern show moving, shaking, waving, variable shown on outside surface but not use IC and circuitry to control as above discussion. The alternative way is to apply a motor or movement or spin device (not shown) to make the said $1^{st}$ optics-lens (304) rotating and the lower positioned LEDs light-beam passing through the rotating or moving or waving $1^{st}$ optics-lens (304) which has reflective and/or refractive lens (304) so each light-beam passing through will be reflected and/or refracted and LEDs is fixed not move so it change the LED light-beam go through the front light-passable design (309) or/and art (310) so the lighted image and/or pattern look variable, shaking, moving. This is the one of the alternative. As long as the inner $1^{st}$ or more number of optics-lens and/or image-forming-piece is moving or rotating or shaking or waving to cause the lower positioned LED light-beam to change or reflected and/or refracted is key for the current invention and also is same as the co-inventor co-pending (#FF-4=U.S. Ser. No. 14,967,862=Pending case) (#FF-3=U.S. application Ser. No. 14-539,027=Pending case) (#FF-2 U.S. Ser. No. 14/275,184=now allowed) (#FF-1 now is issued patent) covered as US issued patent (#FF-1) U.S. Pat. No. 8,721,160 B2 which file don Oct. 28, 2010 and Division of application Ser. No. 12/318,470 filed on Dec. 30, 2008 claim 2 [An LED project light as claimed in claim 1, further comprising at least one of the following element (a) a telescope assembly, (b) tile means for tilting said optics means, (c) ROTATING MEANS FOR ROTATING SAID OPTICS MEANS, (d) adjust means for adjusting said optics means, (e) a roller and (f) an elastic member to change a project direction of said light]. Wherein, the (c) rotating means for rotating said optics-means", and/or From FIG. 2B show outdoor LED and/or laser project light base (287) have built-in IC or RF-receiver (286) which incorporate with RF-transmitter to make LEDs color, brightness, functions change or setting, and/or photo-sensor (285-2) which to turn-on and turn-off the said light-source (289) basing on environment brightness, and/or wireless receiver including blue-tooth, wife, z-way, zigbee which can receive all different wireless signals to control the said light-device and/or its light-source from remote away distance even cross pacific or Atlantic ocean while wireless link to internet system.

From FIG. 2C show the alternative outdoor LED light construction. The said outdoor LED project light which has one base (238) have the conductive-contactor to get AC power source including prong (34), bulb-base (35), AC-plug-wire (36) and AC-to-DC transformer (37) those built-into the desired shape of housing such as cylinder, tubular, ice-cream cone, or bar, or football or other geometric shape. The said base (238) has space to fit the motor (239) and gear-set (240) and its axis (241). The said LED outdoor project light-device have the LED (242) install on the PCB which has the hole to allow lower positioned axis (241) to passing through to install the one or more of the 1$^{st}$ image-forming-piece (hereafter as Image-FP) (Image-FP1) (Image-PF2). The said 1$^{st}$ Image-forming-piece may have Image-PF1 (244) have the one or more of arts, film, slide (245) to create the desired image and/or patterns, and/or 2$^{nd}$ choice to have or alternative image-forming-piece is Image-FP2 (247) have the preferred alternative one or more of the said cut-out, window, design (246) to created shaped image and/or patterns, or has the 3$^{rd}$ choice or alternative for the image-forming-piece (Image-FP3) (248) which is a coiled-cylinder or round unit has continuously art, design, printing, or painting (not shown) to create the continuously moving, rolling, rotating lighted image and/or patterns (as FIG. 3-4 shown) while the one side of the coiled-cylinder image-forming-piece (248) rolled by the gear-2 (251) which is triggered by the gear-1 (250) which install on the axis (249) of the lower motor or movement or spin-device (not shown). It is appreciated the coiled-cylinder image-forming-piece is same concept as co-inventor co-pending filed case (#WWW-2013) U.S. Pat. No. 9,648,672 Filed on Jun. 21, 2013 U.S. Ser. No. 13/923,721 which show the motion effects by 3 layer of display to show continuously such as rain-drop or snow-flake falling down from sky to ground continuously effect and the U.S. Pat. No. 9,648,672 also show the coiled image-forming-piece as FIG. 4 show ["3Dimension application such as 3 cylinder image-forming-piece"] and its Child-filed case (#WWW-1) US patent U.S. Pat. No. 10,045,405 had the same drawing on FIG. 4 which issued on Mar. 7, 2018. So this is the co-inventor co-pending case and not for co-inventor PRIOR-ART for the same concept of coiled cylinder image-forming-piece for LED light-device and any US patent filed case after the Jun. 21, 2013 (#WWW-2013) U.S. Pat. No. 9,648,672 should not allow the "coiled cylinder image-forming-piece" for all LED light including indoor and outdoor light except the inventor of current case.

The LED (242) light-beam emit to the front one or more 1$^{st}$ image-forming-piece (244) and/or (247) and/or 1$^{st}$ image-forming-piece (248) which the PCB (257) and LEDs (258) (259) (260) is fit within the inner of cylinder (248) and the inner LEDs (258) (259) (260) light-beam emit to areas where have project-lens (not shown) to emit out the lighted image and/or patterns. This is same as all above discussed co-inventor co-pending patent for basic LED project light for all applications which mainly the "LED light-beam aim to the image-forming-piece and aim to the project-lens", so even the said coil-cylinder rolling image-forming-piece still fall within this basic-theory for create the lighted image and/or patterns. Wherein the said LED(s) may select from (i) group 1 and/or 2 having Red and Green and Blue (259) (260) so can make mixing colors, or (ii) single white LED (258) with high-power to emit sufficient brightness for white light so can make the coil-cylinder single color or multiple-color film/slide with rich color to show out full color image and/or pattern. The PCB (257) install on the base (253) having the preferred circuitry (254) install within the joint-gap (256) and the said PCB (257) also have the RF-receiver (255) and RF related circuit and parts. The light-beam passed through the desired number of 1$^{st}$ image-forming-piece(s) and emit to the top 2$^{nd}$ image-forming-piece or optics-lens (266) to make more complicated image and/or patterns, or go through the optics-lens (266) to just directly enlarge and project to outside outdoor area this depend on market required.

From FIG. 2C Show the inner construction for one of preferred the light device has built-in motor (or equivalent motor as above listed all replaceable device) to fix the motor on the housing may by screw. It also shown the motor has optional gear-set (not shown) to reduce the motor's rotating speed to slower speed to prevent from people uncomfortable to see quickly moving image on ceiling, walls, floor. It also not show the switch, electric parts & accessories, conductive wires to connect with circuit and the get the power source constructions.

FIG. 2D show the inner or 2$^{nd}$ optics-piece (137h) has plurality different optic-property optics-lens arrangement in one optics-piece (137h) including flat even-thickness areas (137d) (137e) with design or art for light-beam emit through, convex-lens (127i) (137j) to refract the light-beam, diffractive gating-piece (not shown) to split the inner laser light-beam to plurality number of lower-wattage laser light-beam (137m), or other convex-lens, diffuse-lens for the inner optics-piece so can create the lighted image and/or patterns and/or wording and/or arts.

From FIG. 2E that disclosure the 2$^{nd}$ here is inner optics-piece (137n) like those are dish like reflector has plurality small tiny reflector (137r) to build along the dish like surface. The 2$^{nd}$ inner optics-piece (137n) can work with moving device to make the image or lighted patterns have moving, changeable effects. It has the 3rd optics-piece like 6 rotating optics-lens LED bulb (137t), or is multiple-cut-surface ball with many cut surface surround the ball-outside-surface, so can allow the built-in LED (137t) or-and bottom LED (not shown) light-beam passing through to get plurality of light-beams to hit the dish like reflectors (137r) to get splendid light effects with or without moving or motor device for the 2$^{nd}$ inner dish-like reflector (137n) to rotating to create the moving effects. All those Three or two optics-piece (137n) (137r) (137t) has its pre-determined optics-properties so can allow LED or-laser light-beam emit out to big area or wider view angle to viewer.

From FIG. 4A (95') (96') (97'): The telescope optics-lens has built-in Screw-thread or tube-construction can easily move and change the refractive-lens (96') to up-and down to change the distance for one or more image-forming-device by manual or by motor with built-in cam-shaft or eccentric-shaft so can change the circle rotating to up-and-down straight or line movement the said telescope optics-lens. This is same as co-pending (#FF-4=US Series Number 14,967,862=Pending case) (#FF-3=U.S. Application Ser. No. 14-539,027=Pending case) (#FF-2 US Series Number 14-275,184=now allowed) (#FF-1 now is issued patent) and issued (#FF-1) U.S. Pat. No. 8,721,160 B2 which file don 10-28-2010 and Division of application Ser. No. 12/318,470 filed on 12-30-2008 claim 2 [An LED project light as claimed in claim 1, further comprising at least one of the following elements: (2) a telescope assembly.], and claim 5 [An LED project light as claimed in claim 1, wherein said optics means includes an extend means and said extendable means changes a relative posit-en-position of said slides, said light source, and said lens to adjust a focus of said image.

FIG. 2D and FIG. 2E shows The 3rd preferred embodiment of the current invention's optic elements has (1) The inner optic-elements is a reflector unit which has Plenty of small size different reflective optics lens build in on one piece of metalized treated reflector, the plenty of optics unit which has different size, shape, geometric shape, thickness, focus, reflective properties, refractive properties to make the LED(s) or Laser-light(s) light source light beam can traveling or passing to make the splendid and pre-designed light beam pattern, color, spread out, shape, brightness, and other light effects, performance, functions available from market place and may incorporate with motor/movement/spin/rotating/magnetic unit & coil assembly-to make the said optic-elements become moving optics-elements. From FIG. 2D and FIG. 2E shows the more than one optics-elements on the top of light source (LEDs and Laser-lights) the both light source light beam hit the center crystal-like optics ball, some light traveling and passing though the crystal-like optics ball basing on reflective or refraction theory so can create the very eye-catching light effects. The both of optics-elements can cooperate with motor/moving/spin/rotating/magnetic unit & coil assembly to make optics-elements for moving- and moving at least one or both reflective lens and reflective-ball to get the desired light effects.

From FIG. 2D and FIG. 2E show the (2) preferred optics-elements has built-in plurality tiny reflective-lens of different size, shape, thickness, focus, color optics lens in one disc-shape reflector piece to make the LEDs or-and Laser-lights' light beam traveling or passing through to hit the others optic-element which has desire optics properties may in group combination select from optics lens, convex lens, concave lens, reflective lens, refractive lens, moving optic-element, element made by light-block material with holes, or opening or windows or cutouts or stencils, optic texture lens to make the light beam.fwdarw.1st optic means.fwdarw.2nd optics means (or to N optics means) to create the splendid light performance, effects, functions.

From FIG. 2E, It also appreciated that the more than one optics means and LEDs or/and Laser-lights has also incorporated with other electric parts & accessories may in group combination selected from power source, circuit, motor, movement, spin kit, rotating kit, magnetic unit & coin assembly, IC, sensor, controller or wireless controller, conductive piece, prong, Bulb base, USB set, circuit, and all other electric parts & accessories so can have right and pre-determined light function.

From FIG. 2F (180) (181)(182) (183) (184): At least one main-big gear-piece (180) is drive by the motor and axis to make it rotating with desired gear-teeth to reduce the rotating-per-minutes (RPM) to desired speed and drive one or more other surrounding or different height gear-piece (181) (182) (183) (184) to fit gear-teeth and the one or more other contacted-gear-piece (181) (182) (183) (184) so rotating while the main-big gear-piece (180) is rotating. Wherein, the smaller gear-piece (181) (182) (183) (184) has center image-forming-piece (185) (186) (187) (188) fit within so make the image-forming-piece (185) (186) (187) (188) which may is one of film, slide, cut-piece, printed-piece, shape-piece, or grating-piece for laser light-source.

From FIG. 2F (180) (181)(182) (183) (184): At least one main-big gear-piece (180) is drive by the motor and axis to make it rotating with desired gear-teeth to reduce the rotating-per-minutes (RPM) to desired speed and drive one or more other surrounding or different height gear-piece (181) (182) (183) (184) to fit gear-teeth and the one or more other contacted-gear-piece (181) (182) (183) (184) so rotating while the main-big gear-piece (180) is rotating. Wherein, the smaller gear-piece (181) (182) (183) (184) has center image-forming-piece (185) (186) (187) (188) fit within so make the image-forming-piece (185) (186) (187) (188) which may is one of film, slide, cut-piece, printed-piece, shape-piece, or grating-piece for laser light-source.

From FIG. 2G The teeth of main-gear set or center gear-set (192) fit on the housing boundary or wall or divider-fence (191) and match the gear-teeth with gear-piece (190) (193) fixed on axis (189') of motor (189): At least one gear-piece fixed on axis from motor and match the at least one of other gear-piece (190) (193) to change the round-rotating from motor and its gear-piece or gear-assembly on $1^{st}$ horizon or vertical to change to other vertical or horizon rotating such as FIGS. 3B, 3C, 3D shown the make the rotating-from horizon (164) to vertical (165) of the said cylinder or tubular-type of image-forming-unit (160A) or like FIG. 2G from horizon (190) to vertical (192).

From FIG. 3A show LED outdoor project light device (138) has desired conductive-contact such as AC-Plug wire to get AC power source for outdoor application and the said light-device (138) which having moving optics-piece that is one or more of the optics-lens or image-forming-piece (142) or the said optic-piece (142).

While the move under level optics-piece (not shown) is one or more piece of optics-lens (137) having the texture, marking, reflective and/or refractive and/or diffusing and/or diffractive-grating, and/or light-passing optics-properties with geometric shape which is rotated by lower positioned movement device (141) and fixed on the axis of motor and gear-set(s) (147) to rotate along or rotate each other for different direction to make the double reflected and/or double refracted lower level light-beam emit out from the lower-level one or more piece of the light-source with desired colors assortments or mixing colors or auto changing colors.

While the optics-piece is one of image-forming-piece (142) with geometric-shape having shaped openings, cutouts, holes (143), stencils, windows, design, art, printing (144) or painting (145) to allow the LEDs or/and Laser light-beam passing through the light-block area(s), holes/opening/cutouts/stencils/windows and form the shaped lighted patterns. The alternative arrangement to arrange the said flat sheet or film type image-forming-piece (142) connect with axis of motor and gear-set(s) (147) to make the said horizon rotate flat-sheet/film to rotate so can create the moving effects with desired light effects as above discussed while the optics-lens (142) is optics-lens.

The said light-beam exit from the said one or more inner optics-lens (137) or image-forming-piece (142) emit to the top geometric-cover (148) which have desired geometric-shape and preferred optics-lens properties to allow light-beam exit from inner optics-piece (i) traveling (reflected) or passing though (refracted) the top wide angle or size or view angle cover (148) that has its preferred optics textures, thickness, convex or concave lens properties, reflective and/or refraction optics-lens related optics-properties, or (ii) the light-beam travel to the outer cover built-in art or design or printed or painted or window (not punch through) areas(s) to create the said lighted image and/or patterns at least including: message, time, geometric art, nature scene, galaxy, milky way, sky, cloud, starts, moon, water waves, animal, characters, cartoon, sign, logo, commercial to been seen. The second embodiment also may incorporate with motor/movement/spin/rotating/moving/magnetic unit & coil assembly to make one or more piece of the inner optics-lens(s), and/or image-forming-piece of optics-piece(s) or- and light-source moving to make the motion light effects. This will increase more value for the said current invention.

From FIG. 3A The LED outdoor project light have one or more inner-lens(s) (137) has reflective and or refractive properties and/or inner image-forming-piece (142) has art or design or shaped-opening to make the lower-level light-source light-beam travel-through.

From FIG. 3B show the other alternative arrangement for the image-forming-piece (161) which is not traditional flat-type but it is a coiled-cylinder or roller type (161) which is same as co-inventor co-pending filed case (#WWW-2013) U.S. Pat. No. 9,648,672 Filed on Jun. 21, 2013 U.S. Ser. No. 13/923,721 which show the motion effects by 3 layer of display to show continuously such as rain-drop or snow-flake falling down from sky to ground continuously effect and the U.S. Pat. No. 9,648,672 also show the coiled image-forming-piece as FIG. 4 show ["3Dimension application such as 3 cylinder image-forming-piece"] and its Child-filed case (#WWW-1) US patent U.S. Pat. No. 10,045,405 had the same drawing on FIG. 4 which issued on Mar. 7, 2018. So this is the co-inventor co-pending case and not for co-inventor PRIOR-ART for the same concept of coiled cylinder image-forming-piece for LED light-device and any US patent filed case after the Jun. 21, 2013 (#WWW-2013) U.S. Pat. No. 9,648,672 should not allow the "coiled cylinder image-forming-piece" for all LED light including indoor and outdoor light except the inventor of current case.

From FIG. 3B the said coiled-cylinder or roller type image-forming-piece (161) has assembly with the base (156) and base have built-in at least one of (i) circuitry, (ii) IC, wireless receiver select from blue-tooth, Z-way, Zigbee, IR, RF, wifi, (iii) switch, sensor, radar sensor, photo sensor, (iv) audio system, speaker, blue-tooth download music (iv) RF receiver. (157) so can wireless control the said light-source and light-functions. The said rotate cylinder or round or curved film/sheet image-forming-piece (161) has pre-determined art or display or words such as small star (160) rotate to the medium star (160') and rotate to big star (160") so can show the continuously changing for the star. It also can show such as snow-flake falling from sky or rain-drop falling or other storm by continuously rolling or rotating while cylinder image-forming-piece have anti-clock-wise rotating on desired speed. From FIG. 3B can see the cylinder type image-forming-piece (161) fit within the base (166) inner gear-set (165) which is connected with other gear-set (164) which is fixed on the motor and gear-set axis (162). The PCB have desired LEDs including groups of Red and Green and Blue LEDs (170) (171) or the super brightness high-power white LED or colorful LEDs (172) and LED is aim to the project-lens direction so the LEDs light-beam will go through the rotating cylinder image-forming-piece (161) and the cylinder image-forming-piece (161) lighted tiny image and/or patterns (160) (1601) (160") will emit to the front added magnify-lens to enlarge the tiny image and/or patterns exit from cylinder (161) and emit to the front project-lens or project-assembly or extend-and-retract lens-assembly for adjusting project-lens to get focus adjustment which is same as the co-inventor co-pending case (#WWW) and (#WWW-1) both issued US patent issued on much later than current invention filed-date case(s) as above discussed.

From FIG. 3F show the one of alternative arrangement show add one more of $2^{nd}$ image-forming-piece (210') which is a flat piece which has other design, art, printing, painting, film or slid within so while LEDs light-beam (208) emit through cylinder art or design (210) and fixed $2^{nd}$ flat one (207) can form a extra lighted image and/or pattern combined with the $1^{st}$ moving or rotating image-forming-piece (210) lighted image and/or pattern. Such as the rotating image out of the $1^{st}$ cylinder one (210) is the rain-drop or snow flake continuously falling down and the $2^{nd}$ fixed flat image-forming-piece (210') had the house or snowman on ground, so combine both can see a house or snowman created by flat one (210') have the continuously snow-flakes created by cylinder one (210) falling down continuously. This is how to make the rolling or rotating cylinder (210) and fix flat (210') 2type image-forming-piece(s) combination to get other features. Furthermore in order to get larger enough lighted combination or single lighted image and/or pattern while LED light-beam travel for both or single image-forming-piece can add one extra magnify-lens (211) in front of the single or both image-forming-piece so can enlarge the lighted image and/or pattern created to sufficient larger size and emit to the front optional (i) refractive project-lens (212) or (ii) extend-and -retract adjustable focus refractive project-lens assembly or (214) (iii) directly project through the protective front cover (212).

From the FIG. 3C show how to use rotating $1^{st}$ gear-set (164) from side or lower motor and gear-set axis (162) to match the teeth of the $2^{nd}$ gear-set (165) so can make the cylinder image-forming-piece (161) to rotating for anti-clockwise direction or clock-wise direction. The said $2^{nd}$ gear-set is install within the base (166) where have the circuitry, IC, wireless communication set selected from IR, RF, blue-tooth, Z-way, Zigbee, wifi so can remote control to make setting, adjustment, change the said light-source and other functions while people away from the said LED outdoor project light-device. The said LEDs light-source is install on PCB for different assortment such as R+G+B (170) (171) or super brightness LEDs (172).

From FIG. 3D show the some art (174), design (175), cutout (176), stencil, window (177), film (178), slide or diffractive grating-piece (not shown) on the cylinder type image-forming-piece (173) and inside can have LED and/or laser light source for pre-determined specification, color assortment, dip or dice, or chip, with setting, adjustable, wireless receiver set install inside the base (166).

From FIG. 3E show the said LED outdoor project light (3-5) has motor and gear-set on base with axis to install the said inner one or more optic-lens (196) in front of the plurality of LED light-source (195) which install on the PCB. The said LED light-beam emit to rotating one or more optic-lens (196) and the light-beam exit from the one or more optics-lens (196) emit to the top one or more of the $2^{nd}$ optic-lens which has the optic-properties select from reflection, refraction, diffusion, diffraction, passing-through, magnify optic-properties, or $1^{st}$ image-forming-piece which has design (199), art (200), opening (197), slide (201), film, windows (198) (not punch through), painting (200), printing (201) to form the lighted image and/or patterns and go through the top cover (203) which with or without the above discussed optics-properties. The said LED outdoor light has built-in wireless controller system including the IR, RF (194'), Blue-tooth, Z-way, ZigBee, Wifi remote control kits and/or receiver (194")

From FIG. 3F, the LED outdoor project light as above discussed.

From FIG. 3G show the LED outdoor project light (3-7) have upper housing (218) and conductive contact (217) to get AC power-source with at least one of built-in control system to operate the desired light function, effects, audio function may select from (i) remote controller select from wireless, or IR, or RF, or Z-way, or Zigbee, or Blue-tooth, or Wifi with download APP (219), or (ii) photo sensor or light sensor (219-1), or (iii) Audio system (219-2), or (iv) motion, heat, moving, impact, sound activated sensor (219'), or (v) sound or speaker device (220), or (vi) Radar or Radar moving sensor (219-4).

From FIG. 3H show the LED and/or laser outdoor project light (3-8) the said inner image-forming-piece is one of assembly which has the plurality of the tiny size image-forming-piece such as cut-out piece (225) art (226), film (227), or slide (228), or optic-lens (229), or shape-piece, or printed-piece, or panting-piece to form the image and/or patterns fit within the a holder or tray or disc with teeth which is equivalent the gear-set [which is same as co-inventor co-pending (#FF-4) (#FF-3) (#FF-2) for disc-with-teeth]. The said each tiny image-forming-piece (225) (226)

(227) (228) fit into the holder, or tray, or disc-with-teeth (gear) (225') (226')(227') (228') and each holder, or tray, or disc-with-teeth (gear) connect with the main disc-with-teeth (gear) (223) teeth and the said master-disc teeth match the surrounding disc-teeth so while the master-disc is rotating will also drive the surround disc-with-teeth (gear) (225') (226')(227') (228') also rotating accordingly. The said each tiny image-forming-piece (225) (226) (227) (228) is sit on the disc-inner-edge and center is hole to allow the lower level positioned LEDs light-source light emit into to form the said tiny lighted image and/or patterns and emit to the top level respectively refractive project lens (not show). The said top level respectively refractive-lens has same position or orientation align to the said plurality of the said tiny image-forming-piece (225) (226) (227) (228) so can see each tiny lighted image and/or patterns is rotating with bigger size and dimension and projected-size on outdoor or indoor surface after go through the refractive project-lens. The top of the refractive-lens assembly has one protective-cover to protect all 3 levels of respectively refractive-lens assembly, plurality of tiny image-forming-piece fit into disc with teeth (gear) assembly, and lower level LED(s) assembly respectively to upper image-forming-piece assembly and lowest position the said motor & gear-set (not shown)

From the FIG. 3J show the same concept with the FIG. 3H but more details for the lower-level LEDs (181a) (182a) (183a) (184a) is position on center of top level disc-with-teeth (gear) hole to allow the LED light-beam emit into the disc-with-teeth (gear) hole (181b) (182b) (183b) (184b) and the each of the disc-with-teeth (gear) have one of the tiny image-forming-piece (188") fit within so the lower level LEDs assembly can emit the light-beam into respectively upper disc-with-teeth (gear) hole and go through the said each tiny image-forming-piece (188") to form the tiny lighted-image and/or lighted-patterns to emit to the top level refractive-lens assembly to make the same number of the disc-with-teeth (gear).

From FIG. 3J the master-disc (180) is a disc-with-teeth and has assembly with axis of lower motor & gear-set so can rotate the master-disc, also the said center of the master disc-with-teeth may also have lower LEDs to emit the light and go through the bigger-size image-forming-piece (179) but different is the said bigger-size image-forming-piece (179) also rotating.

From FIG. 3I show the top view for the said FIG. 3E.

From FIG. 4 show the Outdoor LED and/or Laser project light device (4AA) have the said design shape for different application. Each application for moving light effects have at least one or more than one 4 major parts to project the moving effects lighted-image and/or lighted-patterns including:
  (i) motor and gear-set to make at least one or more optics-lens and/or image-forming-piece or top cover rotating to get desired light effects, function, performance, and/or
  (ii) desired number and color and brightness and specification of the said light source(s), and/or
  (iii) the one or more optics-piece(s) select from
    (iii-1) image-forming-piece(s) has the art, design, cut-out, opening, window (not punch through), film, slide, shape-hole, printing, painting, or
    (iii-2) optics-lens which has at least one of the optics-properties select from reflective, and/or refractive, and/or diffusion, and/or go-through, and/or diffractive, and/or grating, and/or protective, and/or
  (iv) The at least one of geometric shape refractive project and/or protective lens on top
    to let the light-source(s) passing through the said steady, fixed, or rotating, or moving, or shaking, or waving the said preferred number and shape and size of the optic-piece(s) and go through the said project-lens to make the said lighted-image or lighted-patterns From FIG. 4 show the LED and/or laser outdoor light device has preferred housing such as plug-in outlet night light housing (77), or bulb-shape (79) LED and/or laser bulb. Or housing for the one preferred ice-cream cone shape or other preferred tubular or tube or bar or speaker shape garden light (75), or other geometric shape housing for different application with preferred conductive-contact such as prong (78), AC-plug-wire (76), Bulb-base (80) to get the AC power-source and/or use USB-port (81) to get outside DC power source or power bank DC power or battery DC power. IT is appreciated that the housing shape and/or conductive-contact can be selected any type form market available item. From these examples show only need change outside housing and conductive-contact can very simple to change the LED projection light application for
  (1) indoor plug-in light have prong while had power fail, motion sensor, photo sensor, Remote controller or wireless controller or with RF transmitter to link for more than one of the indoor light has built-in RF-receiver inside, and/or
  (2) outdoor plug-in outlets by AC-plug-wire become outdoor garden, holiday, seasonal light, accent light, flood light with motion sensor, radar sensor, RF receiver control by remote controller, or have wireless communicate to use one motions-sensor with built-in wireless signal transmitter to send out wireless signal to others outdoor lighting having the wireless receiver to link plurality of the outdoor lighting can turn on at the same time to cover wide areas up to hundred or thousand feet away, and/or
  (3) indoor or outdoor LED project bulb while incorporate the convention market all kind of bulb shape housing with male bulb-base, or indoor or outdoor light-string while the plurality of the LED bulb is link together by conductive-wires or wireless by wireless communication for desired number of LED-bulb by master-bulb have motion-sensor and the wireless-transmitter so while trigger by moving detector including all kind type such as PIR or Radar or Moving detector then send out the said wireless signal to the other LED bulb which no wire to link so all plurality or numbers of the LED bulb can install on anywhere without limitation by limited length of wire; or
  (4) The outdoor project light and get DC power from the USB-port.
  (5) outdoor project light including LED and/or laser light has built-in or outside AC-to-DC circuit to transfer the AC power source to DC current for the LED, IC, sensor, PIR or Radar or moving detectors or sensor, wireless receiver and/or transmitter, power fail, circuitry, to use circuitry to use.

From FIG. 4 show the all different housing for different application as above 5 type application only change the outside housing shape and construction Indoor prong light (77), or outdoor garden or seasonal light (75), or LED bulb for indoor and outdoor (79) or USB hosing (Same as 75,77, 79 or any other shape) with desired conductive-contact including AC-plug-wire (76), Prong (78), male bulb-base (80), USB-port (81); and keep all the same
(A) LED and/or laser light-source, and/or
(B) The inner N-number (N is any number) optic-piece select from
  (i) optic-lens with desired reflective and/or refractive and/or diffusing and/or diffractive and/or grating and/or passing-through and/or protective optic-properties to create the image and/or patterns and/or plurality of reflected and/or refractive and/or diffusing and/or diffractive and/or grating and/or passing-through light-beam, lighted image and/or lighted-patterns, and/or (ii) image-forming-piece with shape cut-out, openings, window(s) (not punch-through), art, design, painting, printing, words to form image and/or patterns.

(C) outer reflective and/or refractive and/or diffusing and/or diffractive and/or grating and/or passing-through and/or protective optic-properties outer cover.

(D) optional for motor and it related speed adjustable gear-sets and axis to make the said light-source, optic-piece including optics-lens or image-forming-device, outer cover to rotate, move, spin on desired direction so can create the moving, rotating, changeable, variable lighted image and/patterns show out the outdoor and indoor space or surface or areas.

(E) one or more holder, disc-with-teeth (gear) to make the said including (i) rotating direction change between vertical, horizon, top level, lower level, tilt angle. and/or (ii) linkable other disc-with-teeth (gear) rotate according to master disc-with-teeth (gear) and/or each of disc-with-teeth each has opening for light-beam input to make the fit within image-forming-piece to be glow and rotating, and/or (iii) The said move the coiled or cylinder or roller image-forming-piece to rotate under pre-determined design, and/or (iv) The said move the one or more inner optics-lens to pre-determined direction for each other to create the double or triple or more splendid and variable desired colors lighted-patterns and/or lighted-image with or without front light-passing, printing, painting, art, designs to show the double, triple, or more splendid light-beam through and show out the art, design, printing, panting, light-passing area(s) for moving, shaking, waving because internal output light-beam is variable, rotating, changeable.

From FIG. 4 the show one of example but not limited for all alternative or replaceable or equal function for construction for internal design for above discuss (1) indoor light with prong, (2) outdoor garden, seasonal, holiday, accent light, landscape light with AC-plug-wire or prong or outside transformer, (3) indoor or outdoor LED bulb, (4) USB related lighting for outdoor.

From FIG. 4 the each of housing (75) (77) (79) has built-in motor (95) and its gear-set (96) with axis (97) to make the inner one or N-number (N is any number) optics-lens (98) (99) with above discussed desired optic-properties assortment to rotate or moving or spin to create a splendid light-beam to emit out from the design or art area on the outer cover as light-path 6 (94) while the outer cover has art, design, painting, printed areas to allow the LED (1L) light-beam can passing through, or The LED (2L) one of light beam (82) emit to the $1^{st}$ optic-piece (83) which is optic-lens (83) with reflective and/or refractive optics-properties and refracted (Ra) and emit out to $2^{nd}$ optic-piece is optics outer cover (84) inside surface and reflected (Rf) back to $1^{st}$ optic-piece is optics-lens (83) and reflected (Rf) back to the outer cover (84) and refracted out the cover to outside surface as light-path (85). This is typical said the LED (2L) traveling through the $1^{st}$ and $2^{nd}$ optics-piece(s) both is the optic-lens with reflective and/or refractive optics-properties to make multiple times reflection and refraction for light-path.

From the FIG. 4 Show the LED (3L) has light-beam (86) to hit the $1^{st}$ optics-lens wherein is optic-lens (83) and refracted (Ra) and reflected (Rf) to split into 2 directions light-beam and same out to go through the reflected and/or refracted multiple times to came out as light-path 2 (87) and light-path 3 (88) to show the LED light-beam traveling path for go through non-rotating $1^{st}$ optic-piece (83) and $2^{nd}$ optics-piece (84) different arrangement for the surface optics-property including convex or concave or diffusion or reflective or refractive treatment(s) and desired combination.

From the LED (1L) which has the $1^{st}$ light-beam (93) emit-into inner the $1^{st}$ rotating optics-piece (98) and $2^{nd}$ optic-piece (99) both are optics-lens with texture, marking, or with desired reflective and/or refractive and/or diffusing and/or diffractive and/or grating and/or passing-through and/or protective optic-properties to go through the outer cover even thickness design-area(s) (3U-1) to create the image and/or patterns and/or plurality of reflected and/or refractive and/or diffusing and/or diffractive and/or grating and/or passing-through light-beam, lighted image and/or lighted-patterns The said LED (1L) also emit the other light-beam without go through the said inner N-number fixed non-rotating optics-piece (83) and inner rotating optics-lens (98) (99). The light-beam (89) (91) both directly go through the outer cover have preferred optics-properties and make refracted light beam to create the splendid light-patterns or lighted-image with variable or changeable effects while the said the LED (1L) is controlled by IC or remote controller to make the turn-on/off time with other LED(s) (2L)(3L) for sequential, random, pair flashing so can make variable or changeable light effects so the said LED path 4 and LED light path is change from one to other to make moving effects but without motor and its gear-set to work together as above discussed.

From FIG. 4 show the 2 laser light-source (1U) and (4U), the one of examples for laser light-source (4U) emit the single and higher wattage laser light-beam to the $1^{st}$ optics-piece wherein is a grating-piece (5U) with diffractive optics-properties which split or divided the single higher wattage laser light-beam to plurality of the lower wattage laser light-beam(s) and emit out from the top or front protective outer cover. It is appreciated if need more splendid and changeable lighted-image or lighted-patterns laser light effect. It is optional to have the $2^{nd}$ optic-piece wherein is the other grating-piece (5U') so can make more splendid laser light-effects. The alternative arrange for more up-grade application is make a grating-assembly to have the $1^{st}$ and $2^{nd}$ grating-piece (5U) (5U') into one assembly and can rotate the top (5U') and both grating-piece (5U) and (5U') have different laser grating texture or lines or designs so can adjust top one (5U') can make laser light-beam or laser-image or laser-pattern change from one to others up to tens or hundreds of different arts or design show on array, matrix, desired spacing and spread out to as wider as space for lower wattage laser light effects which will no harm to people eyes to outdoor or indoor application which is same as current inventor co-pending (#XX-3) (#XX-2=U.S. Ser. No. 15/170, 072 still pending) (#XX-1=U.S. Ser. No. 14/844,314) and (#XX-2010=U.S. Ser. No. 12/938,564 filed on Nov. 3, 2010 now is U.S. Pat. No. 9,239,513 issued date Jan. 19, 2016) for Laser related filed case. It is appreciated the said all different housing application incorporated the FIG. 4 drawing show for prong, bulb-base, AC-plug wire and outside AC-to-DC transformer to get desired AC and/or DC power source.

From FIG. 4A and FIG. 4B show the LED outdoor light-device has the AC-plug-wire (90') to get the AC power from out lets or has wire (121) to get the outside AC-to-DC transformer (not shown). The said LED outdoor light-device which has the lower-housing part (82') have the base (89') built-in motor and its speed reduce gear-set (88') with axis (88") has sufficient height to assembled the non-rotate LEDs (83') and circuitry or IC or wireless receiver-kits or other electric parts such as radar/PIR/motion/photos/power fail sensor, or fit on the circuit board (83") to supply sufficient brightness of the single or multiple colors LED light-beam to upper steady or rotate optics-piece(s) wherein is one or N-number (N is any number) of (i) optional added magnify lens for each LED light-source (84') with or without holder (85'), and/or (ii) Optics-lens (87') (87") with the built-in desired optics-properties including one or more of with desired reflective and/or refractive and/or diffusing and/or diffractive and/or grating and/or passing-through and/or protective optic-properties to go through the front or top the one or N-number (N is any number) image-forming-piece (92') which is install on tray, disc, holder (91') as co-pending (#FF-series co-pending filed case) insert into the housing parts slot (93') and replaceable while needed. The said lower levels rotating optics-lens (87') (87") rotate with different direction such as $1^{st}$ inner optic-lens (87') is rotating for clock-wise and the $2^{nd}$ inner optics-lens is rotating for anti-clock-wise to the lower LEDs light-beam will go through DOUBLE optics-properties for DOUBLE times for reflected and/or refractive by prism-lens or other reflective and/or refractive lens as the FIG. 2 (3i) so can get very splendid colorful and exciting LED light-beam to passing though the said image-forming-piece (92') to show out color, shape, image, patterns changeable or variable or movable LED light effects. The up-grade model is to add one more optics-piece wherein is one of extend-and-retract refract-lens assembly which make focus-adjustable functions or said telescope-kits to make focus adjustment to make the tiny splendid and exciting lighted-image or lighted-pattern or light-beam to magnify and with focus adjustment so can project desired distance far away from the said outdoor application LED and/or laser project light-device. Wherein the said extend-and-retract refractive-lens assembly or said the adjustable focus telescope-assembly is same as current inventor co-pending (#FF-4) (#FF-3) (#FF-2) and issued patent (#FF-1) Claims stated as above many times discussed and filed on Dec. 30, 2008 and the said the (#FF-4) (#FF-3) (#FF-2 now allowanced on Jun. 7, 2018) all still pending and has the same drawing as current invention for FIG. 6, FIG. 6A, FIG. 6C which is shown on current inventor filed case including (#FF-2008 Series filed 5 cases and 4 still pending) (#ZZZ-2013 Series filed 5 cases and 4 case still pending) and (#QQQ-2012 Series filed 10 cases and 6 cases still pending) and (#TT-2010 filed 4 cases and 4 case still pending), so the current invention should be CIP of the said Dec. 30, 2008.

From FIG. 4A and FIG. 4B, the said extend-and-retract refractive-lens (96')(97') assembly has the lower space (95') to allow the extend-and-retract telescope body (97') retract into the space (95') while the body (97') extend out also bring the built-inside refractive-lens (96') also move extend out from the inner or lower retracted-position. So this extend-out and retract-into the space (95') adjustment the body (97') also change the relative-distance between the said refractive project-lens (6') and the said lower image-forming-piece (92') so can make the focus change to make the different distance application to get clear and sharp lighted-image and/or lighted-patterns. Basing on co-pending and issued (#FF-series filed case) the said extend-and-retract adjust focus refractive-lens assembly can be use automatically by motor and cam-shaft to automatically change so can get the clear and fuzzy focal image and/or patterns for some special light-effects needed. As co-pending filed case also claimed the said adjust the focus can made by manual operation. So both manual or automatically adjust focus is disclosure by current inventor on Dec. 30, 2008 shown on the evidence of above list all co-pending (#FF) (#XX) (#TT) (#QQQ) (#ZZZ) more than over 30 pending case for all application including indoor and outdoor LED and/or laser project light-device on file.

From the said FIG. 4B has similar construction application, The FIG. 4B the said inner optics-piece may only one of inner optics-lens (102) or (103) not 2 optics-lens rotating for save the cost and assembly, or still keep the 2 rotating optics-lens (102) (103) but the splendid DOUBLE times reflected and/or refracted light-beam is emit out from outer cover (104') art, design, light-passing-areas (105') without the inner image-forming-piece for this application so it save some cost and labor assembly. From the different shape top-cover (106") or (109') which has flat-top-shape or the other lower-dome cover (109a), medium high dome (109b), higher dome (109c), and cone shape dome (104') which show the current invention for any top-cover or housing can be any shape or any radius, circle, sphere, flat, dome, partial ball or any combination for these geometric-shape parts into one or just one of any geometric-shape for top-cover and body or housing with one piece or many parts to assembly together into desired top-cover, housing, body.

From FIG. 4C show it the other viewing angle for show the LED project bulb (127) which has the male bulb-base to get AC power source and has the inner LEDs and/or laser light source (129) (130) (131) fit into the PCB and emit the light through the inner one or N-number (N is any number) of optics-piece is one or more of (i) optics-lens with desired optics-properties and/or (ii) image-forming-piece with desired image, art, design, painting, printing or light-passable areas.

From FIG. 4D show the LED and/or laser project bulb which has 2 grating-piece (134) (135) with diffractive optics-properties to split or divided the single inner high-power or high-wattage laser-beam into plurality of the said lower-power or low-wattage laser light-beam, or lighted patterns, or lighted image show out in matrix or array or predesigned space for same image with or without the laser-grating-assembly two grating (134) (135) on outer cover (137) and one or more grating-piece (133) inside the housing (132) which can change the laser light-beam, lighted-image, lighted-patterns.

From FIG. 4, FIG. 4A, FIG. 4B, FIG. 4C, FIG. 4D It also can have the LED or-and laser light device has the Bulb-like shape housing and bulb-base as current delivery terminals to get AC power instead for Prongs application which always located on lower position. The Bulb-like shape device has bulb-base will be always on higher location for people to use is other current inventions features. These common skill can use from market place.

From FIG. 4 show the same optics-elements and same optics-application can fit for different shape of the product may has different terminals to get the power. The FIG. 1F show the unit has prong which same as the FIG. 1, FIG. 1B, FIG. 1C, FIG. 1D so can plug into the outlet device on wall or power strips or desk top power station. While it incorporated the bulb-base it can simple to change the product housing shape to bulb-like shape and the 2 power terminals can easily to connect on the bulb base wall for one pole and bulb base bottom for 2$^{nd}$ pole which will has total same optics parts & accessories with the prong products. Furthermore while people would like to use USB female ports to connect with power source by USB wires, it is simple just add one USB female port on FIG. 1, FIG. 1A to FIG. 1D housing so can instantly can power by the Prong or the USB female ports by AC current (for Prong Product) and DC current (for USB female port) which only need change the inner circuit not even touch the Same optics parts & accessories.

FIG. 4, FIG. 4A, FIG. 4B, FIG. 4C, FIG. 4D shows the 2$^{nd}$ preferred embodiment of the current invention which shows this invention to have (2) Optic elements: top cover on the outside, and inner disc-like convex lens. The said (2) optic elements both have preferred textures and designs (wave-like) to vary the thickness of the lens so the said LED lights or laser-lights can pass through the inner disc-like convex lens which hasta designed thickness or texture (wave-like), or lights can pass through alternative elements of optical lens(es), such as holes, stencils, walls, openings, or cutouts to project and show figures FIG. 1A and FIG. 1B without using an optical lens that has designed thickness, then pass through the outer optic element has refractive properties so can enlarge and spread out the light beam which widens the created or projected image(s), lighted patterns, message(s), number(s), time, geometric art(s), nature scene(s), galaxy(ies), milky way, sky(ies), cloud(s), space nebula, stars, moon, water-wave(s), aurora light(s), animal(s), character(s), cartoon(s), sign(s), logo(s), or commercial(s). From FIG. 4, FIG. 4A, FIG. 4B, FIG. 4C, FIG. 4D also shows the preferred embodiments on different power source housings such as corn-like bulb housing has bulb base; possible for many shape of the bulb available from market place and bulb bases such as e12, e17, e26, etc.

From FIG. 4, FIG. 4A, FIG. 4B, FIG. 4C, FIG. 4D show 4th preferred embodiment that has the bulb shape light unit has bulb-base which-the current invention can acquire power from any bulb bases that are connected to an AC power source such as lamps, or bulb base adapters. The bulb base does not limit to one specification; any bulb bases (most commonly E12, E17, E26) can connect to the current invention. The said the current for different product housing design with preferred power terminal including prong, Bulb base, USB female ports so can be plugged in or USB wire connected in or-screwed in tightly to ensure the connectivity between the bulb base and the current this invention.

From FIG. 5 show the parent filed case (#ZZZ-2013 U.S. application Ser. No. 14/023,889 filed on Sep. 11, 2013) show the LED outdoor project light device one of preferred inner construction for the said base (06AA) has the built-in motor (06) and its speed reduce gear-set (06') and top of the motor assembly (06) (06') has circuit board (013") with AC-to-DC and light-source(s) here is LEDs (05") to emit the light-beam to top rotatable 1$^{st}$ and 2$^{nd}$ optic-piece here is the said optics-lens (01") (01$a$). The 1$^{st}$ optic-piece (01") can be one or more piece of image-forming-piece have desired texture, design, art, opening(s), window(s), printing, paining to form the image or patterns, and/or the said 1$^{st}$ optic-piece is one or more of optics-lens has desired reflective and/or refractive and/or diffusing and/or diffractive and/or grating and/or passing-through and/or protective optic-properties. so the lower positioned LED (05") light-beam emit to top the said one or more rotating optics-piece (01") (01$a$) and its carry on the art, design, optics-properties as above discussed to form the lighted light-beam, and/or lighted-patterns, and/or lighted-image. The said the 1$^{st}$ and 2$^{nd}$ optics-lens install on the different height of the axis (07") so can get maximum and most perfect light-beam for multiple times reflection and/or refraction.

From FIG. 5A show one of embodiment for arrange the motor (06") and gear-set (06A) and have the conductive-wires (012") (015") and the electric-parts (010") and sensor or wireless receiver unit (011") and AC-to-DC transformer or AC-to-DC built-in circuitry (013") powered by the AC-plug wire (014") to get the AC power source into the said LED project light for outdoor application including garden light, seasonal light, holiday light, landscape light, accent light, project light.

FIGS. 5B, 5C, 5D show the co-pending filed case (#ZZZ-2013 U.S. application Ser. No. 14/023,889 filed on Sep. 11, 2013) similar drawing for alternative design of top cover (1R') optic-piece having plurality of reflective and refractive optics arrangement to form a one dome with desired height or sphere or curved or flat shape or other geometric preferred shape, and light-source (2R) emit light-beam (3R) to the said fixed or steady or rotating 1$^{st}$ optics-lens (1R") reflected or refractive optics-surface so the light-beam (3R) reflected to form light-beam (4R)(3'R) and the light-beam (3'R) emit to the outer cover and refracted to (3"R) and emit out to become light-beam (3'''R) to be seen. The other reflected light-beam (4R) hit the top cover inner reflective-surface and slip into (4'R) and (5R) and the light-beam (4'R) emit through the outer-cover refractive-surface and emit out to become light-beam (4'''R). The said other light-beam (5R) emit to the outer-cover and refracted to outside as light-beam (5"R). The said top-cover in curved or dome with high or medium or low height, or ball or flat or other geometric shape to make the light-source light-beam to spread out to get the image and/or lighted pattern(s) for wide range, big size to be seen by outside outdoor surface including garage door, front door, garden, fence, building. The up-grade or alternative arrangement is to add motor and gear-set to make the said 1$^{st}$ optics-piece or the said top-cover can be fixed or rotating along or both to make moving effects. The said light-beam passing through (1) the 1$^{st}$ optics-piece and 2$^{nd}$ top-cover both is fixed or steady or non-movable is the basic invention features and (2) the upgrade or alternative unit with 1$^{st}$ and 2$^{nd}$ optics-piece(s) with one or both rotating for high-end arrange; it is appreciated should be fall within the current scope of the invention and the said parent filed case also granted the US patent for (#ZZZ-3) and (#ZZZ-2 allowed) for these basing models already.

From FIG. 5B show the current invention can has the preferred geometric shape of outer-cover selected from (i) half ball, (2) ⅔ ball, (3) sphere (4) dome with high or medium or low height, (4) flat shape to get desired wider area or big area has the lighted-patterns or lighted-patterns or both though the top optic-piece here is top-cover (1R') only because the top optic-piece is consist of plurality and more than one of reflective or-and refractive sections or areas or tiny-piece which can get by injection process to form one piece of the preferred geometric-shape, including but not limited for ball, ball like, sphere, half ball, ⅔ ball, flat, dome with high/medium/low height, and incorporated with inside the LED(s) or-and Laser light source with predetermined color, number, brightness, IC to make desired light-beam control including flashing, sequential flashing or on-off or fade-in-out, cycle, duration time, fade-in-N-fade out, pair flashing or any light-effects or function available from market place to get desired light effects. It also has the desired parts and accessories or optional added parts selected from group combination from: (i) moving device which may selected from motor, spin kit, rotating kits, clock movement, (ii) timer, (iii) all kind of sensor including motion, PIR, IR, Radar, Photo, Heat, vibration, moving detector or sensor, (iv) wireless controller including: IR, RF, Wifi, Z-way, Zigbee, remote controller, (v) switch or on-off, setting, adjustable, selection mechanical or electric unit, and (vi) desired AC or DC or both power source connect by (a) prongs, (b) bulb base, (c) USB kits (d)_AC-plug-wire to get power from AC or DC power source. It also can have AC-plug-wire to plug-in wall outlet (female), or by Prong (male) or insert into outlet(s), or by Bulb base (male) to insert into bulb socket (female), or by USB Plug (male) insert into USB port (Female). From co-pending filing case drawing (#ZZZ-2013 U.S. application Ser. No. 14/023,889 filed on Sep. 11, 2013), the alternative design for top cover with convex lens features also still fall within the current invention scope as (#ZZZ) (#ZZZ-I) (#ZZZ-II).

FIG. 5B also show the light-beam reflected and refracted within the more than one reflect and/or refract optics-piece(s) here at optic-lens (1R') (1R") which are in the shape of any geometric-shape. Also, while the light-beam (3'R) (5'R) (4'R) pass though the outside convex-lens (6R) (7R) to project the image or lighted patterns to the outdoor surface. This embodiment teach (1) more than one reflect-surface inside of optics-lens and refract-surface outside the same optics lens, and/or (2) light project though the more than one optics-surface of one curved or ball or sphere or dome like sections or areas or segments of same one optic-piece which the inner side is a flat mirror-polished for reflection and outside is convex-shape lens for refraction, so it is built 2 kind of optics-properties in one optics-piece (1R').

(3) The said reflective and refractive optics-piece is a top-cover (1R') has many sections or areas or segment to form together to become a semi-sphere or any desired geometric shape outer optics-piece (1R').

(4) 2 half-sphere ball with different arc or ⅔ ball or dome with high, medium or low height, or flat sphere, or sphere are preferred designs.

From FIG. 5C: Show the other viewing angle for the ⅔ ball assembly which is made by ½ ball and ⅓ ball-shape tunnel (2 end is open) piece assembled together to get ⅔ ball or sphere or curved top-over. The said ⅔ top-cover has (1) both reflective and refractive optics properties or (2) the top-cover have even thickness and had light-passing through area(s) where have art, design, painting, printing on the top-cover, both can while LED light-beam passing will form the lighted-image or lighted-pattern with or without the motor & gear-set to make the one or both or more optics-piece for rotation. The said LED light-device (8R) have base to form the LED or-and Laser light device which has more than one optics-properties. The ⅔ ball outer cover has more than one reflect-and refract lens. This is different with inventor's earlier U.S. Pat. No. 7,632,004 LED night light has more than one optics means. U.S. Pat. No. 8,277,087 has more than one reflect units, U.S. Pat. No. 7,455,444 LED night light has more than one LED, U.S. Pat. No. 8,434,927 interchange power source for current invention scope. Because Co-inventor prior art show is 2 separated piece not built-in one piece of optics-lens but still can be explain is continue filing for optics arrangement.

From FIG. 5D: Show the inner side of the other shape optical-lens which has more than one reflective surfaces or sections or areas inside of optics-lens to create plurality of LED light-beam back and forth for multiple traveling by reflection(s). The current invention all LED or-and laser light source has different emit direction light-beam after go through multiple inner reflect-surface even the light angle is narrow it is not a problem because the light emit from LED or-and laser light-beam emit to the $1^{st}$ reflect-surface, then hit to $2^{nd}$, 3rd, 4th . . . reflect-surface(s) till the light beam been pass though outside multiple convex-surface of the ball-like outer optics-lens so this is current features too! Add motor can make the image be rotating to get moving image to viewer.

From FIGS. 5B, 5C, 5D shown the construction of the co-pending filed case (#ZZZ-2013 U.S. application Ser. No. 14/023,889 filed on Sep. 11, 2013) drawing for alternative design for $1^{st}$ and $2^{nd}$ optics-piece (1R) (1R") one is inner flat unit and one is top cover, or (8R') (8R") both is curved units. The said FIGS. 5B, 5C, 5D both optic-lens has plurality of reflective and refractive optics-surface(s), area(s), section(s) design built-in inner and outside of the inner and/or cover optics-piece(s), so can make light-source light-beams to back and forth within the said inner or outer optics-piece (1R) (1R') (8R') (8R") of the ball-like shape to make the light-source light-beam to spread out to get the image for wide range, big size.

From FIGS. 5B, 5C, 5D, shown the preferred embodiments, images are created based on the relationship between the first optics-element(s) and the second optics-element(s) or all other optics-element(s). The light device can employ any kind of design, shape, display, or geometric arrangement of the more than one optics-element to create big size or large image to cover Big area for special light effects though the Big or wider opening of the Top cover with desired reflective or refractive lens assembly.

From FIGS. 5E, 5F, 5G, 5H, 5I, 5J show the other viewing angle for the FIG. 5B, 5C, 5D for simple discussion.

From FIG. 5E, 5F show the ⅔ ball shape top-cover (01"") is assembled by one piece of ½ ball (01-T) on top and one approximately ⅓ ball-shape tunnel (01-L) which have 2 open-end (not shown) and big radius opening is assembly with the top ½ ball (01-T) to form the said ⅔ ball (01""). The said ⅔ ball top-cover (01) had ½ ball and ⅓ tunnel which for 2 optics-piece (01-T) (01-L) assembled and light-beam travel multiple-times for reflection and/or refraction and ⅔ ball (01"") assembled with the axis from the lower positioned motor and gear-set to make it rotating.

From FIG. 5G show the more than one of the optic-piece (01-T) (01-L) both have radius or sphere shape and assembled together to form the ⅔ ball unit. The said light-beam (A) emit out from the LED (05) to emit to the $1^{st}$ inner reflective-area and split into 2 light-beam (A1) and (A2) and each emit to the point (B1) and emit out by refractive-lens or light-passable-lens with art or design on that area(s). The other light-beam (A2) hit the inner reflective and/or refractive area(s) (B2) and reflected again to split into light-beam (A3) and (A4). The light-beam (A3) hit the area (B3) and emit out, The other light-beam (A4) hit the area (B4) and emit out. These light-beam traveling path show the LED light-beam have multiple times reflection and/or refraction within the two optic-pieces both are the said optics-lens which have reflective and/or refractive optic-properties.

From FIG. 5G shown the Top ½ ball or the lower ball-tunnel (01L) may assemble with lower position motor and gear-set to rotating on same or reverse direction so can make desired splendid light effects. The said LED project light-device may has DC power source to drive the said built-in circuit or DC-to-DC circuit to make the said desired functions of LEDs (05") or powered by the DC energy storage unit(s) which is dry batteries or rechargeable battery which can be charged by USB port by outside USB-wire-set (055").

From FIG. 5H show the rotating ⅔ ball assembly and the LED project light has the base (2''') has built-in AC-to-DC circuit (not shown) so can get power from outlets for indoor application use. For indoor application prefer not use AC-plug-wire, but for outdoor application need to use AC-plug-wire or connect with outside AC-to-DC transformer male-plug to insert into LED project light housing female receive-ports.

From FIG. 5I show the same concept with the above discussed FIG. 5 with same construction but without shown the top 1$^{st}$ and 2$^{nd}$ optic-piece connected with the said axis. From FIG. 5-9 the axis is assembly with the ⅔ ball unit to make the ⅔ ball rotating to get expected LED and/or laser light functions, effects, performances.

From FIG. 5J show the outside shape of the FIG. 5 which is discussed the inner more than one of rotating inner optic-lens (01) (01-a) which can see from FIG. 5-10 for multiple inner optics-lens (01L) and rotating to emit the splendid LED light-beam emit out from design or art or light passing areas, or shape window, or printed or painted top-cover for light passing-through areas inside the art or outside the art. Wherein, the said top-cover (01-T) is one of geometric shape, or a dome with super low-height, or almost flat-curve shape, or sphere shape, top cover From FIG. 6 shown the co-pending (#FF-4) (#FF-3) (#FF-2) and issued (#FF-1) which has shown the LED project light for outdoor application have the (1) The current invention for FIG. 2F, 2G, 3I, 3J have shown Disc-with-teeth unit (gear-unit) FIG. 3J (180)(181) (182) (183) (184) or FIG. 3-9 (223) (225') (226') (227') (228') or FIG. 2F (180) (181) (182) (183) (184) or FIG. 2G (190) (192) (193) which is similar with co-pending filed case FIG. 6 (11V).

(2) The current invention has focus-adjustable extend-and-retractable refractive-lens assembly FIG. 4A (95') (96') (97') as FIG. 6 (12V) which has (screw-thread) to allow the said refractive project-lens can move-up and move-down to change focus.

(3) The current invention have disc-with-teeth (gear-unit) FIG. 3I (225') (226') (227') (228') (223) or FIG. 3J (180) (181) (182) (183) (184) can be manual or automatically rotating same as the FIG. 6 (11V) and rotating like (2 Arrow) head shown rotating direction.

(4) The current invention have disc-with-teeth (gear-unit) FIG. 2F, 2G, 3I, 3J have image-forming-piece (188") fit within the disc-with-teeth (181) same as FIG. 6 (11'V) and (11V''') (10V)

(5) The current invention FIG. 2F, 2G, 3I, 3J have different level for disc-with-teeth (gear-set) with different level for top refractive-lens assembly to align with the lower disc-with-teeth (Gear-unit) FIG. 3J having light-source (181a) emit to the topper the slide or film or shape unit (181b) fit within gear-unit (181) similar with the co-pending filed case FIG. 6A (26V) for disc-with-teeth (gear-unit) has film or slide fit within the openings (37v) (27'V).

(6) The current invention housing parts has opening FIG. 4A (91') (92') (93') to allow to replace the tray or holder or disc of the said image-forming-piece form housing slot, opening, join-gap this is same as co-pending case FIG. 6A (9V)

So, these current invention features is same of co-pending case (#FF-Series) because all the drawing for parts is same. The (#FF-series filed case) is co-pending now so the current invention should be CIP or Division and filed date back to Dec. 30, 2008 without any question.

From FIG. 6B show the current invention for basic LED project construction for a. light-source (15V) fit within the housing-parts or tray or holder or ring and emit the light-beam to front b. the said slide or film or image forming-piece which located within c. the tub-assembly (19V) or housing-parts (19V), or upper tray, holder, support, disc, or disc-with-teeth (19V) and d. the said space (21V) between the said project-lens and film/slide/cutout/printed piece or painting piece. And e. the said project refractive-lens located on top of the said lower-position tub-assembly (19V) or housing-parts (19V), or upper tray, holder, support, disc, or disc-with-teeth (19V).

f. so the light-beam will aim to the said image-forming-piece (20V) and also aim to the projection refractive-lens location or area or direction.

The light beam will form the said magnified lighted-beam, and/or lighted-image, and/or lighted-patterns on outdoor locations, areas, surface including but not limited for house, building, garage door, front door, fence, wall, garden, or patio or tree or desired surface.

So, these current invention features is same of co-pending case (#FF-Series) because all the drawing for parts is same. The (#FF-series filed case) is co-pending now so the current invention should be CIP or Division and filed date back to Dec. 30, 2008 without any question.

It is appreciated any similar to apply the light-source to aim to the image-forming-piece and also align the LED light emit direction to the project lens is the current invention most basic theory in spite of have 1. the different construction of image-forming-piece,
2. focus adjustable project-lens assembly,
3. added extra magnify-lens,
4. added wireless remote controller,
5. added extra audio system with speaker,
6. added IC or circuitry to change the light-beam color, brightness,
7. added any kind of sensor or detectors for PIR, Photo, radar, moving, power fail sensors
8. The moveable or replace or insert image-forming-piece with or without holder, tray, disc.
9. Add master-gear or surround gear-set(s) to make rotating N-number surround linkable gear-set(s) with or without built-in slide or film or image-forming-piece
10. Added coiled or rolled image-forming-piece with continuously rotating or rolling with extra added steady, fix, freeze 2$^{nd}$ or more image-forming-piece with magnify-lens.
11. The top cover in geometric shape or dome with high, medium, low height with printing or painting or art or design to allow inner changeable or movable or rotatable N-number (N is any number) inner optics-lens for same or different rotating direction to emit light-beam go through outer cover with art, design to see the lighted image and/or patterns.
12. The geometric-shape of top-cover has art, design, light passable areas, light block-areas to show out lighted patterns and image or light-beam. The said light-beam is changeable or variable because inner optic-lens is rotating with reflective and/or refractive optic-properties so make the passing light-beam is variable, shaking, moving, vibration emit from front light-passing area from different input-angle so can make the shaking or vibration or moving the lighted image or patterns.

All these added extra piece still follow the current invention for FIG. 6, 6A, 6B spirit the at least one or N-number (N-is any number) of (AA) The light-beam→emit to front→image-forming-piece, and/or (BB) The Light beam→aim to→The export area or section of the said the lighted image and/or lighted pattern.

(CC) The project basic 3 elements including:

Light-source→emit to→optic-piece→form image and patterns→project out.

Any alternative such as above discussed (12) added parts or accessories still fall within the current invention basic theory for outdoor project light-device.

From FIGS. 7, 7A, 7B, 7C, 7D the several embodiments to show more details of motor and speed adjust gear-set to rotate disc that has plurality of refractive or-and other optics-properties lens. From FIG. 7 show the outdoor light (7P1) has 3 basic-parts of project-assembly including project-lens (7P5-1), image-forming-piece (7P5-2), light-source (7P5-3) inside. The LED (7P4) emit light-beam to the front image-forming unit (7P5-2) which is a piece with openings, shape hole, film, slide, displayer or texture lens or treatment lens; so can create image. The light-beam came out of the image-forming unit(s) (7P5-2) emitting to the front plurality of refractive lens (7P2) which inside the rotatable disc (7P2-1) and fixed on the axis (7P3) from below motor and speed adjust gear-set (7P5), so can make the holder (7P2-1) of plurality of refractive-lens(s) (7P2) to rotating. At the same time each tiny lighted image or-and patterns came out from image-forming-piece(s) (7P5-2) will show out big image-or-patterns to outdoor surface(s)

(i) while the number 1 of refractive-lens (7P2) rotate and fall-into range of tiny size lighted-image or lighted-pattern or light emit-out from one of the image-forming unit (7P3"), and big image-or-patterns will show at desired areas and travel partial, arc of circle, and (ii) While the Number 1 of refractive-lens (7P2) rotate and fall-out range of tiny size lighted-image or lighted-pattern or light beam emit-out from one of the image-forming unit (7P3"), and big image-or-patterns will disappear not shown on desired areas after travel partial or arc of circle. Because the rotate Number 1 of refractive-lens (7p3") away from the range of the said tiny size lighted-image or lighted-pattern or light beam emit-out from one of the image-forming unit (7P3").

Same as other number of rotating refractive-lens on the rotating tray (7P2-1). Same as The said Number 1 big image-or-patterns shown on desired area, and at the same time the light-device have N-Number (N is any number) of plurality of refractive-lens (7P2) is rotating so also has N-Number of big image-or-patterns is moving show and disappear under pre-determined design. The Said Light (7P5-3) motor and gear-set (7P5) and circuit (7P7) has conductive piece (7P6) (7P8) to build the electric signal delivery to the circuit (7P7) which connect with the said FIG. 7D one of the above discussed 4 types contact or connector (7P1C) (7P2C) (7P3C) (7P4C) including at least one of AC plug wire (7P3C). The said light (7P1) is one of outdoor light application for down light or horizon installation at ground for outdoor garden project light, accent project light, holiday projection light, seasonal project light, with preferred image-forming unit such as seasonal sign or arts.

From FIG. 5A show the alternative construction which has apply the light-beam block-device which may a tube or tube-assembly or tray/holder/housing-parts assembly have well assembled together to prevent from light-beam leakage out from the said tube, or tubular/tray/holder/housing-parts to outsider. By way of example and without limitation, such as the one of preferred embodiment as FIG. 7A the internal have different diameter for big-tube (7P13) or-and optional small-tube (7P12). The Big-tube (7P13) and optional (7P12) main purpose is isolate the LED or-and laser light-beam to interfere desired light performance. For examples the big-tube (7P13) has its own 3 basic-parts including light-source+ image-forming-piece+ project-lens(s) or selected added-parts to make a steady and fixed big-image emit from the Big-tube (7P13) show out to outdoor surface(s). At the same time the said surrounding the big-tube (7P13) has plurality of the rotating projective optics-lens inside the rotating-disc (7P2') and each refractive-lens (7P3') is rotating and fall-within or away-from the range of each the said tiny size lighted image-or-patterns-or-light beam came out from lower image-forming unit(s) (7P11) so create multiple moving image-or-patterns as FIG. 8 show the Big-size image/pattern have partial or arc circle movement effects (Q7) (A8) (Q9). This alternative or said up-grade construction of center non-rotating Big-tube project-assembly and the rotating plurality of project-lens(s) that has tube (7P13) can create a 2 type of image including center has Big-Size Image-or-patterns including cartoon, logo, words, sign or other geometric or arts, and surrounding it is a lot of moving small image which can be any color, design, shape, image, patterns FIG. 7A than FIG. 7 the light only have surrounding rotating plurality of project-lens light. This is same as parent and co-pending (#QQQ-3) U.S. application Ser. No. 14/983,993 filed on Dec. 30, 2015 now is U.S. Pat. No. 9,909,739 issued date Mar. 6, 2018 which is CIP of patent (#QQQ-2012) US series 13-540,728 filed on Jul. 3, 2012 now is U.S. Pat. No. 8,834,009 Which is Division filed case for (#QQQ-2012) now just make more clear for tube function and upgrade to make big-size steady and surrounding small-size moving lighted image-or-and patterns.

From FIG. 7A The said optional tube (7P14) (7P12) main purpose is isolate the other LED and/or Laser light-beam to interfere the desired light performance also can present light to leakage out to other area to make image darker. These small tube inside is hollow and without any image-forming unit(s) or-and LEDs.

From FIG. 7A the said LED(s) (7P4') which may has different number color or different unit number and also can have any combination for colors under pre-determined requirements so it can be 1 color or 2 colors or more than 2 colors with IC control to make it has pre-determined on-off time, period of time, cycles, duration, color changing, selected color, freeze color, fade-in or fade-out, chasing, random, pair flash, sequential flashing or other market available LED IC functions to use for desired functions.

From FIG. 7A also show the front disc have plurality number of refractive or-and reflective and/or other optics-properties lens including rotating diffractive grating-piece, it also show the disc for the rotating or not-rotate disc for the image-forming unit(s) or the disc have more than one disc have desired optic-lens(s). This can be same as the above discuss FIGS. 7B, 7C, 8A, 8B, 8C for any possible to make different front enlarge or split light beams lens assembly and the image forming unit(s) or-and texture lens. There have hundreds of combinations or assortment s can be choice by market requirement.

From FIG. 7B show more simple application than FIG. 7A which have plurality of 1$^{st}$ optics-element or lens (7P19) in front of each tube (7P18) which in-front of each of LED (7P16). The each tube (7P18) is optional to prevent the other LED or-and Laser light source beams to interfere the desired light-performance and also can prevent the light-source light-beam leakage to surrounding inner-housing-space to reduce the brightness. The light-beam emit out from light source (7P16) to optional or non-necessary of the said front tube (7P17) (7P18) and emit to the front of $1^{st}$ optics-lens (7P19) which is an image-forming-unit or texture-lens or grating-piece (7P19) to form the lighted image or-and patterns. The tiny lighted image or-and patterns exit out from Image-forming-piece (7P20), then go through the $2^{nd}$ optic-lens (7P21) which is the lens has at least one big-size of refractive or-and reflective or-and diffusing or-and protective lens to emit out the big-size lighted image or-and patterns to outdoor surface. While the $2^{nd}$ optic-lens (7P21) is one of the alternative protective purpose protective-lens or protect top-cover with designed art or design or printing or painting arts so the lower-positioned the said tiny lighted image or-and patterns under the protective-lens already spread-out or already have splendid-lighted image and/or patterns and/or light-beam to desired size and range while (Light 1) the light source is a strong and high-power LEDs use for the outdoor light or-and (Light 2) the inner light source is a Laser light source and already passing through the grating-piece for image-forming unit(s) (7P19).

From FIG. 7B also show the built-in AC-to-DC circuit with or without IC (7P22) has conductive-wire (7P23) go through or passing through the water-resistant sealing (7P24) and has AC plug wire (P26) (P27) to connect with AC power source. Same for the top housing-part (P28) also has rubber or silicone water-resistant sealing to make environment requirement and meet the IP-grade for outdoor lighting water resistant standard.

From FIG. 7C the outdoor light is a laser light-source (7P29) which has circuit (7P31) to emit the desired high-power or high-wattage power laser light-source (7P29) and wire (P33) (P35) to connector selected from one of the 4 connector (7P4C) as above discussed with AC power source (not shown). The Laser high-wattage light-beam pass through the front image-forming unit(s) (7P30) or diffractive grating-piece assembly (7P31') which may has plurality of grating-piece (7P30) fit into a rotatable disc or holder (7P31') and each of the grating-piece (7P30) has different laser-treated for different grating or-and hologram construction so can came out the (Laser 1) linear, or-and
(Laser 2) dots, or-and
(laser 3) array, or-and
(Laser 4) matrix, or-and
(laser 5) contour, or-and
(laser 6) shape outline;

so can create the desired laser image or-and patterns for desired number of colors. The alternative or upgrade application can incorporated with LED light source so can have LED or-and Laser all kind of light performance from one unit of outdoor lighting or outdoor garden light or outdoor seasonal light. The LED can create full details color image such as cartoon character and laser can create the background or splendid laser light image or-and patterns.

From side FIG. 7D show preferred 4 connector choice for outdoor light as above discussed.

From FIG. 8 the outdoor light has alternative construction The FIG. 8 show the LED (Q1) emit the light-beam to top optic-piece (Q3) which has above discussed including:

(Properties 1) refractive, and/or
(Properties 2) reflective, and/or
(Properties 3) diffusion, and/or
(Properties 4) diffraction or grating, and/or
(Properties 5) protective, and/or
(Properties 6) combo above optics-piece(s) which has any combination for lens from 1 to 6 optics-properties; so has 6 type choice (Image 1) is an image-forming unit which is a slide, film, stencil,
(Image 2) displayer, displayer including LCD or TFT or Screen,
(Image 3) piece has printing, piece has cutouts, piece has shape opening, piece has geometric design, piece has window,
(Image 4) grating piece, hologram piece;
so has 4 type choice(s).

(YY-1) film, or
(YY-2) slide, or
(YY-3) displayer including LCD or TFT or Screen,
(YY-4) printed colorful piece, or
(YY-5) grating or hologram piece (LENS 1) is a texture lens which has at least refractive, or-and reflective, or-and diffusion, or-and grating or-and protective optics-properties, or-and (LENS 2) prism lens, diamond-cut lens, variable thickness lens, marking lens, sandblaster lens, craving lens, or-and (LENS 3) combo-lens which has any combination for refractive, reflective, diffusion, grating, protective, grating, hologram optic-properties in one piece, or-and (LEND 4) other treated lens which can create image or patterns, or-and (LENS 5) combo-lens which one lens has desired any combination may selected from reflective, refractive, diffusion, grating, protective window, flat piece without optics-properties. Protective lens; so has 5 different type lens choice (Lens Shape 1) dome lens, dome with different high, medium, low height cover.
(Lens shape 2) sphere lens, cover, sphere-flat cover,
(Lens shape 3) ½ ball or more than ½ ball
(Lens shape 4) ½ ball with other piece to become ⅔ or ¾ ball combination lens which have art, design, painting, printing, cartoon, character, window on cover, and/or offer image-forming and/or refractive combo-lens; so 4 type of shape can choice (ZZ-1) variable thickness, or
(ZZ-2) diffusion surface, or
(ZZ-3) marked lens, or
(ZZ-4) texture lens, or
(ZZ-5) convex lens, or
(ZZ-5) craved or en-craved or laser craved lens, or
(ZZ-6) combo-lens which have more than one of reflective, refractive, diffusing, grating, protective, total reflective, retro-reflective lens, or
(ZZ-7) grating or hologram piece or lens;
so for lens design minimum has 7 choice.

(Laser 1) linear, or-and
(Laser 2) dots, or-and
(laser 3) array, or-and
(Laser 4) matrix, or-and
(laser 5) contour, or-and
(laser 6) shape outline;
So, has minimum for 6 choice for laser light source.
(LED 1) has one or more than one piece, or
(LED 2) has one or more than one color, or (LED 3) has desired on-off time, period of time, cycle, duration, sequential, or (LED 4) has desired LED type selected from Dip LED, Chip LED, Dice LED, Chip-on-Board (COB) LED;

so minimum has 4 type combinations of LED light source.

(HH-1) tube shape, or
(HH-2) Cone shape, or
(HH-3) Speaker shape, or
(HH-4) football shape, or
(HH-5) any geometric shape;

so the light housing at least has 5 different shape can choice.

(Power 1) AC plug wire, or
(Power 2) AC bulb-base, or
(Power 3) AC prong, or
(Power 4) outside circuit including AC-to-DC transformer;

so the power source has minimum 4 types can choice.

From FIGS. 8, 8A, 8B, 8C see the LED (Q1) emit light to top optics-lens (Q4) is the slide or shape cutout or printed piece or window (Q3), and tiny size shaped lighted image or-and patterns emit to front or top enlarge size refractive or-and other optics-properties lens (Q5). The light device has the top or front plurality of refractive-lens (Q5) fit into rotating disc (Q6) so the LED (Q1) light-beam go through the optics-piece is image-forming-piece with arts or optics-lens with treatment (Q3-1) and while the refractive-lens (Q5) rotating into range (RG) of the tiny-size lighted-image or lighted-patterns or lighted light-beam to create the big-size lighted-image (Big Q5 in) show up, and while the refractive-lens (Q5) rotate away-from the range of the said tiny lighted-image, lighted-patterns, or lighted light-beam range (RG) the said big-size projected-image (Big Q5 out) disappear; so the big-size projected-image (Q5) show-up till the said disappear after traveled the said partial circle or desired art-curve line track (path). The traveling track (path) can design basing on the number of the refractive-lens (Q5) inside the rotatable disc or other type carries or holder and the number of the image-forming-unit(s) or optic-lens(s) (Q3-1) and other related design with the said upgrade or alternative construction and/or design the LED (Q1) can incorporate with optional optic-lens (Q-10) which change the LED (Q1) narrow light emit-angle to wider angle and become parallel light-beam emit into top optic-piece(s) in form of the said image-forming unit(s) or optic-lens(s) for more evenly for area section, area.

From FIG. 8A the outdoor light has LED (Q1') to emit light to front $1^{st}$ optic-piece (Q3'2a) select from one of optics-lens of image-forming-unit maybe is a rotating prism optic-lens (Q3'2a) and created plurality of refractive or-and reflective light-beam. The said light-beam spread out from the top of the prism-lens (Q3'2a) and emit to the front $2^{nd}$ optics-lens (Q3') which is same as the $1^{st}$ optics-piece (Q3'2a) to create the very splendid light-beam or lighted-patterns or lighted-image because LED light-beam go through the double reflective and/or refractive optic-lens or image-forming-piece (Q3') (Q3'2a) and double reflected and/or refracted LED light-beam emit to the top fixed and non-rotating optic-cover in (i) ½ ball or (ii) more than ½ ball or (iii) flat or (iv) curve-flat or (v) dome with different height shape with desired (a) diamond-cut (Q5"-1) or (b) marked-lens (Q5'-1) or (c) variable thickness-lens or (e) are, design, printing, panting, geometric-art, word, (f) reflective and/or refractive treatment(S) (Q5') so can change the light-beam came out from the 3rd optic-piece (Q5'-1).

Same as FIG. 8B which has the rotating $1^{st}$ optic-lens (Q3"-2a) have plurality of reflective and/or refractive treatments on preferred prism-lens or other treatment or texture-lens so the LED light-beam will spread out to plurality splendid light-effects. The said light-beam exit out from the $1^{st}$ optic-piece is one of optic-lens (Q3"-2a) emit into the $2^{nd}$ optics-piece is one of image-forming-piece or optic-lens have preferred or desired variable thickness optic-properties (Q3"-3) or texture optic-lens (Q3"-2) or $2^{nd}$ reflective and/or refractive optic-areas(s) (Q3"-1) as image-forming unit (Q-3"). The LED (Q1") emit light to top $1^{st}$ and $2^{nd}$ optic-lens (Q3"-2a) (Q-3") to create plurality of LED light-beam and emit to the front 3rd optic-lens (Q5") which has the diamond-cut treatment (Q5"-1) which has the inner flat and outside is round shape, or other light-passable art, design, printed-area(s), Painting-area(s) to make shaped art, design, printed area(s), painted-area(s) emit out very splendid light beam which has passing through double reflective and/or refractive rotating optic-lens. This arrange is same as co-pending filing #ZZZ-2013 for light-beam passing through more than one of the said reflective and/or refractive and/or diffusion and/or diffractive and/or protective-lens with art, design. So it is one of the upgrade for passing through the 3rd or more reflective and/or refractive optic-lens of co-pending (#ZZZ series). This embodiment or alternative have the said added or optional convex-lens has refractive optics-properties to enlarge the $1^{st}$ LED light-beam the narrow-emit-angle LED light-beam to wider angle in front of each of the said LED(s).

From FIG. 8C the outdoor light is a laser light device which has Laser light source (Q11) install inside of the hole (Q12) of base (Q13). The laser light beam (Q14) emit to front or top one or plurality of grating or-and hologram piece (Q15) which is install on the disc (Q16) and split the laser light-beam (Q14) into plurality of low-wattage laser light-beam (Q17). Then, the laser light beam (Q14') emit to front or top one or plurality of grating or-and hologram piece (Q15') which is install on the disc (Q16') and split the laser light-beam (Q14') into more complicated the said plurality of low-wattage laser light-beam (Q17) because the original laser light-beam went to the $1^{st}$ and $2^{nd}$ grating-piece-assembly for twice diffraction functions(s). The plurality of low-wattage laser light-beam emit through the top or front 3rd optic-lens(s) which is type of protective-lens which has no any optics-functions. Or/ The light plurality of low-wattage laser light-beam out of the $1^{st}$ rotating grating-piece (not shown) emit to (Q17') $2^{nd}$ rotating grating-piece (Q17) which also rotating with different diffractive-design or spacing so can change the diffractive-design or spacing with the fixed or rotating $1^{st}$ grating-piece (Q-16), then change the relative grating-piece art, design, spacing can make a plenty of different lighted laser image or lighted laser patterns or lighted laser-beam. or plurality number of grating or-and hologram light-effects (not shown). The said more than one of the grating-piece also can installed inside the rotating-disc same as (Q16) or (Q17) or have the 2 different grating-piece into a top and lower level holder, so can change at least two of the of grating-piece relative position, orientation for alternative or different construction or design of grating-piece so can get the laser image for different (Laser Image 1) contour,
(Laser Image 2) shape,
(Laser image 3) light patterns,
(Laser Image 4) spots,
(laser image 5) array,
(Laser image 6) matrix image or-and patterns;

to show out the for wide view area. It appreciated the laser outdoor or laser seasonal or laser garden light may incorporate the sensor device as parent and co-pending (XX-family filed on 2010).

From above details description, hereafter to make the each features shown on the which drawing for which parts to easily to verify the each claim si supported by the detail description to save examiner checking text time, including:

The current invention for outdoor application that incorporate with motor or clock-movement with one or more gear-set to rotate the said at least one of:

The current invention for the said LED and/or laser outdoor light application incorporate with motor or movement with one or more gear-set to rotate the said at least one of:

From FIG. 2A (275) (278) (279): One or more inner optics-lens having reflective and/or refractive properties to rotating to created splendid plurality of light-beams. This is same as above discussed said co-pending (#FF-2) (#FF-3) (#F-4) and issued (#FF-1) U.S. Pat. No. 8,721,160 B2 which file don Oct. 28, 2010 and Division of application Ser. No. 12/318,470 filed on Dec. 30, 2008 claim 2 [An LED project light as claimed in claim 1, further comprising at least one of the following element (a) a telescope assembly, (b) tile means for tilting said optics means, (c) ROTATING MEANS FOR ROTATING SAID OPTICS MEANS, (d) adjust means for adjusting said optics means, (e) a roller and (f) an elastic member to change a project direction of said light]. Wherein, the (c) rotating means for rotating said optics-means", and/or From FIG. 5E (01-T) (01L) and FIG. 5H (01-T): At least one the outer cover having reflective and/or refractive and/or pin-hole [Co-inventor U.S. Pat. No. 7,832,917 FIG. 2 and FIG. 2-1 shown pin-hole image or cutouts, shape-printed area(s) on half-ball for battery or AC powered LED light] or art-design or printed areas to allow light from inner optics-lens to reflected and/or refracted and/or passing through, and/or At least one of the image-forming-device is a sheet or a roll or a cylinder or tubular construction to make it rotating to change image. This is same as co-pending (#FF-2) (#FF-3) (#F-4) and issued (#FF-1) U.S. Pat. No. 8,721,160 B2 which file don Oct. 28, 2010 and Division of application Ser. No. 12/318,470 filed on Dec. 30, 2008 claim 3 [An LED project light as claimed in claim 2, wherein said SLIDE ARE CHANGED BY AT LEAST ONE OF SAID ROLLER, said elastic member, and a push button], and/or From FIG. 2G (192) is a gear-unit which is derived by the said main-gear-unit and hold on position by housing (191) and gear-unit (192) teeth match the gear-teeth with gear-unit or piece (190) (193) those may fixed on axis (189') of motor (189): At least one gear-piece fixed on axis from motor and match the at least one of other gear-piece (190) (193) to change the round-rotating from motor and its gear-piece or gear-assembly on $1^{st}$ horizon or vertical to change to other vertical or horizon rotating such as FIGS. 3B, 3C, 3D shown the make the rotating-from horizon (164) to vertical (165) of the said cylinder or tubular-type of image-forming-unit (160A) or like FIG. 2G from horizon (190) to vertical (192).

From FIG. 2F (180) (181)(182) (183) (184): At least one main-big gear-piece (180) is drive by the motor and axis to make it rotating with desired gear-teeth to reduce the rotating-per-minutes (RPM) to desired speed and drive one or more other surrounding or different height gear-piece (181) (182) (183) (184) to fit gear-teeth and the one or more other contacted-gear-piece (181) (182) (183) (184) so rotating while the main-big gear-piece (180) is rotating. Wherein, the smaller gear-piece (181) (182) (183) (184) has center image-forming-piece (185) (186) (187) (188) fit within so make the image-forming-piece (185) (186) (187) (188) which may is one of film, slide, cut-piece, printed-piece, shape-piece, or grating-piece for laser light-source.

From FIG. 4A (95') (96') (97'): The telescope optics-lens has built-in

Screw-thread or tube-construction can easily move and change the refractive-lens (96') to up-and down to change the distance for one or more image-forming-device by manual or by motor with built-in cam-shaft or eccentric-shaft so can change the circle rotating to up-and-down straight or line movement the said telescope optics-lens. This is same as co-pending (#FF-2) (#FF-3) (#F-4) and issued (#FF-1) U.S. Pat. No. 8,721,160 B2 which file don Oct. 28, 2010 and Division of application Ser. No. 12/318, 470 filed on Dec. 30, 2008 claim 2 [An LED project light as claimed in claim 1, further comprising at least one of the following elements: (2) a telescope assembly.], and claim 5 [An LED project light as claimed in claim 1, wherein said optics means includes an extend means and said extendable means changes a relative position of said slides, said light source, and said lens to adjust a focus of said image.] and/or The said Image-forming-unit(s) or device or assembly has dome or flat or curved or cylinder-coil or in-holder or other geometric-shape has desired location or position of said LED and/or laser project light the said arrangement(s) select from the following type:

The said image-forming-unit or device as below examples but should not limited for these preferred embodiments including:

(A) Plastic piece in a sheet, injected-piece, coil, cylinder, piece with holder that also has following desire combination or assortment treatment(s):

(a-1) opening, shape cut-outs FIG. 3 (3h),
(a-2) printing FIG. 2 (2h) (3h'),
(a-3) masking FIG. 2 (3h"),
(a-4) texture FIG. 1 (3),
(a-5) stencil,
(a-6) built-in optics-properties including:
Reflective FIG. 1, and/or
Refractive FIG. 1 (3c), and/or
Diffusing FIG. 2
Light passable FIG. 1 (3b), and/or
Grating-piece FIG. 2 (3f);

The said Image-forming-unit(s) or device or assembly has dome or flat or curved or cylinder-coil or in-holder or other geometric-shape has desired location or position of said LED and/or laser project light the said arrangement(s) select from the following type:

(B-1) fix or within the said tube or tube-assembly or housing-assembly and not movable with or without changeable or replaceable as:

FIG. 1 (3) inner-unit, (7) outer $2^{nd}$ optics-lens.

FIG. 2 (3j) outer flat-dome cover $2^{nd}$ grating, and/or (3e) outer dome-flat cover diffusion-lens, and/or (3h"), outer curved-cover wording, (3h) (3h') window but not punch-through type.

FIG. 1B (31) $1^{st}$ inner reflect and/or refractive inner optics-lens and outer arc cover has reflect and/or refractive optics-lens.

FIG. 1E (74) (74') have outer 170 degree arc-cover printing and inner optics-lens has both reflective and refractive and printing or shaped-window (not punch-through).

FIG. 2A (281) is clear window (not punch trough) for desired size to allow the below splendid light-beam which passing through the two rotate inner reflective and refractive optics-lens go through for whole or section of top flat-dome cover clear window.

The said window (281) may have added art, design, see-through, painting, prints, art, and design.

FIG. 2B (307) have texture (308) or print (309) or window (310).

FIG. 2C (266) curved top cover have diffusing (265) or shaped holes (264) and the inner image-forming-unit or assembly (244) has cutout(s) (245) it can replace by the other piece of image-forming-unit having the said shaped window(s) (Not punch through) to form the image or patterns.

FIG. 2E have the inner movable and changeable for built-in rotating optic-lens assembly (137u) with different tube-unit(s) (137t) which each have non-movable inner image-forming-unit such as slide or film fixed on position for LED light beam can vertically passing through and form the moving image out from the top cover (137) which is clear and even thickness wall.

FIG. 4A The LED ice-cream or tube-like housing for outdoor garden light application which has fixed position image-forming-unit which has film or slide or printed-piece (92') fit into the tray, or holder, or disc (91') which can replaceable by manual or automatically from the slot or opening (93') which is same as above discussed said co-pending (#FF-4=U.S. Ser. No. 14,967,862=Pending case) (#FF-3=U.S. application Ser. No. 14-539,027=Pending case) (#FF-2 U.S. Ser. No. 14/275,184=now allowed) (#FF-1 now is issued patent) and issued (#FF-1) U.S. Pat. No. 8,721,160 B2 which file don Oct. 28, 2010 and Division of application Ser. No. 12/318,470 filed on Dec. 30, 2008 FIGS. 1, 1B, 2, 3, 5A to 5G for change or replace the film or slide or printed-piece in holder or frame or disc by manual or automatically by motor with gear-set. Furthermore, the FIG. 4A the manual or automatically focus adjustable is shown on the co-inventor co-pending for claim 5 [An LED project light as claimed in claim 1, wherein said optics means includes an extend means and said extendable means changes a relative position of said slides, said light source, and said lens to adjust a focus of said image.], so this is co-inventor co-pending concept and coverage for above list discussed co-pending filed case date on 2008.

FIG. 4B (107) top curve-edge low-dome cover has printed or painting or masking or window for the word (I Love U), star, geometric shape(s) which is fixed not movable.

FIG. 4D (134) (135) is grating-piece which allow the inner laser light source to emit laser light-beam go through and split the original single high-power or high-wattage single light-beam to split into plurality of the low-power or low-wattage laser light-beam to show the pre-designed laser grating-piece designs, art, contours to outdoor surface as the co-inventor's co-pending filed case (#XX-2) US series number 15-170,171 which is CIP of Co-pending US series number 14-844,314 and its parent filed case U.S. Pat. No. 9,239,513 filed on Nov. 3, 2010.

(B-2) Movable or Rotatable image-forming-unit or assembly or the image-plurality single or continuously image-forming-unit(s) inside holder, tray, disc and movable with or without changeable or replaceable the said unit or assembly as:

FIG. 2 (3g) is flat-piece with reflective and refractive optic-lens or is a prism optics-lens to rotating along with the axis of the said gear-set(s) and motor (not shown)

FIG. 3 (23) is the $1^{st}$ inner moving optic-lens which has shaped cut-outs, window (not punch-through), opening, or printed shape with light passing-through and light block-out material to allow lower LED light-beam can passing through, or it is a film, slide, stencil, designs, arts, words.

FIG. 2B (304) is a texture or marking or variable-thickness or has other optics-treatment to get reflective, refractive, diffusion, passing-through, block-out light-beam traveling path. The said $1^{st}$ inner optics-lens (304) is movable by the said magnetic reaction-force which made by the magnetic-unit (202A) fit within the holder (298) with the magnetic-coil-unit (300) to make it move, shake, swing, floating and created the $1^{st}$ image and/or patterns and emit the lighted patterns and/or image to the top curved or flat-dome or sphere outer-cover (307) which is fixed on position and with the textures or other optics-treatments (308) and/or wording (I love U) (309) or printed/painted/marking (310) so can get desired art work to show wording or image or patterns for shaking, waving, sifting, swing, vibration as co-inventor co-pending filed case (#QQQ-3-1) (#QQQ-3-2) (#FF-5) (#QQQ-7) (#QQQ-6) (#QQQ-5) (#QQQ-4) (#QQQ-3) where the (#QQQ-3) now is U.S. Pat. No. 9,909,739 U.S. Ser. No. 14/983,993 filed on Dec. 30, 2015 which have same drawing FIG. 1E and same drawing also show on the co-pending case parent filed case (#ZZZ-3) US application 14-503,647 Now is U.S. Pat. No. 9,719,654 has parent filed case 14-023,889 filed on Sep. 11, 2013 and the (#ZZZ-2013) is the $1^{st}$ one worldwide for more than one optics-lens has reflective and refractive optics-lens for LED project light including indoor or outdoor applications including garden, outdoor project LED light.

From FIG. 2C show the replaceable or equal function or alternative image-forming-device (248) in a cylinder-coiled type which can rotate along the base (253) which is drive by the vertical gear-piece (251) which is connected with horizon gear-set (250) which fix on the axis (249) (241) of the built-in LED light inner space motor (240). The rotating cylinder-coiled image-forming-unit which has printed or painting design, art, character, openings or other marking which will rotating to form the continuously image or patterns which show moving image and/or patterns.

From the FIG. 3A (142) is horizon rotatable flat image-forming-piece or unit with the (143) is opening, window (not passing through) or (144) art, design, printing, or (145) art-design, painting, or (146) art, design, film, slide on the inner image-forming-unit or piece (142) which connect with axis of motor and its related gear-boxes or gear-assembly (147) so make the said image-forming-unit or piece (148) all the pre-designed art or words, or words been projected to outdoor building, fence, ceiling. Same as the FIG. 3E and FIG. 3G From FIG. 3H show the other preferred embodiment which similar with FIGS. 3B, 3C, 3D which has the cylinder-coiled or tubular image-forming-unit or piece (208) which is drive by built-in vertical gear-set (214) which is driver by horizon gear-set (206) which fixed on the axis of motor (205). The built-in LED or Laser is fit within the cylinder-coiled or tubular image-forming-unit (208) and LED or laser or both light-beam emit to straight to the said where the lighted patterns and/or image emit-out opening or front or outer cover (213). The said LED or laser or both light-beam passing through the cylinder-coiled or tubular-like image-forming-unit or piece (208) to form the $1^{st}$ lighted image and/or patterns and it is optional to add one or more $2^{nd}$ or N-number of image-forming-unit or pieces so can form more complicated and lived continue-moving lighted image such as cylinder-coiled image-forming-image has different colored racing cars and the $2^{nd}$ image-forming-unit has the round-track and optional had the 3rd image-forming-unit has the street light and traffic-lamp both $2^{nd}$ or N-number of added image-forming-unit is fixed not moved so can created a very funny driving image to show on the desired indoor or outdoor surface. Because consider the LED light unit or housing size and tall and diameter or outer dimension so the image or design or art on the cylinder-coiled or tubular image-forming-unit is very small so in front of cylinder or tubular image-forming-unit optional to add one or more magnify-functions optics-lens in front of the $2^{nd}$ or N-number of mage-forming-unit or piece (210). while coiled to cylinder (208) is rotating the moving image or patterns match the $2^{nd}$ or N-number $2^{nd}$ or more image-forming-unit (210) and front one or more magnify optic-lens (211) and refractive-project-lens (212) can get very big lighted moving image. It is also appreciated to add the said refractive optics-lens (212) have extendable or retractable device [similar with FIG. 4A (95') (96') (97')] for refractive-lens as telescope by manual or automatically (incorporated with cam-shaft and motor and proper designed as above discussed) so can project to far-away distance for outdoor application to fence, garage door, building, housing like night-parade of Disney-land. FIG. 4A The LED ice-cream or tube-like housing for outdoor garden light application which has fixed position image-forming-unit which has film or slide or printed-piece (92') fit into the tray, or holder, or disc (91') which can replaceable by manual or automatically from the slot or opening (93') which is same as above discussed said co-pending (#FF-4=U.S. Ser. No. 14,967,862=Pending case) (#FF-3=U.S. application Ser. No. 14-539,027=Pending case) (#FF-2 U.S. Ser. No. 14/275,184=now allowed) (#FF-1 now is issued patent) and issued (#FF-1) U.S. Pat. No. 8,721,160 B2 which file don Oct. 28, 2010 is Division of application Ser. No. 12/318,470 filed on Dec. 30, 2008 and Furthermore, the FIG. 4A the manual or automatically focus adjustable is shown on the co-inventor U.S. Pat. No. 8,721,160 B2 for claim 5 [An LED project light as claimed in claim 1, wherein said optics means includes an extend means and said extendable means changes a relative position of said slides, said light source, and said lens to adjust a focus of said image.], so this is co-inventor co-pending concept and coverage for above list discussed co-pending filed case date on 2008. This prove the telescope or automatically or manual for adjust focus as FIG. 4A teach by co-inventor on copending filed case on 2008 for LED indoor and outdoor project light.

From FIG. 5 (01-inner) is the $1^{st}$ inner rotatable optic-lens and also have the (01a-inner) is the $2^{nd}$ inner rotatable optics-lens both is fixed on the axis (07) which is go through lower PCB board (013) connect with base (06AA) gear-set(s) (06A) and lower motor (06) to make the one or more same color of different color with IC and/or wired or wireless including RF-system to operate the pre-determined LEDs (05) colors, timing, brightness, mixed-color, light-effect to be control to emit the desired LEDs light-beam to top one or more of the image-forming-device(s) or one or more optics-lens including added magnify-function lens, refractive-project-lens, extendable and retractable telescope magnify and focus adjustable optic-lens assembly similar with FIG. 4A (95') (96') (97') which is same as the co-inventor's co-pending (#FF-4=U.S. Ser. No. 14,967,862=Pending case) (#FF-3=U.S. application Ser. No. 14-539,027=Pending case) (#FF-2 U.S. Ser. No. 14/275,184=now allowed) (#FF-1 now is issued patent) and its patent (#FF-2008) and US issued U.S. Pat. No. 8,721,160 B2 for claim 5 [An LED project light as claimed in claim 1, wherein said optics means includes an extend means and said extendable means changes a relative position of said slides, said light source, and said lens to adjust a focus of said image.] for the outdoor LED or laser or both project light device as current drawing 15 pages details.

From FIGS. 5B, 5C, 5D, 5E, 5F, 5G, 5H, 5I, 5J shown the top cover (7R) (9R) (01-T) is rotating along the long axis (07) from the gear-set (06') and lower motor (06) which the top cover has diamond-cut construction so can have multiple times reflected and refracted light-beam to create the splendid light-effects spread out to upper surface or front of the LED project light for outdoor building, wall, fence, garage door. The alternative arrangement is lower-dome shape that may be a flat top and curved-edge cover or other sphere-shape cover. It also appreciated the diamond-cut treatment top cover can have only (1) printed or painted, (2) have art, design, sticker on the top geometric cover, (3) cutout or opening or windows (not punch out).

(C) The LED or Laser or both light-source has desired combination to created the different light effects may select from below assortments;

(c-1) Single and/or multiple color LED(s) and/or laser light source for high-power with heat sink assembly to reduce the LED(s) heat.

(c-2) Single and/or multiple color LED(s) and/or laser light source for lower-power.

The said LED(s) and/or laser light source incorporate with the said IC and/or sensor and/or switch and/or remote controller and/or wired and/or wireless controller including RF-wireless transmitter and receiver as FIG. 1E (61) or FIG. 3A (139) or FIG. 3I (221') or FIG. 4 (97R).

(D) Regarding: The Power source for the LED and/or laser project light including;

(d-1) AC power source get from conductive-contact including prong as FIG. 1 (1a), FIG. 2 (9), FIG. 1B (33), FIG. 1E (66), FIG. 2A (270), FIG. 2B (290), FIG. 3F (217), FIG. 3I (231), FIG. 6 (8a).

(d-2) AC power source get from conductive-contactor including AC plug-wire as FIG. 1C (39), FIG. 2A (271) (272), FIG. 3H (215), FIG. 4 (76), FIG. 4A (90'), FIG. 4B (121), FIG. 5A (014), FIG. 6 (8a).

(d-3) AC Power source get from conductive-contactor including AC Bulb-Base for LED and/or Laser Bulb as FIG. 4 (80) or FIG. 4C (128), or FIG. 4D (136).

(d-4) DC power source get from outside or built-in LED light AC-to-DC circuit as FIG. 1D (55) with wire connection or quickly connector FIG. 5J (013A) AC-Plug transformer with quickly plug (014) and wire (012).

(d-5) DC power source get from USB-port or Outside Batteries or outside energy-storage as FIG. 5G (055)

(d-6) DC power source get from DC energy storage unit such as battery or rechargeable battery as FIG. 5G (013), FIG. 5J (013C)

(d-7) which also has the $2^{nd}$ DC power input quickly adaptor system (015) and get the power from outside separated AC-to-DC circuit or transformer as FIG. 5J (013A) (013B). The Outside DC power source also including the Solar module created DC power source which storage into rechargeable battery (013C) (013). It appreciated the circuit for LED light should accept the 2 types of dry-battery or Alkaline battery which has 1.5 Volt and rechargeable battery which have 1.2 Volt can be compatible for the said LED or laser or both light source project light for supply and accept the both 1.2 Volt and 1.5 Volt different average battery voltage for operation the said desired lighting effects, functions, performance.

(E) Regarding: The said Parts and/or Accessories for the said LED or Laser or both light source project light device may optional to add into the said current outdoor or indoor or both project light device including:

(e-1) The added extendable or retractable focus-adjustable assembly by manual or automatic to changing focus as FIG. 4A (95') (96') (97') which is Continuously for co-inventor co-pending case (#FF-4=U.S. Ser. No. 14,967,862=Pending case) (#FF-3=U.S. application Ser. No. 14-539,027=Pending case) (#FF-2 U.S. Ser. No. 14/275,184=now allowed) (#FF-1 now is issued patent) and (#FF-4) which is CIP of (#FF-3) which is CIP of (#FF-2)[now is allowed] Which is CIP of (#FF-1) now is US patented US (#FF-2008) and US issued U.S. Pat. No. 8,721,160 B2 for claim 5 [An LED project light as claimed in claim 1, wherein said optics means includes an extend means and said extendable means changes a relative position of said slides, said light source, and said lens to adjust a focus of said image.] for the outdoor LED or laser or both project light device as current drawing 15 pages details.

(e-2) The added inner magnify-lens to add to magnify the tiny image-forming-unit as FIG. 3D (176)→(177)→(178) or piece (174) (179) which is continuously rotating cylinder or round or tubular image-forming-device as FIG. 3B, 3C, 3D (160A) so make the image become bigger and go through the front refractive properties project-lens such as FIG. 4A (95') (96') (97') so can become wider lighted continuously non-separated lighted image and/or patterns to show a short video effects.

(e-3) The $2^{nd}$ or N-number (N is any number) more image-forming-unit as FIG. 3H (210) (211) which is $2^{nd}$ and 3rd or more image-forming-unit or piece to make more eye-catching lighted effects such as $1^{st}$ rolling one shown the star-war vedar and $2^{nd}$ fix is space-ships and 3rd is galaxy as background . . . so allow people to make a short movie or video.

(e-4) The $2^{nd}$ or N-number (N is any number) more inner optics-lens has refractive and/or reflective and/or diffusion and/or laser grating-functions optics-properties rotate in-clockwise and/or anti-clockwise to each other or others to make much splendid light beam and/or patterns and/or image to emit to front or top cover with or without optics-properties, printing, painting, art, design, opening(s), window (not punch out but light can passing through and/or block-out by art or design) in geometric shape such high-dome, low-dome, sphere, flat with top tiny radius, totally flat, ball, at least half ball or other desired outer shape.

(e-5) The $2^{nd}$ or N-number (N is any number) more gear-piece to joint with other gear-set which has built-in image-forming-piece as FIG. 3I cut-out (225), art (226), film (227), slide (228), other optics-lens (229) so while master or main gear-unit rotating will make the all connected other gear-unit image-forming-unit (225) (226) (227) (228) (229) rotate at the same time so one project light will have as many as possible for $2^{nd}$ or N-number image and/or pattern projected out from one single LED or laser or both project light device.

(e-6) The $2^{nd}$ or N-number (N is any number) more gear-unit(s) connect with other orientation gear-unit(s) to change rotating orientation or position from horizon to vertical or reverse, so can save the LED project light overall housing dimension, size, length as FIG. 3H (206) (207).

(e-7) The additional audio device to play the sound to matching the projected image and/or patterns such as FIG. 15 (58-1) the LED and/or laser project light has built-in audio-system which has sound, music, voice can play to public matching the desired lighted image and/or patterns and/or cartoon to make not only projection but also audio/voice/sound/music together.

(e-8) The additional parts and accessories may select from below list:

(e8i) all kind of switch, conductive, electric.

(e8ii) radar sensor (which has 360 degree detected areas with preferred distance), (e8iii) all kind motion sensor, photo sensor as FIG. 2B (285-2), (e8iv) all kind of wireless remote controller as FIG. 2B (285-1)

(e8v) RF remote controller FIG. 1D (57) RF-receiver built-in of LED and/or laser light device, (e8vi) wifi controller as FIG. 1B (29-1) RF-receiver built-in of LED and/or laser light device (e8vii) all kind of motion-sensor FIG. 3F (219-1) and trigger RF-transmitter FIG. 3F (219-2) built-in the $1^{st}$ of LED and/or laser project light unit FIG. 3F (218) and the RF transmitter FIG. 3F (219-2) send out wireless signal while motion-sensor FIG. 3F (219-1) detected moving objects to far-away RF receiver FIG. 3G (232-1) which built-in $2^{nd}$ or N-number (N is any number) other garden or outdoor LED and/or laser project light unit FIG. 3 (123) as FIG. 1D (57) RF-receiver built-in of LED and/or laser light device, and FIG. 3A (139) RF-receiver, (e8viii) tubular or cylinder or tray or holder or housing-parts assembly FIG. 6B (21") (19") (17") and each have well assembled to prevent from light-beam leakage out. The said assembly (ASS) having light-source (15") and image-forming-unit (20") or film (20") or slide (20") or printed-piece (20") to form the image or light pattern (25") with top refractive (24") or magnify lens (24") to enlarge the said inside assembly (ASS) small or tiny image or patterns forming-unit (20") and project out to wider areas.

(e8ii) Added $2^{nd}$ or N-number (N is any number) of the Image-forming-unit or piece as FIG. 6A (27") fit into rotatable disc or holder or tray, or FIG. 3H (210) (210') have cylinder coiled $1^{st}$ and $2^{nd}$ front image-forming-unit(s), or FIG. 3I (225) (226) (227)(228) (229) inside the each gear-set.

(e8x) $2^{nd}$ or N-number (N is any number) more replaceable or changeable image-forming-unit which inside tray or holder as FIG. 4A (92') fit within the holder (91') and change from housing slot (93') which is similar with co-inventor co-pending (#FF series) and (#DD-series) for same drawing with current invention FIG. 6 and FIG. 6A for plurality image-forming-unit (27") fit into the rotatable disc or holder or tray (26") to fit into light-device slot (9"'). These replace and/or rotatable like cylinder coiled image-forming-unit is same concept as co-inventor co-pending concept all the image-forming-device surface tiny or small image and/pattern and/or design have to positioned on front of light-source light-beam traveling direction even it is replaceable, inter-changeable, rotatable, cylinder-coiled rotating piece, or insert into the housing slot tray . . . etc. All still same as the Continuously for co-inventor co-pending case (#FF-4=U.S. Ser. No. 14,967,862=Pending case) (#FF-3=U.S. application Ser. No. 14-539,027=Pending case) (#FF-2 U.S. Ser. No. 14/275,184=now allowed) (#FF-1 now is issued patent) (#FF-4) which is CIP of (#FF-3) which is CIP of (#FF-2) [now is allowed] Which is CIP of (#FF-1) now is US patented US (#FF-2008) and US issued U.S. Pat. No. 8,721,160 B2 or U.S. Pat. No. 9,097,413 parent case U.S. Ser. No. 12/292,153 filed on Nov. 12, 2008 now is U.S. Pat. No. 7,871,192 have FIG. 6, FIG. 7 same as current FIG. 6, 6A, 6B and US patent for more than one image-forming-unit fit into replaceable and changeable disk, holder, tray of at least one of image and/or patterns image-forming-unit.

(e8xi) 2$^{nd}$ or N-number (N is any number) more opening or window (Not punch through) or printed-area or see-through area(s) or art-areas or design-areas came out the desired single or multiple colors light beam as FIG. 2 (3h) (3h"), FIG. 3 (3i) (3h), FIG. 1D (53) (54), FIG. 1E (74) (74'), FIG. 2B (309) (310), FIG. 2C (264) (265), FIG. 3A (146) (145) (144) (143), FIG. 3F (197) (198) (199) (200) (201), FIG. 4 whole top-cover (U3), FIG. 4B (105) and (other areas 104), FIGS. 5B,5C whole top (7R) (9R)

I claim:

1. An LED outdoor projection light device for a moving lighted image and/or pattern, comprising:
    at least one LED light source;
    at least one of an optics piece and image forming unit movable in front of the at least one LED; and
    at least one motor and gear set for causing the at least one of an optics piece and image forming unit to rotate, move, shake, or wave,
    wherein the at least one LED light source is connected with at least one of: (i) an AC-to-DC circuit; (ii) an integrated circuit; (iii) a sensor and/or switch; and (iv) control circuitry for a desired light function, and
    wherein the at least one of an optics piece and image forming unit, which is caused to rotate, move, shake or wave as LED light beams pass therethrough, has at least one of (a) reflective, refractive, or reflective and refractive optical properties, and (b) a film, slide, painting, printing, art, display; to obtain desired changeable light effects.

2. The LED outdoor projection light device for a moving lighted image and/or pattern as claimed in claim 1, wherein the at least one LED is one of (i) a single color light source, (ii) multiple color light source, and (iii) plurality of light sources having different colors, the at least one LED being a DIP, chip, dice, or COB(chips on board) type LED and/or part of an LED assembly.

3. The LED outdoor projection light device for a moving lighted image and/or pattern as claimed in claim 1, wherein the optics lens has at least one of following optics properties or elements: (i) reflection, (ii) refraction, (iii) diffusion, (iv) diffraction, (v) a grating, (vi) a light transmission area, (vii) light blocking areas, (viii) texturing, (ix) markings, (x) coloring, (xi) variable thickness, and (xii) even brightness with art or design.

4. The LED outdoor projection light device for a moving lighted image and/or pattern as claimed in claim 1, wherein the image forming unit includes one or more of the following (i) a shaped opening, (ii) a shaped cutout, (iii) a printed area, (iv) a painted area, (v) a non-punched-through window with art or design, (vi) a stencil, (vii) a film, (viii) a slide, (ix) an image display, and (x) textured, treated, or prism optics lens.

5. The LED outdoor projection light device for a moving lighted image and/or pattern as claimed in claim 1, wherein the image forming unit includes two rotating optics pieces assembled on an axis of the motor and gear set, wherein the two rotating optics pieces have a predetermined relative position, orientation, and distance, and wherein the two rotating optics pieces have a same or different rotating direction.

6. The LED outdoor projection light device for a moving lighted image and/or pattern as claimed in claim 1, wherein the optics piece or a cover of the projection light device is (a) an optics lens having at least one of a treated, textured, prism, or diamond cut, jewelry, or multiple detents, (b) a round convex-lens, or (c) an at least semi-spherical optics piece, to project and enlarged moving image and/or pattern on an outdoor surface including a building, house, wall, fence, front door, garage door, pathway, floor, or garden surface.

7. The LED outdoor projection light device for a moving lighted image and/or pattern as claimed in claim 1, wherein the image forming unit is or includes:
    (A) a flat piece, slide, or film in front or top of the at least one LED,
    (B) at least one coiled, cylindrical, rolled, or three-dimensional unit, and at least one LED (1) positioned within an inner space of a moving or rotating image forming unit, or (2) surrounded by the moving or rotating image forming unit, or
    (C) at least one of an added extra optics lens, focus assembly, and protective piece positioned in front of the image forming unit.

8. The LED outdoor projection light device for a moving lighted image and/or pattern as claimed in claim 1, wherein the said motor and gear set also drives other parts to get desired functions including one or more of the following:
    (1) changing rotating direction between horizontal and vertical or other directions to rotate the other parts, the other parts including (i) a cylinder, (ii) roller, (iii) three-dimensional image-forming-piece, or (iv) an optics lens with an optics treatment and a changeable rotation axis,
    (2) rotating at least one of an inner master gear and at least one connected and additional linked gear unit, the gear units having respective center openings through which light beams pass to illuminate the at least one optics piece or image forming unit, the at least one optics piece or image forming unit having art, designs, a film, a slide, or a character to form a tiny lighted image and/or pattern which is then enlarged and projected by a front projection lens,
    (3) rotating at least one injected inner round, planar, or spherical optics lens having a plurality of-reflective and/or refractive optics structures in front at least one image forming piece having printing, painting, art, or designs to form a shaped lighted image and/or pattern for transmission through a round, planar, or spherical optics lens and a front or top cover,
    (4) rotating an inner plurality of optics lenses fitted within a tray, holder, or disc in front or on top of the at least one image forming unit to form an enlarged lighted image and/or pattern which is transmitted through a top cover to project enlarged images that move along an arc, a predetermined angle, up and down, or left and right,
    (5) rotating a camshaft unit to change a rotation axis of the motor and gear set, and
    (6) provide continuous, linear, front-and-back, right-and-left or up-and-down movements of the projected images and/or patterns, or extend or retract the projection lens or a refracting lens to change a distance between the projecting lens or refracting lens and the image forming unit to provide a variable focus.

9. The LED outdoor projection light device for a moving lighted image and/or pattern as claimed in claim 1, wherein the at least one optics piece is an outer cover which has at least one of (1) art, (2) design, (3) words, (4) a cartoon character, (5) a geometric shape, (6) painting, (7) printing, (8) an opening, (9) a non-punch-through window with art or design within, (10) a slide, and (11) a film; to form an image or pattern to transmit light beams that have passed through:
    (1) at least one inner round, spherical, or flat rotating optic lens, or (2) at least one inner non-rotating optic lens, and to form the lighted images or patterns.

10. The LED outdoor projection light device for a moving lighted image and/or pattern as claimed in claim 1, wherein the at least one optics piece is an inner optics lens or an outer cover having one of the following shapes:
    (i) at least a ½ ball shape,
    (ii) a dome with a predetermined height,
    (iii) a sphere, egg, or turtle back shape,
    (iv) a flattened dome,
    (v) a polyhedron, and
    (vi) a non-polyhedral three-dimensional shape;
    wherein the inner optics lens or outer cover has at least one predetermined light transmitting or image forming (1) area, (2) section, (3) surface, (4) body, (5) non-punch through window area, (6) film, (7) sheet, and/or (8) body having pin holes, which has at least one of art, design, printing, painting, drawing, stenciling, a cartoon character, and a word.

11. The LED outdoor projection light device for a moving lighted image and/or pattern as claimed in claim 1, wherein the LED outdoor projection light device has at least one added electric part or accessory selected from:
    (1) a switch,
    (2) a sensor,
    (3) an audio device, and
    (4) a wireless controller or Internet network device that incorporates a downloaded APP or uses a wireless or network protocol, wherein the at least one added electric part of accessory remotely controls, sets, adjusts, or turns on and off at least one LED or light device function.

12. The LED outdoor projection light device for a moving lighted image and/or pattern as claimed in claim 1, wherein the LED outdoor light device has at least one of:
    1. built-in prongs to plug into an outlet to get AC power source for indoor light applications only,
    2. a built-in AC plug wire to plug into an outlet to get AC power source for outdoor light applications only,
    3. a built-in receiver port to receive a male plug or adaptor to get outside AC-to-DC transformer power for outdoor light applications only,
    4. a built-in USB port to receive an outside USB-wire to get power from a DC energy storage device for outdoor applications only,
    5. a built-in battery compartment to install non-rechargeable or rechargeable batteries for outdoor applications only, and
    6. a built-in rechargeable battery or energy storage unit to get power from a solar module, wind generation, chemical compound, or chemical reaction generator.

13. An LED and/or laser outdoor projection light device having more than one optics piece, comprising;
    at least one LED, laser, or LED and laser light source;
    a plurality of optics pieces including at least one of an optics lens, image forming piece, grating, and outer cover;
    at least one motor and gear set to rotate at least one of the at least one optics piece, image forming piece, grating piece, or outer cover,
    wherein the at least one LED, laser, or LED and laser light source is connected with at least one of an integrated circuit, AC-to-DC circuit, and circuitry for a desired light function, and
    wherein the plurality of optics pieces have at least one of the following properties: (i) reflective, (ii) refractive, (iii) diffractive, (iv) grating, (v) diffusion, and (vi) light-transmission and are arranged to create desired light effects for light emitted from the outer cover.

14. An LED and/or laser outdoor projection light device for a moving lighted image, pattern, or light beams, comprising:
    at least one LED, laser, or LED and laser light source;
    a plurality of optics pieces including at least one of an optics lens, image forming piece, grating, and outer optics or protective cover;
    at least one motor and gear set to rotate at least one of the at least one optics piece, image forming piece, grating piece, or outer cover,
    wherein the at least one LED, laser, or LED and laser light source is connected with at least one of an integrated circuit, AC-to-DC circuit, and circuitry for a desired light function, and
    wherein the at least one LED, laser, or LED and laser light source are arranged to emit light to an inner one of the optics pieces to create desired lighted images, patterns, and/or light beam displays, and to emit the lighted images, patterns, and/or light beam displays through the outer optics or protective cover to project moving, shaking, or rotating lighted images, patterns, and/or light beam displays to be seen at outdoor surfaces.

15. A motor assembly for an LED and/or laser outdoor projection light or bulb for projecting a large viewing angle or size lighted image, lighted pattern, and/or light-beam to be seen on an outdoor surfaces, the projection light or bulb having a built-in AC-to-DC circuit or being incorporated with an outside transformer, and the projection light or bulb being an outdoor garden light, outdoor landscape light, outdoor seasonal light, outdoor holiday light with or without a ground stake and/or bracket set for installation at an outdoor location and adjustment of the location, direction, orientation, or height of the projected image, pattern, and/or light beam, the motor assembly comprising:
    a motor and gear set;
    wherein the said motor and gear set also drives other parts to get desired functions including one or more of the following:
    (1) changing rotating direction between horizontal and vertical or other directions to rotate the other parts, the other parts including (i) a cylinder, (ii) roller, (iii) three-dimensional image-forming-piece, or (iv) an optics lens with an optics treatment and a changeable rotation axis,
    (2) rotating at least one of an inner master gear and at least one connected and additional linked gear unit, the gear units having respective center openings through which light beams pass to illuminate the at least one optics piece or image forming unit, the at least one optics piece or image forming unit having art, designs, a film, a slide, or a character to form a tiny lighted image and/or pattern which is then enlarged and projected by a front projection lens,
    (3) rotating at least one of inner round or spherical optics lens having a plurality of injected reflective and/or refractive optics structures in front at least one image forming piece having printing, painting, art, or designs to form a shaped lighted image and/or pattern for transmission through a round or spherical optics lens and a front or top cover,
    (4) rotating an inner plurality of optics lenses fitted within a tray, holder, or disc in front or on top of the at least one LED to form a tiny lighted image and/or pattern which is then enlarged and transmitted through a top cover to project enlarged images that move along an arc, a predetermined angle, up and down, or left and right, and/or (5) rotating a camshaft unit to change a rotation axis of the motor and gear set and provide continuous, linear, front-and-back, right-and-left or up-and-down movements of the projected images and/or patterns, or extending and retracting the projection lens or a refracting lens vary a distance between the projecting lens or refracting lens and the image forming unit to a variable focus.

16. A changeable image forming piece for an LED and/or laser outdoor projection light or bulb, comprising:

a surface having at least one of art, a grating, a design, printing, painting, a slide, a film, a cutout, an opening, a window, or a stencil on the surface and installed in front of a light source, wherein the changeable image forming piece is at least one of:

(1) a single piece or sheet fitted within a tray or holder, the tray or holder being detachably assembled to a light-device body, housing slot, opening, or gap to enable changing, rotating, or moving of the single piece or sheet;

(2) a single piece or sheet fitted within a hole of a gear unit or disc with teeth, the single piece or sheet being manually rotatable or rotatable or by a master gear incorporated with another gear unit or gear-assembly;

(3) a plurality of pieces or sheets fitted with a tray, holder, or disc rotatable by moving teeth or gear teeth, either manually or by another moving gear unit or gear assembly; or (4) a coiled, rolled, circular, round, semi-round, or polyhedral shaped image forming piece connected with a gear unit and motor having a speed adjusting gear set to cause the image forming piece to roll or rotate, wherein the image forming piece is positioned in front of a light source and light beam pass through the image forming piece to a projection lens.

\* \* \* \* \*